US009186873B2

(12) United States Patent
Tai et al.

(10) Patent No.: US 9,186,873 B2
(45) Date of Patent: Nov. 17, 2015

(54) MULTILAYERED STRUCTURE AND METHOD FOR PRODUCING THE SAME

(75) Inventors: Shinji Tai, Okayama (JP); Hiroshi Kawai, Okayama (JP); Satoshi Yamakoshi, Okayama (JP); Kouta Isoyama, Okayama (JP); Masao Hikasa, Okayama (JP); Kentaro Yoshida, Okayama (JP)

(73) Assignee: KURARAY CO., LTD., Kurashiki-shi (JP)

( * ) Notice: Subject to any disclaimer, the term of this patent is extended or adjusted under 35 U.S.C. 154(b) by 253 days.

(21) Appl. No.: 13/513,354

(22) PCT Filed: Nov. 30, 2010

(86) PCT No.: PCT/JP2010/071415
§ 371 (c)(1),
(2), (4) Date: Jun. 1, 2012

(87) PCT Pub. No.: WO2011/068105
PCT Pub. Date: Jun. 9, 2011

(65) Prior Publication Data
US 2012/0237747 A1   Sep. 20, 2012

(30) Foreign Application Priority Data

Dec. 1, 2009   (JP) ................................. 2009-273838
Jan. 13, 2010  (JP) ................................. 2010-005367
Jan. 13, 2010  (JP) ................................. 2010-005369
Oct. 1, 2010   (JP) ................................. 2010-224362

(51) Int. Cl.
| B32B 7/00 | (2006.01) |
| B32B 27/08 | (2006.01) |
| B32B 27/18 | (2006.01) |
| B32B 27/28 | (2006.01) |
| B32B 27/34 | (2006.01) |
| B32B 27/40 | (2006.01) |
| B32B 7/02 | (2006.01) |
| B32B 7/12 | (2006.01) |
| B32B 27/00 | (2006.01) |
| B32B 27/30 | (2006.01) |
| B32B 27/32 | (2006.01) |

(52) U.S. Cl.
CPC . B32B 27/08 (2013.01); B32B 7/00 (2013.01); B32B 7/02 (2013.01); B32B 7/12 (2013.01); B32B 27/00 (2013.01); B32B 27/18 (2013.01); B32B 27/28 (2013.01); B32B 27/306 (2013.01); B32B 27/32 (2013.01); B32B 27/34 (2013.01); B32B 27/40 (2013.01); *B32B 2307/7242* (2013.01); *Y10T 428/24942* (2015.01); *Y10T 428/24975* (2015.01)

(58) Field of Classification Search
CPC ........ B32B 27/08; B32B 27/18; B32B 27/28; B32B 2307/7242; B32B 27/00; B32B 27/306; B32B 27/32; B32B 27/34; B32B 27/40; B32B 7/00; B32B 7/02; B32B 7/12; Y10T 428/24942; Y10T 428/24975
USPC .................................................. 428/212, 216
See application file for complete search history.

(56) References Cited

U.S. PATENT DOCUMENTS

| 2,835,659 | A | 5/1958 | Guillet |
| 3,087,922 | A | 4/1963 | Whittington |
| 3,579,416 | A | 5/1971 | Schrenk |
| 4,366,296 | A | 12/1982 | Kitagawa et al. |
| 5,089,353 | A | 2/1992 | Negi et al. |
| 5,178,702 | A | 1/1993 | Frerking, Jr. et al. |
| 5,300,354 | A | 4/1994 | Harita et al. |
| 5,346,950 | A | 9/1994 | Negi et al. |
| 5,433,908 | A | 7/1995 | Harita et al. |
| 6,174,949 | B1 | 1/2001 | Ninomiya et al. |
| 6,579,601 | B2 | 6/2003 | Kollaja et al. |
| 6,582,786 | B1 | 6/2003 | Bonk et al. |
| 7,033,458 | B2 | 4/2006 | Chang et al. |
| 7,229,518 | B1 | 6/2007 | Watkins |
| 7,600,546 | B2 | 10/2009 | Fujino et al. |

(Continued)

FOREIGN PATENT DOCUMENTS

| CN | 1088077 C | 7/2002 |
| CN | 101272902 A | 9/2008 |

(Continued)

OTHER PUBLICATIONS

Ikeda et al (JP 2006-233222 machine translation), Sep. 7, 2006.*
International Search Report Issued Dec. 28, 2010 in PCT/JP10/71415 Filed Nov. 30, 2010.
The Extended European Search Report issued Apr. 17, 2013, in Application No. / Patent No. 10834554.7-1303 / 2508342 PCT/JP2010071413.
The Extended European Search Report issued Apr. 23, 2013, in Application No. / Patent No. 10834555.4-1303 / 2508343 PCT/JP2010071415.

(Continued)

Primary Examiner — Aaron Austin
Assistant Examiner — Lawrence Ferguson
(74) *Attorney, Agent, or Firm* — Oblon, McClelland, Maier & Neustadt, L.L.P.

(57) ABSTRACT

Disclosed is a multilayered structure that includes no less than 8 resin-layers, the resin-layer including a layer A constituted with a resin composition containing a gas barrier resin, and a layer B constituted with a resin composition containing a thermoplastic resin, at least one of the resin compositions included in the layer A and the layer B that are adjacent with each other containing a metal salt, the content of the metal salt being no less than 1 ppm and no greater than 10,000 ppm in terms of metal element equivalent, and an interlayer adhesive force between the layer A and the layer B being no less than 450 g/15 mm. The layer A and the layer B may be alternately laminated. Moreover, the average thickness of single layer of at least one selected from the layer A and the layer B is preferably no less than 0.01 μm and no greater than 10 μm.

18 Claims, No Drawings

(56) References Cited

U.S. PATENT DOCUMENTS

| | | |
|---|---|---|
| 2003/0207061 A1 | 11/2003 | Hayashi et al. |
| 2004/0096683 A1 | 5/2004 | Ikeda et al. |
| 2008/0003390 A1 | 1/2008 | Hayashi et al. |
| 2009/0308517 A1 | 12/2009 | Nohara et al. |
| 2009/0311524 A1 | 12/2009 | Noma et al. |
| 2010/0147431 A1 | 6/2010 | Morooka |
| 2010/0147432 A1 | 6/2010 | Morooka |
| 2010/0280178 A1 | 11/2010 | Ikeda et al. |
| 2011/0024015 A1 | 2/2011 | Takahashi et al. |

FOREIGN PATENT DOCUMENTS

| | | |
|---|---|---|
| CN | 101516646 A | 8/2009 |
| DE | 40 30 399 | 4/1992 |
| DE | 30 21 273 | 3/1993 |
| EP | 0 186 154 A2 | 7/1986 |
| EP | 0 322 364 | 6/1989 |
| EP | 0 504 808 A1 | 9/1992 |
| EP | 2 014 462 A1 | 1/2009 |
| EP | 2 045 102 A1 | 4/2009 |
| JP | 50 44281 | 4/1975 |
| JP | 2000-318079 A | 11/2000 |
| JP | 2002 524317 | 8/2002 |
| JP | 2003 512201 | 4/2003 |
| JP | 2003 231715 | 8/2003 |
| JP | 2006 188710 | 7/2006 |
| JP | 2006 233222 | 9/2006 |
| JP | 2006 272569 | 10/2006 |
| JP | 2008-213840 | 9/2008 |
| JP | 2008 247030 | 10/2008 |
| JP | 2009-220793 | 10/2009 |
| JP | 2009-242644 | 10/2009 |
| RU | 2133702 | 7/1999 |
| WO | 2007 037541 | 4/2007 |
| WO | 2007 083785 | 7/2007 |
| WO | WO 2007/129371 A1 | 11/2007 |
| WO | WO 2009/123229 A1 | 10/2009 |

OTHER PUBLICATIONS

U.S. Appl. No. 13/513,429, filed Jun. 1, 2012, Tai, et al.
Decision to Grant issued on Mar. 5, 2015 w/English Translation which corresponds to Russian Patent Application No. 2012127324.
Office Action issued on Aug. 19, 2015 in corresponding U.S. Appl. No. 13/513,429 filed Jun. 1, 2012.

* cited by examiner

US 9,186,873 B2

MULTILAYERED STRUCTURE AND METHOD FOR PRODUCING THE SAME

This application is a National Stage of PCT/JP10/071415 filed Nov. 30, 2010 and claims the benefit of JP 2009-273838 filed Dec. 1, 2009, JP 2010-005367 filed Jan. 13, 2010, JP 2010-005369 filed Jan. 13, 2010 and JP 2010-224362 filed Oct. 1, 2010.

TECHNICAL FIELD

The present invention relates to a multilayered structure that includes no less than 8 resin-layers and method for producing the same, and more particularly relates to a multilayered structure having superior gas barrier properties, stretchability, thermoformability and durability and being excellent in interlayer adhesiveness, and a method for producing the same.

BACKGROUND ART

Nowadays, laminated films having an ethylene-vinyl alcohol copolymer layer have been used in applications such as packaging materials for food and medical applications, taking advantages of their superior gas barrier properties, stretchability, thermoformability and the like. Recently, for the purpose of improving various types of performances such as gas barrier properties, various multilayered structures have been proposed in which a plurality of resin-layers are laminated, each layer having a thickness of micron or submicron order.

Conventional multilayered structures developed so far in which a plurality of resin-layers of an ethylene-vinyl alcohol copolymer are laminated include, for example: (1) an elastomeric barrier film in which at least ten layers of a microlayer polymer composite formed from a fluid barrier material such as an ethylene-vinyl alcohol copolymer, and an elastomer material such as thermoplastic polyurethane are alternately laminated (see Japanese Unexamined Patent Application (Translation of PCT Application), Publication No. 2002-524317); (2) multilayer film alternately including layers of a hard polymer material such as an ethylene-vinyl alcohol copolymer and flexible polymer material (see Japanese Unexamined Patent Application (Translation of PCT Application), Publication No. 2003-512201), and the like.

However, according to the aforementioned conventional multilayered structure (1), adhesiveness between a fluid barrier material such as an ethylene-vinyl alcohol copolymer and an elastomer material such as thermoplastic polyurethane is not in any way considered. In addition, also according to the aforementioned conventional multilayered structure (2), the hard polymer material per se such as an ethylene-vinyl alcohol copolymer, and combination of the same with the flexible polymer material, and the like are not investigated in connection with the interlayer adhesiveness, but only a technique of strengthening the adhesiveness between each layer using a joining layer merely consisting of a hot melt adhesive is disclosed. Therefore, according to these conventional multilayered structure (1) and multilayered structure (2), the interlayer adhesiveness is insufficient, and due to delamination between layers and the like, cracks are likely to be generated on the barrier layer, whereby durability may be deteriorated. As a result, in the conventional multilayered structure (1), gas barrier properties may be insufficient for use in food packaging and the like.

PRIOR ART DOCUMENTS

Patent Documents

Patent Document 1: Japanese Unexamined Patent Application (Translation of PCT Application), Publication No. 2002-524317
Patent Document 2: Japanese Unexamined Patent Application (Translation of PCT Application), Publication No. 2003-512201

SUMMARY OF THE INVENTION

Problems to be Solved by the Invention

The present invention was made in view of these disadvantages, and an object of the invention is to provide a multilayered structure that is excellent in interlayer adhesiveness, has superior gas barrier properties, stretchability, thermoformability and the like, and is capable of maintaining characteristics such as gas barrier properties even when used with deformation such as stretching or flexion imposed. Additionally, other object of the invention is to provide a method for producing a multilayered structure having such characteristics, while suppressing an increase in production costs.

Means for Solving the Problems

An aspect of the invention made for solving the foregoing problems is,
a multilayered structure that includes no less than 8 resin-layers,
the resin-layer including a layer A constituted with a resin composition containing a gas barrier resin, and a layer B constituted with a resin composition containing a thermoplastic resin,
at least one of the resin compositions included in the layer A and the layer B that are adjacent with each other containing a metal salt,
the content of the metal salt being no less than 1 ppm and no greater than 10,000 ppm in terms of metal element equivalent, and
an interlayer adhesive force between the layer A and the layer B being no less than 450 g/15 mm.

The multilayered structure has superior gas barrier properties, stretchability and thermoformability due to including no less than 8 resin-layers. In addition, due to: including a layer A containing a gas barrier resin, and a layer B containing a thermoplastic resin; at least one of the resin compositions included in the layer A and the layer B that are adjacent with each other containing a metal salt; and the interlayer adhesive force between the layer A and the layer B being no less than 450 g/15 mm, the multilayered structure has very superior interlayer adhesiveness. Therefore, due to the very superior interlayer adhesiveness, the multilayered structure maintains characteristics such as superior gas barrier properties even against deformation such as stretching or flexion, and has very high durability.

The layer A and the layer B may be alternately laminated. By thus alternately laminating the layer A and the layer B, each interlayer formed by lamination can achieve the aforementioned superior adhesiveness. As a result, interlayer adhesiveness of the multilayered structure, in turn, gas barrier properties, durability, and the like can be significantly improved.

The average thickness of single layer of at least one selected from the layer A and the layer B is preferably no less than 0.01 μm and no greater than 10 μm. When the average thickness of the layer A and/or layer B falls within the above range, the number of layers can be increased even if the entirety of the multilayered structure has an identical thickness, and consequently, the gas barrier properties, durability and the like of the multilayered structure can be further improved.

The multilayered structure has a thickness of preferably no less than 0.1 μm and no greater than 1,000 μm. When the multilayered structure has a thickness falling within the above range, along with the effects achievable by the average thickness of the layer A and/or layer B falling within the range as described above, gas barrier properties, durability, stretchability and the like can be further improved while maintaining applicability to the food packaging materials, and the like.

As the metal salt, at least one selected from the group consisting of alkali metal salts, alkaline earth metal salts and d-block metal salts in group 4 of periodic table may be used. When such a metal salt is used, the interlayer adhesiveness between the layer A and the layer B can be effectively achieved, and as a result, the gas barrier properties, durability and the like of the multilayered structure can be further improved.

The gas barrier resin may be an ethylene-vinyl alcohol copolymer. Use of the ethylene-vinyl alcohol copolymer as a gas barrier resin enables the gas barrier properties of the multilayered structure to be further improved.

The content of ethylene units of the ethylene-vinyl alcohol copolymer is preferably no less than 3 mol % and no greater than 70 mol %. When the content of ethylene units falls within the above range, the gas barrier properties of the multilayered structure is improved, and additionally melt formability can be improved, whereby improvement of the interlayer adhesiveness is enabled owing to the superior melt formability.

The ethylene-vinyl alcohol copolymer preferably has a saponification degree of no less than 80 mol %. When the saponification degree falls within the above range, the gas barrier properties of the multilayered structure can be further improved, and the moisture resistance can be also improved. In addition, the saponification degree falling within the above range serves in enabling the interlayer adhesiveness with the layer B to be improved.

It is desired that the ethylene-vinyl alcohol copolymer includes at least one selected from the group consisting of the following structural units (I) and (II), and the content of at least one selected from the structural units (I) and (II) with respect to the entire structural units is no less than 0.5 mol % and no greater than 30 mol %.

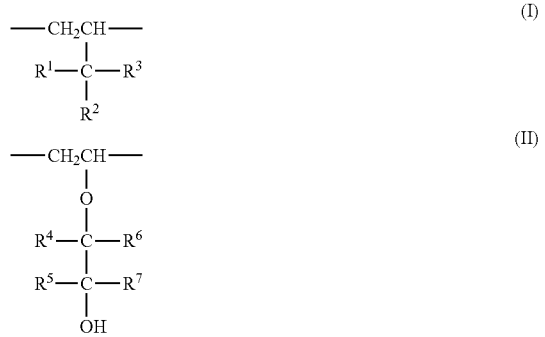

in the above formula (I), $R^1$, $R^2$ and $R^3$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group; two among $R^1$, $R^2$ and $R^3$ may bind with one another, unless the two among $R^1$, $R^2$ and $R^3$ both represent a hydrogen atom; and the aliphatic hydrocarbon group having 1 to 10 carbon atoms, the alicyclic hydrocarbon group having 3 to 10 carbon atoms and the aromatic hydrocarbon group having 6 to 10 carbon atoms may have a hydroxyl group, a carboxyl group or a halogen atom;
and in the above formula (II), $R^4$, $R^5$, $R^6$ and $R^7$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group; $R^4$ and $R^5$ or $R^6$ and $R^7$ may bind with one another, unless both $R^4$ and $R^5$ or both $R^6$ and $R^7$ represent a hydrogen atom; the aliphatic hydrocarbon group having 1 to 10 carbon atoms, the alicyclic hydrocarbon group having 3 to 10 carbon atoms and the aromatic hydrocarbon group having 6 to 10 carbon atoms may have a hydroxyl group, an alkoxy group, a carboxyl group or a halogen atom.

When the ethylene-vinyl alcohol copolymer of the layer A thus includes the structural unit (I) and/or (II) at a content within the aforementioned range, flexibility and processing characteristics of the resin composition constituting the layer A are improved, and thus the interlayer adhesiveness, stretchability and thermoformability of the multilayered structure can be improved.

The resin composition of the layer A may contain a phosphate compound in an amount of no less than 1 ppm and no greater than 10,000 ppm in terms of phosphoric acid group equivalent, a carboxylic acid in an amount of no less than 1 ppm and no greater than 10,000 ppm, or a boron compound in an amount of no less than 1 ppm and no greater than 2,000 ppm in terms of boron equivalent. By thus containing a phosphate compound, a carboxylic acid or a boron compound in the resin composition of the layer A, thermal stability of the multilayered structure in melt forming can be improved, and consequently, the interlayer adhesiveness of the multilayered structure can be improved.

It is desired that the thermoplastic resin is at least one resin selected from the group consisting of thermoplastic polyurethane, polyamide, and an adhesive resin having a functional group capable of reacting with a group included in the gas barrier resin in the molecule. According to the multilayered structure, provided that the aforementioned resin is used as a thermoplastic resin, the interlayer adhesiveness and the like can be further improved.

It is desired that the thermoplastic resin includes the adhesive resin having a functional group capable of reacting with a group included in the gas barrier resin in the molecule, in which the adhesive resin is at least one resin selected from the group consisting of carboxylic acid-modified polyolefin and a metal salt thereof, a thermoplastic resin having a boron-containing group capable of being converted into a boronic acid group in the presence of a boronic acid group or water, and a vinyl ester based copolymer. When the aforementioned adhesive resin is used, the interlayer adhesiveness between the layer A and the layer B is further improved. Therefore, the multilayered structure enables the gas barrier properties, durability and the like to be further improved.

It is desired that the resin composition that constitutes the layer A and/or layer B has a melt viscosity ($\eta_1$) as determined at a temperature of 210° C. and a shear rate of 10/sec being no less than $1 \times 10^2$ Pa·s and no greater than $1 \times 10^4$ Pa·s and a melt viscosity ($\eta_2$) as determined at a temperature of 210° C. and a shear rate of 1,000/sec being no less than $1\times10^1$ Pa·s and no greater than $1\times10^3$ Pa·s, and a ratio ($\eta_2/\eta_1$) of the melt viscosity satisfies the following formula (1):

$$-0.8 \leq (1/2)\log_{10}(\eta_2/\eta_1) \leq -0.1 \quad (1).$$

When the resin composition of the layer A and/or layer B thus has a melt viscosity and a ratio of the melt viscosity falling within the above range, the layer A and the layer B, in turn, the multilayered structure can be formed with a size as intended and at a high speed, and an effect of improving the interlayer adhesiveness is also exhibited.

A ratio ($\eta_{2B}/\eta_{2A}$) of a melt viscosity ($\eta_{2B}$) of the resin composition of the layer B to a melt viscosity ($\eta_{2A}$) of the resin composition of the layer A as determined at a temperature of 210° C. and a shear rate of 1,000/sec is preferably 0.3 or greater and 2 or less. When the ratio ($\eta_{2B}/\eta_{2A}$) of the melt viscosity falls within the above range, an adhesive force between the layer A and the layer B in a multilayered structure obtained by melt forming can be further enhanced, and durability of the multilayered structure can be improved.

In addition, it is also preferred that at a temperature higher than a Vicat softening temperature of the resin composition that constitutes the layer A or layer B by 30° C., the resin composition of the layer A and/or layer B has a melt viscosity ($\eta_1'$) as determined at a shear rate of 10/sec being no less than $1\times10^2$ Pa·s and no greater than $1\times10^4$ Pa·s and a melt viscosity ($\eta_2'$) as determined at a shear rate of 1,000/sec being no less than $1\times10^1$ Pa·s and no greater than $1\times10^3$ Pa·s, and that a ratio ($\eta_2'/\eta_1'$) of the melt viscosity satisfies the following formula (1'):

$$-0.8 \leq (1/2)\log_{10}(\eta_2'/\eta_1') \leq -0.1 \quad (1').$$

Accordingly, also when the resin composition of the layer A thus has a melt viscosity and a ratio of the melt viscosity falling within the above range, the layer A and the layer B, in turn, the multilayered structure can be formed with a size as intended and at a high speed, and an effect of improving the interlayer adhesiveness is also exhibited.

Moreover, at a temperature higher than a Vicat softening temperature of the resin composition of the layer A by 30° C., a ratio ($\eta_{2B}'/\theta_{2A}'$) of a melt viscosity ($\eta_{2B}'$) of the resin composition of the layer B to a melt viscosity ($\eta_{2A}'$) of the resin composition of the layer A as determined at a shear rate of 1,000/sec is preferably 0.3 or greater and 3 or less. When the ratio ($\eta_{2B}'/\eta_{2A}'$) of the melt viscosity falls within the above range, the adhesive force between the layer A and the layer B in a multilayered structure obtained by melt forming can be further enhanced, and the durability of the multilayered structure can be further improved.

In the multilayered structure, it is preferred that a binding reaction occurs at an interface between the layer A and the layer B. Accordingly, by linking via a covalent bond or ionic bond between molecules of the resin compositions that constitute the layer A and the layer B, more superior interlayer adhesiveness can be attained. As a result, the gas barrier properties, durability and the like of the multilayered structure can be further improved.

The multilayered structure is suitably used for food packaging. It is necessary that packaging materials used for food packaging, etc. maintain superior gas barrier properties while repeatedly subjected to deformation such as stretching or flexion during use, and thus the multilayered structure having characteristics such as superior gas barrier properties, durability, and flexibility as described above may be suitably used.

Additionally, other aspect of the present invention made for solving the foregoing problems provides a method for producing a multilayered structure, the method including forming by a multilayer coextrusion process using a resin composition containing a gas barrier resin, and a resin composition containing a thermoplastic resin. According to the method for producing a multilayered structure, a multilayered structure that is excellent in interlayer adhesiveness, and has superior gas barrier properties, stretchability and durability can be produced easily and certainly while suppressing an increase in production costs.

Effects of the Invention

As explained in the foregoing, since the multilayered structure of the present invention is excellent in interlayer adhesiveness, it has not only superior gas barrier properties, as well as stretchability and thermoformability in combination, but also superior durability so that characteristics such as superior gas barrier properties can be maintained even in the case in which it is used with deformation such as stretching or flexion imposed in use as a food packaging material and the like. In addition, according to the method for producing a multilayered structure of the present invention, a multilayered structure having such characteristics can be produced easily and certainly while suppressing an increase in production costs.

DESCRIPTION OF EMBODIMENTS

Hereinafter, embodiments of the present invention are described in detail.

The multilayered structure includes no less than 8 resin-layers. The resin-layer includes a layer A constituted with a resin composition containing a gas barrier resin, and a layer B constituted with a resin composition containing a thermoplastic resin. In the layer A and layer B, at least one of the resin compositions included in the layer A and the layer B that are adjacent with each other contains a metal salt.

Hereinafter, a layered structure, the layer A, the layer B, the metal salt, relationship between the layer A and the layer B, and a production method of the multilayered structure are explained in this order.

<Layered Structure of the Multilayered Structure>

The multilayered structure includes no less than 8 resin-layers. Due to the configuration in which no less than 8 resin-layers are laminated, continuous development of defects such as pinhole and breakage can be prevented, and as a result, the multilayered structure has superior characteristics such as gas barrier properties and durability resulting from the structure per se. In these regards, and in light of the production, total number of the resin-layers is preferably no less than 10, more preferably no less than 15, and particularly preferably no less than 18.

The resin-layer includes at least two types of layers, the layer A and the layer B, and other C layer and the like may be further included. By laminating at least 8 layers in total of two or more types of the layers including the layer A constituted with a resin composition containing a gas barrier resin and the layer B constituted with a resin composition containing a thermoplastic resin, a multilayered structure having superior gas barrier properties resulting from the layer A, and stretchability and thermoformability resulting from the layer B in combination can be provided. In addition, the multilayered structure can maintain gas barrier properties even if used with repeated deformation such as stretching or flexion imposed, owing to the laminated configuration of the layer A and the layer B.

It is to be noted that the layer A may be constituted with either a single resin composition, or a plurality of types of resin compositions as long as a gas barrier resin is included. The layer B may be also constituted with either a single resin composition, or a plurality of types of resin compositions including a thermoplastic resin, similarly to the layer A.

The order of lamination of the layer A and the layer B is not particularly limited as long as a structure having at least a site including the layer A and the layer B being adjacent with each other is formed. For example, the order of lamination such as:

(1) A, B, A, B . . . A, B (i.e., $(AB)_n$);
(2) A, B, A, B . . . A (i.e., $(AB)_nA$);
(3) B, A, B, A . . . B (i.e., $(BA)_nB$); and
(4) A, A, B, B . . . B, B (i.e., $(AABB)_n$)

may be employed. In addition, when the other C layer is included, for example, the order of lamination such as (5) A, B, C . . . A, B, C (i.e., $(ABC)_n$)

may be employed.

In particular, according to preferable orders of lamination of the layer A and layer B, the layer A and the layer B are alternately laminated as in the above (1), (2) or (3). Thus alternately laminated structure makes the multilayered structure have superior gas barrier properties and flexibility. Furthermore, strong adhesive force between the layer A and the layer B described later can be affected at the entirety of the interlayer, whereby defects such as interlayer delamination can be significantly reduced. As a result, the effects of the invention, i.e., improvement of characteristics of the multilayered structure such as gas barrier properties and durability of the characteristics can be more efficiently achieved.

The lower limit of the thickness of the multilayered structure is preferably 0.1 µm, more preferably 1 µm, and still more preferably 5 µm. On the other hand, the upper limit of the thickness of the multilayered structure is preferably 1,000 µm, more preferably 700 µm, and still more preferably 500 µm. When the thickness of the multilayered structure is less than the lower limit described above, the strength becomes insufficient, whereby use of the multilayered structure may be difficult. To the contrary, when the thickness of the multilayered structure is beyond the upper limit described above, flexibility, formability and the like deteriorate, whereby an increase in production costs may be brought. Note that the thickness of the multilayered structure may be determined by measuring the thickness of the cross section at arbitrarily selected points of the multilayered structure.

The lower limit of the average thickness of the layer A in terms of a single layer is preferably 0.01 µm, more preferably 0.05 µm, and still more preferably 0.1 µm. On the other hand, the upper limit of the average thickness of the layer A in terms of a single layer is preferably 10 µm, more preferably 7 µm, still more preferably 5 µm, and particularly preferably 2 µm. When the average thickness of the layer A in terms of a single layer is less than the lower limit described above, formation with a uniform thickness becomes difficult, whereby the gas barrier properties and their durability of the multilayered structure may deteriorate. To the contrary, when the average thickness of the layer A in terms of a single layer is beyond the upper limit described above, it becomes difficult to increase the number of layers if the entirety of the multilayered structure has an identical average thickness, whereby the effect of improving gas barrier properties due to the multilayer as described above may not be effected, and stretchability and thermoformability of the multilayered structure may be deteriorated. It is to be noted that the average thickness of the layer A in terms of a single layer refers to a value derived by dividing the total thickness of all layers A included in the multilayered structure by the number of the layers A.

For a similar reason, the lower limit of the average thickness of the layer B in terms of a single layer is preferably 0.01 µm, more preferably 0.05 µm, and still more preferably 0.1 µm. On the other hand, the upper limit of the average thickness of the layer B in terms of a single layer is preferably 10 µm, more preferably 7 µm, still more preferably 5 µm, and particularly preferably 2 µm. It is to be noted that the average thickness of the layer B in terms of a single layer also refers to a value derived by dividing the total thickness of all layers B included in the multilayered structure by the number of the layers B.

<Layer A>

The layer A is constituted with a resin composition containing a gas barrier resin. Since the resin composition constituting the layer A contains a gas barrier resin, multilayered structure that is superior in gas barrier properties can be obtained.

The gas barrier resin has a function of preventing permeabilization of gas, specifically has an oxygen transmission rate as determined according to a method described in JIS-K7126 (isopiestic method) under conditions including 20° C. and 65% RH of no greater than 100 mL·20 µm/(m²·day·atm). It should be noted that the oxygen transmission rate of the gas barrier resin used in the present invention is preferably no greater than 50 mL·20 µm/(m²·day·atm), and more preferably no greater than 10 mL·20 µm/(m²·day·atm).

Such a gas barrier resin is exemplified by an ethylene-vinyl alcohol copolymer (hereinafter, may be also referred to as "EVOH".), a polyamide resin, a polyester resin, polyvinylidene chloride, an acrylonitrile copolymer, polyvinylidene fluoride, polychlorotrifluoroethylene, polyvinyl alcohol, and the like.

Of these resins having gas barrier properties, EVOH, polyamide resins and polyester resins are preferred in light of the gas barrier properties, and EVOH is particularly preferred in light of not only gas barrier properties but also melt formability, adhesiveness with the layer B, and the like.

<Polyamide Resin>

The polyamide resin is a polymer having an amide bond, and can be obtained by ring-opening polymerization of lactam, polycondensation of aminocarboxylic acid or diamine with dicarboxylic acid, or the like.

Examples of the lactam include ε-caprolactam, ω-laurolactam, and the like.

Examples of the aminocarboxylic acid include 6-aminocaproic acid, 11-aminoundecanoic acid, 12-aminododecanoic acid, paraminomethylbenzoic acid, and the like.

Examples of the diamine include tetramethylenediamine, hexamethylenediamine, undecamethylenediamine, dodecamethylenediamine, 2,2,4-trimethylhexamethylenediamine, 2,4,4-trimethylhexamethylenediamine, 5-methylnonamethylenediamine, m-xylylenediamine, p-xylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, and the like.

The dicarboxylic acid is exemplified by succinic acid, glutaric acid, adipic acid, pimelic acid, suberic acid, azelaic acid, sebacic acid, dodecanedicarboxylic acid, cyclohexanedicarboxylic acid, decalindicarboxylic acid, norbornanedicarboxylic acid, tricyclodecanedicarboxylic acid, pentacyclododecanedicarboxylic acid, isophoronedicarboxylic acid, 3,9-bis(2-carboxyethyl)-2,4,8,10-tetraoxaspiro[5.5]undecane, trimellitic acid, trimesic acid, pyromellitic acid, tricarballylic acid, terephthalic acid, isophthalic acid, phthalic acid, 2-methylterephthalic acid, naphthalenedicarboxylic acid, biphenyldicarboxylic acid, tetraphosphorusdicarboxylic acid, and the like.

Exemplary method for the polycondensation which may be employed in synthesizing the polyamide resin includes a method in which polycondensation is allowed in a molten state, and a method in which polycondensation is once allowed in a molten state to obtain low viscosity polyamide, followed by subjecting to a heat treatment in a solid phase state (solid phase polymerization, generally referred to). Exemplary method for the polycondensation in a molten state which may be employed includes a method in which an aqueous solution of a nylon salt of diamine and dicarboxylic acid is heated under pressure, and then polycondensation is allowed in a molten state while eliminating water and condensed water, a method in which diamine is directly added to dicarboxylic acid in a molten state, and then polycondensation is allowed under normal pressure, and the like.

Examples of specific polyamide resin that is a polycondensate of the compound or the like include aliphatic polyamide resins such as polycaprolactam (nylon 6), polylaurolactam (nylon 12), polyhexamethylenediadipamide (nylon 66), polyhexamethyleneazelamide (nylon 69), polyhexamethylenesebacamide (nylon 610), nylon 46, nylon 6/66, nylon 6/12, and a condensation product of 11-aminoundecanoic acid (nylon 11), aromatic polyamide resins such as polyhexamethyleneisophthalamide (nylon 6IP), m-xylenediamine/adipic acid copolymer (nylon MXD6), and m-xylenediamine/adipic acid/isophthalic acid copolymer, and the like. These may be used alone or as a mixture of two or more thereof.

Among these polyamide resins, nylon MXD6 having superior gas barrier properties is preferred. With respect to a diamine component of the nylon MXD6, m-xylylenediamine is preferably included in an amount of no less than 70 mol %. Whereas, with respect to a dicarboxylic acid component, adipic acid is preferably included in an amount of no less than 70 mol %. When nylon MXD6 is obtained from the monomer blended as described above, more superior gas barrier properties and mechanical performances can be achieved.

<Polyester Resin>

The polyester resin is a polymer having an ester bond, and can be obtained by polycondensation of polyvalent carboxylic acid with polyol, and the like. Examples of the polyester resin which may be used as a resin having gas barrier properties of the multilayered structure include polyethylene terephthalate (PET), polyethylene naphthalate (PEN), polyglycolic acid (PGA), aromatic liquid crystal polyesters, and the like. These may be used alone or as a mixture of two or more thereof. Among these polyester resins, PGA and wholly aromatic liquid crystal polyesters are preferred in light of the extent of gas barrier properties.

<PGA>

PGA is a homopolymer or copolymer having a structural unit represented by —O—CH$_2$—CO— (GA). The content of the aforementioned structural unit (GA) in PGA is preferably no less than 60% by mass, more preferably no less than 70% by mass, and still more preferably no less than 80% by mass. Also, the upper limit of the content is preferably 100% by mass. When the content of the structural unit (GA) is less than the lower limit described above, gas barrier properties may not be sufficiently achieved.

Exemplary method for producing PGA includes (1) a method of synthesis by way of dehydrative polycondensation of glycolic acid, (2) a method of synthesis by way of dealcoholizing polycondensation of a glycolic acid alkyl ester, (3) a method of synthesis by way of ring-opening polymerization of glycolide (1,4-dioxane-2,5-dione), and the like.

Exemplary method for synthesizing PGA as a copolymer may include methods in which copolymerization is carried out in each synthesis method described above using as a comonomer, for example, a cyclic monomer such as ethylene oxalate (1,4-dioxane-2,3-dione), lactide, lactones (for example, β-propiolactone, β-butyrolactone, pivalolactone, γ-butyrolactone, δ-valerolactone, β-methyl-δ-valerolactone, ε-caprolactone, etc.), trimethylene carbonate or 1,3-dioxane;

hydroxycarboxylic acid such as lactic acid, 3-hydroxypropanoic acid, 3-hydroxybutanoic acid, 4-hydroxybutanoic acid or 6-hydroxycaproic acid, or an alkyl ester thereof;

a mixture of aliphatic diol such as ethylene glycol or 1,4-butanediol with substantially equimolar aliphatic dicarboxylic acid such as succinic acid or adipic acid or an alkyl ester thereof; or the like, in appropriate combination with glycolide, glycolic acid or a glycolic acid alkyl ester.

In a specific method of the ring-opening polymerization described above in section (3), glycolide is heated to a temperature of about 120° C. to about 250° C. in the presence of a small amount of a catalyst (for example, a cationic catalyst such as organic tin carboxylate, tin halide or antimony halide). The ring-opening polymerization is carried out preferably by a block polymerization process or solution polymerization process.

In the ring-opening polymerization, glycolide used as a monomer may be obtained by a sublimation depolymerization process, solution-phase depolymerization process, or the like of a glycolic acid oligomer.

A typical solution-phase depolymerization process includes, for example (1) heating a mixture containing a glycolic acid oligomer and at least one high-boiling point polar organic solvent having a boiling point within the range of 230 to 450° C., under an normal pressure or a reduced pressure at a temperature at which depolymerization of the oligomer occurs, (2) dissolving the oligomer in a solvent until a residual ratio (volume ratio) of the melt phase of the oligomer becomes no greater than 0.5, (3) allowing the oligomer to be depolymerized by further heating at the same temperature, (4) distilled off the produced dimer cyclic ester (glycolide) together with the high-boiling point polar organic solvent, and (5) recovering the glycolide from the distillate.

Examples of the high-boiling point polar organic solvent include phthalic acid bis(alkoxyalkyl ester) such as di(2-methoxyethyl)phthalate, alkylene glycol dibenzoate such as diethylene glycol dibenzoate, aromatic carboxylate esters such as benzylbutyl phthalate and dibutyl phthalate, aromatic phosphoric acid esters such as tricresylphosphate, and the like. Also, together with the high-boiling point polar organic solvent, polypropylene glycol, polyethylene glycol, tetraethylene glycol or the like may be used in combination as a solubilizing agent of the oligomer if necessary.

<Wholly Aromatic Liquid Crystal Polyester>

The wholly aromatic liquid crystal polyester is a liquid crystalline polyester in which polyvalent carboxylic acid and polyol provided as monomers are both an aromatic compound. The wholly aromatic liquid crystal polyester may be obtained by polymerization according to a well-known method similar to general polyesters.

The aromatic polyvalent carboxylic acid is exemplified by terephthalic acid, isophthalic acid, 2,6-naphthalenedicarboxylic acid, 2,7-naphthalenedicarboxylic acid, 1,4-naphthalenedicarboxylic acid, 4,4'-biphenyldicarboxylic acid, 3,3'-biphenyldicarboxylic acid, 4,4'-methylene dibenzoic acid, diphenic acid and the like. These may be used alone or as a mixture of two or more thereof.

The aromatic polyol is exemplified by hydroquinone, methylhydroquinone, 4,4'-dihydroxydiphenyl, resorcinol, phenylhydroquinone, 3,4'-bisphenol A, and the like. These may be used alone or as a mixture of two or more thereof.

Moreover, the wholly aromatic liquid crystal polyester may be obtained also by polymerization of an aromatic compound that has a hydroxy group and a carboxyl group such as hydroxybenzoic acid or hydroxynaphthoic acid, etc., or copolymerizing the aromatic polyvalent carboxylic acid and aromatic polyol.

<EVOH>

Hereinafter, EVOH suitably used as a gas barrier resin of the multilayered structure of the present invention is explained in detail.

EVOH included in the resin composition of the layer A has an ethylene unit and a vinyl alcohol unit as principal structural units. It is to be noted that EVOH may include one type or a plurality of types of other structural unit in addition to the ethylene unit and the vinyl alcohol unit.

EVOH is usually obtained by polymerizing ethylene with vinyl ester, and saponifying the resultant ethylene-vinyl ester copolymer.

The lower limit of the content of ethylene units in EVOH (i.e., the proportion of the number of ethylene units relative to the total number of monomer units in EVOH) is preferably 3 mol %, more preferably 10 mol %, still more preferably 20 mol %, and particularly preferably 25 mol %. On the other hand, the upper limit of the content of ethylene units in EVOH is preferably 70 mol %, more preferably 60 mol %, still more preferably 55 mol %, and particularly preferably 50 mol %. When the content of ethylene units in EVOH is less than the lower limit described above, water resistance, hot water resistance, and gas barrier properties under highly humid conditions of the multilayered structure may be deteriorated, or melt formability of the multilayered structure may be impaired. To the contrary, when the content of ethylene units in EVOH is beyond the upper limit described above, the gas barrier properties of the multilayered structure may be deteriorated.

The lower limit of the saponification degree of EVOH (i.e., the proportion of the number of vinyl alcohol units relative to the total number of vinyl alcohol units and vinyl ester units in EVOH) is preferably 80 mol %, more preferably 95 mol %, and particularly preferably 99 mol %. On the other hand, the upper limit of the saponification degree of EVOH is preferably 99.99 mol %. When the saponification degree of EVOH is less than the lower limit described above, melt formability may be impaired, and additionally the gas barrier properties of the multilayered structure may be deteriorated, or the coloring resistance and/or moisture resistance may be unsatisfactory. To the contrary, when the saponification degree of EVOH is beyond the upper limit described above, improvement of the gas barrier properties and the like with respect to an increase in production costs of EVOH can be expected to an unsatisfactory extent. Such EVOH may be used alone; however, an embodiment in which such EVOH is used as a blend with EVOH having a saponification degree exceeding 99 mol % is also suitable.

It is preferred that the content G (mol %) of the 1,2-glycol bond structural units in EVOH satisfies the following formula (2), and the intrinsic viscosity be no less than 0.05 L/g and no greater than 0.2 L/g. In the following formula (2), E represents the content of ethylene units (mol %) in EVOH (wherein, E≤64 (mol %)).

$$G \leq 1.58 - 0.0244 \times E \quad (2)$$

When the resin composition of the layer A includes EVOH having such a content G of 1,2-glycol bond structural units and an intrinsic viscosity, a feature of decreasing humidity dependency of gas barrier properties of the resulting multilayered structure can be exhibited, and favorable transparency and gloss are provided, while lamination with other thermoplastic resin can be facilitated. Therefore, applicability of the multilayered structure as a material for food packaging and the like can be improved. It is to be noted that the content G of the 1,2-glycol bond structural units may be determined in accordance with the method described by S. Aniya et al., (Analytical Science Vol. 1, 91 (1985)), by way of a nuclear magnetic resonance process at a temperature of 90° C. with a dimethyl sulfoxide solution as an EVOH sample.

EVOH preferably has at least one selected from the group consisting of the structural units (I) and (II). The lower limit of the content of at least one selected from the structural units (I) and (II) with respect to the entire structural units is preferably 0.5 mol %, more preferably 1 mol %, and still more preferably 1.5 mol %. On the other hand, the upper limit of the content of at least one selected from the structural units (I) and (II) is preferably 30 mol %, more preferably 15 mol %, and still more preferably 10 mol %. When the resin composition of the layer A has the structural unit represented by the above formula (I) and/or (II) at a proportion falling within the above range, flexibility and processing characteristics of the resin composition constituting the layer A are improved, and consequently, enables the stretchability and thermoformability of the multilayered structure to be improved.

In the structural units (I) and (II), the aliphatic hydrocarbon group having 1 to 10 carbon atoms is exemplified by an alkyl group, an alkenyl group and the like, the alicyclic hydrocarbon group having 3 to 10 carbon atoms is exemplified by a cycloalkyl group, a cycloalkenyl group and the like, and the aromatic hydrocarbon group having 6 to 10 carbon atoms is exemplified by a phenyl group, and the like.

In the structural unit (I), it is preferred that the $R^1$, $R^2$ and $R^3$ each independently represent a hydrogen atom, a methyl group, an ethyl group, a hydroxyl group, a hydroxymethyl group or a hydroxyethyl group. Among these, it is more preferred that they each independently represent a hydrogen atom, a methyl group, a hydroxyl group or a hydroxymethyl group. When the $R^1$, $R^2$ and $R^3$ each represent these options, stretchability and thermoformability of the multilayered structure can be further improved.

Although the method for allowing EVOH to include the structural unit (I) is not particularly limited, for example, a method in which a monomer derived into the structural unit (I) is copolymerized in polymerization of the ethylene and vinyl ester may be involved. The monomer derived into the structural unit (I) is exemplified by alkene such as propylene, butylene, pentene and hexene; alkene having a hydroxyl group and/or an ester group such as 3-hydroxy-1-propene, 3-acyloxy-1-propene, 3-acyloxy-1-butene, 4-acyloxy-1-butene, 3,4-diacyloxy-1-butene, 3-acyloxy-4-hydroxy-1-butene, 4-acyloxy-3-hydroxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-hydroxy-1-pentene, 5-hydroxy-1-pentene, 4,5-dihydroxy-1-pentene, 4-acyloxy-1-pentene, 5-acyloxy-1-pentene, 4,5-diacyloxy-1-pentene, 4-hydroxy-3-methyl-1-pentene, 5-hydroxy-3-methyl-1-pentene, 4,5-dihydroxy-3-methyl-1-pentene, 5,6-dihydroxy-1-hexene, 4-hydroxy-1-hexene, 5-hydroxy-1-hexene, 6-hydroxy-1-hexene, 4-acyloxy-1-hexene, 5-acyloxy-1-hexene, 6-acyloxy-1-hexene and 5,6-diacyloxy-1-hexene. Of these, in light of reactivity for copolymerization, and gas barrier properties of the resulting multilayered structure, propylene, 3-acyloxy-1-propene, 3-acyloxy-1-butene, 4-acyloxy-1-butene, and 3,4-diacetoxy-1-butene are preferred. Specifically, among these, propylene, 3-acetoxy-1-propene, 3-acetoxy-1-butene, 4-acetoxy-1-butene, and 3,4-diacetoxy-1-butene are preferred, and of these, 3,4-diacetoxy-1-butene is particularly preferred. In the case of the alkene having an ester, it is derived into the structural unit (I) during the saponification reaction.

In the above structural unit (II), it is preferred that $R^4$ and $R^5$ both represent a hydrogen atom. Particularly, it is more preferred that $R^4$ and $R^5$ both represent a hydrogen atom, one of the $R^6$ and $R^7$ represents an aliphatic hydrocarbon group having 1 to 10 carbon atoms, and the rest represents a hydrogen atom. The aliphatic hydrocarbon group is preferably an alkyl group or an alkenyl group. In light of particular note taken for the gas barrier properties of the multilayered structure, it is particularly preferred that one of the $R^6$ and $R^7$ represents a methyl group or an ethyl group, and the rest represents a hydrogen atom. Alternatively, it is also particularly preferred that one of the $R^6$ and $R^7$ represents a substituent represented by $(CH_2)_hOH$ (wherein, h is an integer of 1 to 8), and the rest represents a hydrogen atom. In the substituent represented by $(CH_2)_hOH$, h is preferably an integer of 1 to 4, more preferably 1 or 2, and particularly preferably 1.

Although the method for allowing EVOH to include the structural unit (II) is not particularly limited, for example, a method in which EVOH obtained by a saponification reaction is allowed to react with a monovalent epoxy compound to permit the EVOH to include the structural unit (II) may be employed. As the monovalent epoxy compound, a compound represented by any of the following formulae (III) to (IX) is suitably used.

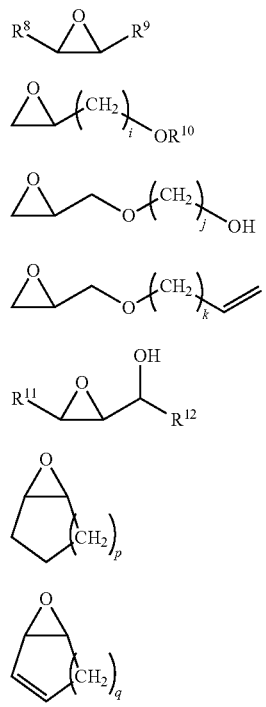

In the above formula (III) to (IX), $R^8$, $R^9$, $R^{10}$, $R^{11}$ and $R^{12}$ each independently represent a hydrogen atom, an aliphatic hydrocarbon group having 1 to 10 carbon atoms such as an alkyl group or an alkenyl group, an alicyclic hydrocarbon group having 3 to 10 carbon atoms such as a cycloalkyl group or a cycloalkenyl group, or an aliphatic hydrocarbon group having 6 to 10 carbon atoms such as a phenyl group; and i, j, k, p and q represent an integer of 1 to 8.

Examples of the monovalent epoxy compound represented by the above formula (III) include epoxyethane (ethylene oxide), epoxypropane, 1,2-epoxybutane, 2,3-epoxybutane, 3-methyl-1,2-epoxybutane, 1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 3-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-ethyl-1,2-epoxyheptane, 4-propyl-1,2-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 5-ethyl-1,2-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 4,5-epoxyundecane, 5,6-epoxyundecane, 1,2-epoxidedecane, 2,3-epoxidedecane, 3,4-epoxidedecane, 4,5-epoxidedecane, 5,6-epoxidedecane, 6,7-epoxidedecane, epoxyethylbenzene, 1-phenyl-1,2-propane, 3-phenyl-1,2-epoxypropane, 1-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, and the like.

Examples of the monovalent epoxy compound represented by the above formula (IV) include methylglycidyl ether, ethylglycidyl ether, n-propylglycidyl ether, isopropyl glycidyl ether, n-butylglycidyl ether, isobutyl glycidyl ether, tert-butylglycidyl ether, 1,2-epoxy-3-pentyloxypropane, 1,2-epoxy-3-hexyloxypropane, 1,2-epoxy-3-heptyloxypropane, 1,2-epoxy-4-phenoxybutane, 1,2-epoxy-4-benzyloxybutane, 1,2-epoxy-5-methoxypentane, 1,2-epoxy-5-ethoxypentane, 1,2-epoxy-5-propoxypentane, 1,2-epoxy-5-butoxypentane, 1,2-epoxy-5-pentyloxypentane, 1,2-epoxy-5-hexyloxypentane, 1,2-epoxy-5-phenoxypentane, 1,2-epoxy-6-methoxyhexane, 1,2-epoxy-6-ethoxyhexane, 1,2-epoxy-6-propoxyhexane, 1,2-epoxy-6-butoxyhexane, 1,2-epoxy-6-heptyloxyhexane, 1,2-epoxy-7-methoxyheptane, 1,2-epoxy-7-ethoxyheptane, 1,2-epoxy-7-propoxyheptane, 1,2-epoxy-7-butoxyheptane, 1,2-epoxy-8-methoxyoctane, 1,2-epoxy-8-ethoxyoctane, 1,2-epoxy-8-butoxyoctane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, and the like.

Examples of the monovalent epoxy compound represented by the above formula (V) include ethylene glycol monoglycidyl ether, propanediol monoglycidyl ether, butanediol monoglycidyl ether, pentanediol monoglycidyl ether, hexanediol monoglycidyl ether, heptanediol monoglycidyl ether, octanediol monoglycidyl ether, and the like.

Examples of the monovalent epoxy compound represented by the above formula (VI) include 3-(2,3-epoxy)propoxy-1-propene, 4-(2,3-epoxy)propoxy-1-butene, 5-(2,3-epoxy)propoxy-1-pentene, 6-(2,3-epoxy)propoxy-1-hexene, 7-(2,3-epoxy)propoxy-1-heptene, 8-(2,3-epoxy)propoxy-1-octene, and the like.

Examples of the monovalent epoxy compound represented by the above formula (VII) include 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-4-ethyl-1-hexanol, 3,4-epoxy-5-methyl-2-hexanol, 3,4-epoxy-5,5-dimethyl-2-hexanol, 3,4-epoxy-2-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-2-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-4-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, and the like.

Examples of the monovalent epoxy compound represented by the above formula (VIII) include 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycycloundecane, 1,2-epoxycyclododecane, and the like.

Examples of the monovalent epoxy compound represented by the above formula (IX) include 3,4-epoxycyclopentene, 3,4-epoxycyclohexene, 3,4-epoxycycloheptene, 3,4-epoxycyclooctene, 3,4-epoxycyclononene, 1,2-epoxycyclodecene, 1,2-epoxycycloundecene, 1,2-epoxycyclododecene, and the like.

Among the aforementioned monovalent epoxy compounds, epoxy compounds having 2 to 8 carbon atoms are preferred. Particularly, in light of easy handling of the compound, and reactivity with EVOH, the monovalent epoxy compound has carbon atoms of more preferably 2 to 6, and still more preferably 2 to 4. Also, among the monovalent epoxy compounds represented by the above formula, compounds represented by the formula (III) or (IV) are particularly preferred. Specifically, in light of reactivity with EVOH and gas barrier properties of the resultant multilayered structure, 1,2-epoxybutane, 2,3-epoxybutane, epoxypropane, epoxyethane and glycidol are preferred, and of these, epoxypropane and glycidol are particularly preferred. In applications for which aspects of good hygiene are demanded such as food packaging applications, beverage packaging applications and medical drug packaging applications, 1,2-epoxybutane, 2,3-epoxybutane, epoxypropane, or epoxyethane is preferably used as the epoxy compound, and epoxypropane is particularly preferably used.

Next, a method for producing EVOH is explained in detail. A method for copolymerization of ethylene and a vinyl ester is not particularly limited, and for example any one of solution polymerization, suspension polymerization, emulsion polymerization, bulk polymerization may be employed. Further, either continuous, or batch-wise system may be adopted.

The vinyl ester which may be used for the polymerization is a fatty acid vinyl ester such as vinyl acetate, vinyl propionate, vinyl pivalate.

In the polymerization, further to the aforementioned components, a copolymerizable monomer, for example, other than those described in the foregoing, an alkene; unsaturated acid such as acrylic acid, methacrylic acid, crotonic acid, maleic acid or itaconic acid, or an anhydride, salt, or mono or dialkyl ester thereof; nitrile such as acrylonitrile or methacrylonitrile; amide such as acrylamide or methacryl amide; olefin sulfonic acid such as vinylsulfonic acid, allyl sulfonic acid or methallyl sulfonic acid, or a salt thereof; alkylvinyl ethers, vinylketone, N-vinylpyrrolidone, vinyl chloride, vinylidene chloride and the like may be copolymerized as a copolymerization component in a small amount. In addition, as a copolymerization component, a vinylsilane compound may be included in an amount of no less than 0.0002 mol and no greater than 0.2 mol %. Examples of the vinylsilane compound include vinyltrimethoxysilane, vinyltriethoxysilane, vinyltri(β-methoxy-ethoxy)silane, γ-methacryloyloxypropylmethoxysilane, and the like. Of these, vinyltrimethoxysilane or vinyltriethoxysilane may be suitably used.

The solvent which may be used for the polymerization is not particularly limited as long as it is an organic solvent which can dissolve ethylene, vinyl ester and the ethylene-vinyl ester copolymer. As such a solvent, for example, alcohol such as methanol, ethanol, propanol, n-butanol or tert-butanol; dimethyl sulfoxide, or the like may be used. Of these, methanol is particularly preferred in terms of ease in separation and removal after the reaction.

As the catalyst for use in the polymerization, for example, an azonitrile based initiator such as 2,2-azobisisobutyronitrile, 2,2-azobis-(2,4-dimethylvaleronitrile), 2,2-azobis-(4-methoxy-2,4-dimethylvaleronitrile) or 2,2-azobis-(2-cyclopropyl propionitrile); an organic peroxide based initiator such as isobutyryl peroxide, cumyl peroxyneodecanoate, diisopropylperoxycarbonate, di-n-propylperoxydicarbonate, t-butylperoxyneodecanoate, lauroylperoxide, benzoylperoxide or t-butylhydroperoxide, or the like may be used.

The polymerization temperature is 20 to 90° C., and preferably 40 to 70° C. The polymerization time is 2 to 15 hrs, and preferably 3 to 11 hrs. The degree of polymerization is 10 to 90%, and preferably 30 to 80% with respect to the vinyl ester charged. The resin content in the solution after the polymerization is 5 to 85%, and preferably 20 to 70%.

After the polymerization for a predetermined period of time or after reaching to a predetermined degree of polymerization, a polymerization inhibitor is added as needed, and unreacted ethylene gas is eliminated by evaporation, followed by removal of unreacted vinyl ester. In an exemplary method which may be employed for removing unreacted vinyl ester, for example, the copolymer solution is continuously supplied at a constant speed from above a tower packed with Raschig rings, while steam of an organic solvent such as methanol is blown into the bottom of the tower, a mixed steam of the organic solvent such as methanol and the unreacted vinyl ester is distilled off from the top of the tower, whereas the copolymer solution from which the unreacted vinyl ester was eliminated is recovered from the bottom of the tower.

Next, an alkali catalyst is added to the copolymer solution, and the copolymer is saponified. The saponification method may be executed by either a continuous or batchwise system. Examples of the alkali catalyst include sodium hydroxide, potassium hydroxide, alkali metal alcoholate, and the like.

Conditions of saponification involve, for example in the case of a batchwise system, the copolymer solution concentration of 10 to 50%, the reaction temperature of 30 to 65° C., the catalyst amount used of 0.02 to 1.0 mol per mol of the vinyl ester structural unit, and the saponification time of 1 to 6 hrs.

Since EVOH after the saponification reaction contains the alkali catalyst, by-product salts such as sodium acetate and potassium acetate, and other impurities, these are preferably eliminated as needed by neutralization and washing. In this process, when EVOH after the saponification reaction is washed with water such as ion exchanged water, which is almost free from metal ions, chloride ions and the like, a part of sodium acetate, potassium acetate and the like may remain.

The resin composition constituting the layer A may contain one or a plurality of types of compounds selected from a phosphate compound, a carboxylic acid and a boron compound depending on the mode for carrying out the invention. When such a phosphate compound, a carboxylic acid or a boron compound is contained in the resin composition of the layer A, various types of performance of the multilayered structure can be improved.

Specifically, when a phosphate compound is contained in the resin composition of the layer A containing EVOH and the like, thermal stability of the multilayered structure during melt forming can be improved. The phosphate compound is not particularly limited, and is exemplified by various types of acids such as phosphoric acid and phosphorous acid, and salts thereof, and the like. Phosphate may be included in any form such as, for example, primary phosphate, secondary phosphate or tertiary phosphate, and its counter cation species is not particularly limited, which is preferably an alkali metal ion or an alkaline earth metal ion. Particularly, sodium dihydrogenphosphate, potassium dihydrogenphosphate, sodium hydrogenphosphate or potassium hydrogenphosphate is preferred in light of excellent effects of improving thermal stability.

The lower limit of the content of the phosphate compound (the content of the phosphate compound in terms of the phosphoric acid group equivalent in the dry resin composition of the layer A) is preferably 1 ppm, more preferably 10 ppm, and still more preferably 30 ppm. On the other hand, the upper limit of the content of the phosphate compound is preferably 10,000 ppm, more preferably 1,000 ppm, and still more preferably 300 ppm. When the content of the phosphate compound is less than the lower limit described above, coloring during melt forming tends to be significant. Since this tendency is remarkable when heat history is repeated in particular, a product obtained by forming a pellet of the resin composition may lack probability of recovery. To the contrary, when the content of the phosphate compound is beyond the upper limit described above, the product formed may easily generate gel and seeds.

In addition, the carboxylic acid included in the resin composition of the layer A containing EVOH and the like is effective in controlling the pH of the resin composition, and preventing gelation to improve the thermal stability. Carboxylic acid is preferably acetic acid or lactic acid in light of costs and the like.

The lower limit of the content of the carboxylic acid (the content of the carboxylic acid in the dry resin composition of the layer A) is preferably 1 ppm, more preferably 10 ppm, and still more preferably 50 ppm. On the other hand, the upper limit of the content of the carboxylic acid is preferably 10,000 ppm, more preferably 1,000 ppm, and still more preferably 500 ppm. When the content of the carboxylic acid is less than the lower limit described above, coloring may occur during the melt forming. To the contrary, the content of the carboxylic acid is beyond the upper limit described above, the interlayer adhesiveness may be insufficient.

Furthermore, the boron compound included in the resin composition of the layer A containing EVOH or the like is effective in improving thermal stability. In detail, when the boron compound is added to the resin composition constituted with EVOH, it is believed that a chelate compound is produced between EVOH and the boron compound. Thus, use of such EVOH enables more superior thermal stability to be achieved than common EVOH, and mechanical properties to be improved. The boron compound is not particularly limited, and examples include boric acids, boric acid esters, boric acid salts, boron hydrides, and the like. Specifically, boric acids are exemplified by ortho-boric acid ($H_3BO_3$), meta-boric acid, tetraboric acid and the like; boric acid ester are exemplified by triethyl borate, trimethyl borate and the like; boric acid salts are exemplified by alkali metal salts, alkaline earth metal salts and borax of the various types of boric acids described above and the like. Of these, ortho-boric acid is preferred.

The lower limit of the content of the boron compound (the content of the boron compound equivalent to boron in the dry resin composition of the layer A) is preferably 1 ppm, more preferably 10 ppm, and still more preferably 50 ppm. On the other hand, the upper limit of the content of the boron compound is preferably 2,000 ppm, more preferably 1,000 ppm, and still more preferably 500 ppm. When the content of the boron compound is less than the lower limit described above, the effect of improving thermal stability by adding the boron compound may not be achieved. To the contrary, when the content of the boron compound is beyond the upper limit described above, gelation is likely to occur, and forming defectiveness may be caused.

A process for including the phosphate compound, carboxylic acid or boron compound in the resin composition containing EVOH is not particularly limited, and for example, a process in which the phosphate compound is added to the resin composition when a pellet or the like of resin composition containing EVOH is prepared, followed by kneading may be suitably employed. A process for adding to the resin composition is not also particularly limited, and illustrative examples include a process of adding in a form of a dry powder, a process of adding in a paste form impregnated with a solvent, a process of adding in a form suspended in a liquid, a process of adding as a solution dissolved in a solvent, and the like. Of these, in light of allowing for homogenously dispersion, a process of adding as a solution dissolved in a solvent is preferred. The solvent used in these methods is not particularly limited, and water is suitably used in light of solubility of additives, advantages in terms of costs, ease in handling, safety operational environments, and the like. When thus added, a metal salt, a resin other than EVOH and other additives and the like described later may be concomitantly added.

Moreover, as a process for including the phosphate compound, carboxylic acid, boron compound, a process of immersing a pellet or strand obtained with an extruder or the like after the aforementioned saponification in a solution containing these substance dissolved is also preferred in light of enabling homogenously dispersion. Also in this process, water is suitably used as a solvent for similar reasons to those described above. By dissolving a metal salt described later to this solution, the metal salt and the phosphate compound and the like may be contained together with.

The resin composition of the layer A preferably contains a compound that has a conjugated double bond having a molecular weight of no greater than 1,000. Due to including such a compound, the hue of the resin composition of the layer A s improved; therefore, a multilayered structure having a favorable appearance can be produced. Examples of such a compound include conjugated diene compounds having a structure in which at least two carbon-carbon double bonds and one carbon-carbon single bond are alternately linked, triene compounds having a structure in which three carbon-carbon double bonds and two carbon-carbon single bonds are alternately linked, conjugated polyene compounds having a structure in which more carbon-carbon double bonds and carbon-carbon single bonds are alternately linked, conjugated triene compounds such as 2,4,6-octatriene, and the like. Furthermore, in the compound that has a conjugated double bond, a plurality of conjugated double bonds may be present independently in one molecule, and for example, a compound in which three conjugated trienes are included in the same molecule, such as wood oil, may be also involved.

Examples of the compound that has a conjugated double bond may have, for example, any of other various types of functional groups such as a carboxyl group and salts thereof, a hydroxyl group, an ester group, a carbonyl group, an ether group, an amino group, an imino group, an amide group, a cyano group, a diazo group, a nitro group, a sulfone group, a sulfoxide group, a sulfide group, a thiol group, a sulfonic acid group and salts thereof, a phosphoric acid group and salts thereof, a phenyl group, a halogen atom, a double bond, a triple bond, and the like. Such a functional group may be directly bound to a carbon atom in the conjugated double bond, or may be bound to a position away from the conjugated double bond. A multiple bond in the functional group may be present at a position capable of conjugating with the conjugated double bond, and for example, 1-phenylbutadiene having a phenyl group, and sorbic acid having a carboxyl group and the like are also included in the compound that has a conjugated double bond as referred to herein. Specific examples of the compound include 2,4-diphenyl-4-methyl-1-pentene, 1,3-diphenyl-1-butene, 2,3-dimethyl-1,3-butadiene, 4-methyl-1,3-pentadiene, 1-phenyl-1,3-butadiene, sorbic acid, myrcene, and the like.

The conjugated double bond in the compound that has a conjugated double bond includes not only a conjugated double bond between aliphatic moieties such as 2,3-dimethyl-1,3-butadiene or sorbic acid, but also a conjugated double bond between aliphatic and aromatic moieties such as 2,4-diphenyl-4-methyl-1-pentene or 1,3-diphenyl-1-butene. Note that in light of possibility to obtain a multilayered structure having more superior appearance, the compound that includes a conjugated double bond between aliphatic moieties is preferred, and a compound that includes a conjugated double bond having a polar group such as a carboxyl group or a salt thereof, or a hydroxyl group is also preferred. Moreover, a compound that includes a conjugated double bond between aliphatic moieties and having a polar group is particularly preferred.

The molecular weight of the compound that has a conjugated double bond is preferably no greater than 1,000. When the molecular weight is greater than 1,000, surface smoothness, extrusion stability and the like of the multilayered structure may be deteriorated. The lower limit of the content of the compound that has a conjugated double bond having a molecular weight of no greater than 1,000 is, in light of achievable effects, preferably 0.1 ppm, more preferably 1 ppm, still more preferably 3 ppm, and particularly preferably 5 ppm. On the other hand, the upper limit of the content of the compound is, in light of achievable effects, preferably 3,000 ppm, more preferably 2,000 ppm, still more preferably 1,500 ppm, and particularly preferably 1,000 ppm. A preferable process of adding the compound that has a conjugated double bond may include, in the case of EVOH for example, polymerizing as described above, followed by adding the compound prior to the saponification described above, in light of the improvement of the surface smoothness and extrusion stability. Although the reason is not necessarily clarified, the compound that has a conjugated double bond is believed to serve in preventing EVOH from deterioration before the saponification and/or during the saponification reaction.

The resin composition of the layer A may contain in addition to the aforementioned additives, a resin other than the gas barrier resin, or various additives such as a heat stabilizer, an ultraviolet ray absorbing agent, an antioxidant, a colorant and a filler in the range not to impair the object of the present invention. When the resin composition of the layer A contains such additives other than the additives described above, the amount is preferably no greater than 50% by mass, more preferably no greater than 30% by mass, and particularly preferably no greater than 10% by mass with respect to the total amount of the resin composition.

It is preferred that the resin composition of the layer A has a melt viscosity ($\eta_{1A}$) as determined at a temperature of 210° C. and a shear rate of 10/sec being no less than $1\times10^2$ Pa·s and no greater than $1\times10^4$ Pa·s and a melt viscosity ($\eta_{2A}$) as determined at a temperature of 210° C. and a shear rate of 1,000/sec being no less than $1\times10^1$ Pa·s and no greater than $1\times10^3$ Pa·s, and a ratio ($\eta_{2A}/\eta_{1A}$) of the melt viscosity satisfies the following formula (1A):

$$-0.8 \leq (1/2)\log_{10}(\eta_{2A}/\eta_{1A}) \leq -0.1 \quad (1A).$$

It is to be noted that suitable ranges according to the melt viscosities ($\eta_{1A}$) and ($\eta_{2A}$) and the ratio ($\eta_{2A}/\eta_{1A}$) of the melt viscosity can be particularly suitably applied when the gas barrier resin contained in the resin composition of the layer A is EVOH, or when the resin composition of the layer A has a Vicat softening temperature of less than 180° C.

When the melt viscosity ($\eta_{1A}$) is less than $1\times10^2$ Pa·s, neck-in and shaking of the film may be significant in film formation by extrusion such as lamination with melt coextrusion or melt extrusion, thereby enhancing thickness variation and width reduction of the obtained multilayered structure and the layer A before the lamination, and thus it may be impossible to obtain a multilayered structure that is uniform and has a size intended. To the contrary, when the melt viscosity ($\eta_{1A}$) is beyond $1\times10^4$ Pa·s, film cleavage becomes likely to occur and high-speed film formability is remarkably deteriorated particularly in the case in which lamination with melt coextrusion or formation with melt extrusion is carried out under conditions with taking up at high speed exceeding 100 m/min, and die swelling becomes likely to occur, whereby obtaining a thin multilayered structure or layer A before the lamination may be difficult.

In addition, when the melt viscosity ($\eta_{2A}$) is less than $1\times10^1$ Pa·s, neck-in and shaking of the film in film formation by extrusion such as lamination with melt coextrusion or melt extrusion may be significant, thereby enhancing thickness variation and width reduction of the obtained multilayered structure and the layer A before the lamination. To the contrary, when the melt viscosity ($\eta_{2A}$) is beyond $1\times10^3$ Pa·s, a torque applied to the extruder becomes too high, and thus extrusion patch and weld line may be likely to be generated.

When a value $(1/2)\log_{10}(\eta_{2A}/\eta_{1A})$ calculated from the ratio ($\eta_{2A}/\eta_{1A}$) of the melt viscosity is less than −0.8, film cleavage is likely to occur in film formation by extrusion such as lamination with melt coextrusion or melt extrusion, whereby high-speed film formability may be deteriorated. On the other hand, when the value $(1/2)\log_{10}(\eta_{2A}/\eta_{1A})$ is beyond −0.1, neck-in and shaking of the film occur in film formation by extrusion such as lamination with melt coextrusion or melt extrusion, whereby thickness variation and width reduction may occur in the obtained multilayered structure and the layer A before the lamination. In these regards, the value of (1/2) $\log_{10}(\eta_{2A}'/\eta_{1A}')$ is more preferably no less than −0.6, and still more preferably no greater than −0.2. It is to be noted that the value (1/2) $\log_{10}(\eta_{2A}'/\eta_{1A}')$ in the above formula is determined in a natural double-logarithmic graph of the melt viscosity along the ordinate with respect to the shear rate along the abscissa, as a slope of a line drawn by connecting two points of the melt viscosity ($\eta_{1A}'$) and the melt viscosity ($\eta_{2A}'$). Also, values of the melt viscosity ($\eta_{1A}'$) and melt viscosity ($\eta_{2A}'$) as referred to herein are determined by a method described in the Examples below.

In addition, at a temperature higher than a Vicat softening temperature of the resin composition of the layer A or the layer B, preferably the layer A by 30° C., it is preferred that a melt viscosity ($\eta_{1A}'$) of the resin composition of the layer A as determined at a shear rate of 10/sec be no less than $1 \times 10^2$ Pa·s and no greater than $1 \times 10^4$ Pa·s, and a melt viscosity ($\eta_{2A}'$) thereof as determined at a shear rate of 1,000/sec be no less than $1 \times 10^1$ Pa·s and no greater than $1 \times 10^2$ Pa·s, and that the ratio ($\eta_{2A}'/\eta_{1A}'$) of the melt viscosity satisfies the following formula (1A'):

$$-0.8 \leq (1/2)\log_{10}(\eta_{2A}'/\eta_{1A}') \leq -0.1 \qquad (1A').$$

It is to be noted that the suitable range of the melt viscosities ($\eta_{1A}'$) and ($\eta_{2A}'$), and the ratio ($\eta_{2A}'/\eta_{1A}'$) of the melt viscosity can be particularly preferably applied to a case in which the gas barrier resin included in the resin composition of the layer A is a resin other than EVOH, and a Vicat softening temperature of the resin composition of the layer A or layer B is no less than 180° C.

When the melt viscosity ($\eta_{1A}'$) is less tan $1 \times 10^2$ Pa·s, neck-in and shaking of the film may be significant in film formation by extrusion such as lamination with melt coextrusion or melt extrusion, thereby enhancing thickness variation and width reduction of the obtained multilayered structure and the layer A before the lamination, and thus it may be impossible to obtain a multilayered structure that is uniform and has a size intended. To the contrary, when melt viscosity ($\eta_{1A}'$) is beyond $1 \times 10^4$ Pa·s, film cleavage becomes likely to occur and high-speed film formability is remarkably deteriorated particularly in the case in which lamination with melt coextrusion or formation with melt extrusion is carried out under conditions with taking up at high speed exceeding 100 m/min, and die swelling becomes likely to occur, whereby obtaining a thin multilayered structure or layer A before the lamination may be difficult.

In addition, when the melt viscosity ($\eta_{2A}'$) is less than $1 \times 10^1$ Pa·s, neck-in and shaking of the film in film formation by extrusion such as lamination with melt coextrusion or melt extrusion may be significant, thereby enhancing thickness variation and width reduction of the obtained multilayered structure and the layer A before the lamination. To the contrary, when the melt viscosity ($\eta_{2A}'$) is beyond $1 \times 10^3$ Pa·s, a torque applied to the extruder becomes too high, and thus extrusion patch and weld line may be likely to be generated.

When a value (1/2) $\log_{10}(\eta_{2A}'/\eta_{1A}')$ calculated from the ratio ($\eta_{2A}'/\eta_{1A}'$) of the melt viscosity is less than −0.8, film cleavage is likely to occur in film formation by extrusion such as lamination with melt coextrusion or melt extrusion, whereby high-speed film formability may be deteriorated. On the other hand, when the value (1/2) $\log_{10}(\eta_{2A}'/\eta_{1A}')$ is beyond −0.1, neck-in and shaking of the film occur in film formation by extrusion such as lamination with melt coextrusion or melt extrusion, whereby thickness variation and width reduction may occur in the obtained multilayered structure and the layer A before the lamination. In these regards, the value of (1/2) $\log_n(\eta_{2A}'/\eta_{1A}')$ is more preferably no less than −0.6, and still more preferably no greater than −0.2. It is to be noted that the value (1/2) $\log_{10}(\eta_{2A}'/\eta_{1A}')$ in the above formula is determined in a natural double-logarithmic graph of the melt viscosity along the ordinate with respect to the shear rate along the abscissa, as a slope of a line drawn by connecting two points of the melt viscosity ($\eta_{1A}'$) and the melt viscosity ($\eta_{2A}'$). Also, values of the melt viscosity ($\eta_{1A}'$) and melt viscosity ($\eta_{2A}'$) as referred to herein are determined by a method described in the Examples below.

Further, when the resin has a high melting point, it is also preferred that the resin composition of the layer A has a melt viscosity ($\eta_{1A}''$) at a temperature of 220° C. and a shear rate of 10/sec being no less than $1 \times 10^2$ Pa·s and no greater than $1 \times 10^4$ Pa·s, and a melt viscosity ($\eta_{2A}''$) as determined at a temperature of 220° C. and a shear rate of 1,000/sec being no less than $1 \times 10^1$ Pa·s and no greater than $1 \times 10^3$ Pa·s, and that the ratio ($\eta_{2A}''/\eta_{1A}''$) of the melt viscosity satisfies the following formula (1A''):

$$-0.8 \leq (1/2)\log_{10}(\eta_{2A}''/\eta_{1A}'') \leq -0.1 \qquad (1A'').$$

When the melt viscosity ($\eta_{1A}''$) is less than $1 \times 10^2$ Pa·s, neck-in and shaking of the film may be significant in film formation by extrusion such as lamination with melt coextrusion or melt extrusion, thereby enhancing thickness variation and width reduction of the obtained multilayered structure and the layer A before the lamination, and thus it may be impossible to obtain a multilayered structure that is uniform and has a size intended. To the contrary, when the melt viscosity ($\eta_{1A}''$) is beyond $1 \times 10^4$ Pa·s, film cleavage becomes likely to occur and high-speed film formability is remarkably deteriorated particularly in the case in which lamination with melt coextrusion or formation with melt extrusion is carried out under conditions with taking up at high speed exceeding 100 m/min, and die swelling becomes likely to occur, whereby obtaining a thin multilayered structure or layer A before the lamination may be difficult.

In addition, when the melt viscosity ($\eta_{2A}''$) is less than $1 \times 10^1$ Pa·s, neck-in and shaking of the film in film formation by extrusion such as lamination with melt coextrusion or melt extrusion may be significant, thereby enhancing thickness variation and width reduction of the obtained multilayered structure and the layer A before the lamination. To the contrary, when the melt viscosity ($\eta_{2A}''$) is beyond $1 \times 10^3$ Pa·s, a torque applied to the extruder becomes too high, and thus extrusion patch and weld line may be likely to be generated.

When a value (1/2) $\log_{10}(\eta_{2A}''/\eta_{1A}'')$ calculated from the ratio ($\eta_{2A}''/\eta_{1A}''$) of the melt viscosity is less than −0.8, film cleavage is likely to occur in film formation by extrusion such as lamination with melt coextrusion or melt extrusion, whereby high-speed film formability may be deteriorated. On the other hand, when the value (1/2) $\log_{10}(\eta_{2A}''/\eta_{1A}'')$ is beyond −0.1, neck-in and shaking of the film occur in film formation by extrusion such as lamination with melt coextrusion or melt extrusion, whereby thickness variation and width reduction may occur in the obtained multilayered structure and the layer A before the lamination. In these regards, the value of (1/2) $\log_{10}(\eta_{2A}''/\eta_{1A}'')$ is more preferably no less than −0.6, and still more preferably no greater than −0.2. It is to be noted that the value (1/2) $\log_{10}(\eta_{2A}''/\eta_{1A}'')$ in the above formula is determined in a natural double-logarithmic graph of the melt viscosity along the ordinate with respect to the shear rate along the abscissa, as a slope of a line drawn by connecting two points of the melt viscosity ($\eta_{1A}''$) and the melt viscosity ($\eta_{2A}''$). Also, values of the melt viscosity ($\eta_{1.4}"$) and melt viscosity ($\eta_{2.4}"$) as referred to herein are determined by a method described in the Examples below.

The resin composition of the layer A preferably has, in connection with a relationship between the melt kneading time and the torque at at least one point of a temperature that is higher than its melting point by 10 to 80° C., a value of viscosity behavioral stability ($M_{100}/M_{20}$, wherein $M_{20}$ represents a torque no, determined 20 min after starting kneading, and $M_{100}$ represents a torque determined 100 min after starting kneading) falling within the range of 0.5 to 1.5. As the value of the viscosity behavioral stability is approximate to 1, superior thermal stability (long run property) is indicated, with less change in the viscosity.

<Layer B>

The layer B is constituted with a resin composition containing a thermoplastic resin. Since the layer B constituted with a resin composition containing a thermoplastic resin is laminated, the multilayered structure can have improved stretchability and thermoformability. In addition, since the multilayered structure can enhance the interlayer adhesiveness between the layer B and the layer A, high durability can be provided, and gas barrier properties and stretchability can be maintained even if used with deformation.

The thermoplastic resin is not particularly limited as long as it is a resin that is softened to exhibit plasticity by heating to a glass transition temperature or a melting point, and is preferably at least one resin selected from the group consisting of thermoplastic polyurethane (hereinafter, may be also referred to as "TPU".), polyamide, and an adhesive resin having a functional group capable of reacting with a group included in the gas barrier resin in the molecule (hereinafter, may be also merely referred to as "adhesive resin"). According to the multilayered structure, use of a thermoplastic resin as the resin enabled interlayer adhesiveness and the like to be further enhanced.

<TPU>

TPU is constituted with a high molecular polyol, an organic polyisocyanate, a chain extender and the like. This high molecular polyol is a substance having a plurality of hydroxyl groups, and may be obtained by polycondensation, addition polymerization (for example, ring-opening polymerization), polyaddition, or the like. Examples of the high molecular polyol include polyester polyol, polyether polyol, polycarbonate polyol, cocondensates thereof (for example, polyester-ether-polyol), and the like. These high molecular polyol may be used either alone of one type, or as a mixture of two types thereof. Of these, due to having a carbonyl group that reacts with a hydroxyl group or the like of the gas barrier resin in the layer A, thereby capable of enhancing the interlayer adhesiveness of the multilayered structure obtained, polyester polyol or polycarbonate polyol is preferred, and polyester polyol is particularly preferred.

The polyester polyol may be produced, for example, according to a conventional method, by allowing a dicarboxylic acid, an ester thereof or an ester formable derivative such as an anhydride thereof to be condensed with a low molecular polyol by way of a direct esterification reaction or a transesterification reaction, or by subjecting lactone to ring-opening polymerization.

The dicarboxylic acid that constitutes the dicarboxylic acid polyester polyol is not particularly limited, and generally employed dicarboxylic acid in producing a polyester may be used. Specific examples of the dicarboxylic acid include aliphatic dicarboxylic acids having 4 to 12 carbon atoms such as succinic acid, glutaric acid, adipic acid, pimelic acid, suberic acid, azelaic acid, sebacic acid, dodecanedioic acid, methylsuccinic acid, 2-methylglutaric acid, trimethyladipic acid, 2-methyloctanedioic acid, 3,8-dimethyldecanedioic acid and 3,7-dimethyldecanedioic acid; alicyclic dicarboxylic acids such as cyclohexanedicarboxylic acid; aromatic dicarboxylic acids such as terephthalic acid, isophthalic acid, orthophthalic acid and naphthalenedicarboxylic acid, and the like. These dicarboxylic acids may be used either alone of one type, or as a mixture of two types thereof. Of these, due to having a carbonyl group that can be more readily reacted with a hydroxyl group and the like of the gas barrier resin in the layer A, and further enhancing the interlayer adhesiveness of the multilayered structure, aliphatic dicarboxylic acids having 6 to 12 carbon atoms are preferred, and adipic acid, azelaic acid or sebacic acid is particularly preferred.

The low molecular polyol that constitutes the polyester polyol is not particularly limited, and generally employed polyester polyol in producing a polyester may be used. Specific examples of the low molecular polyol include aliphatic diols having 2 to 15 carbon atoms such as ethylene glycol, diethylene glycol, triethylene glycol, propylene glycol, 1,3-propanediol, 2-methyl-1,3-propanediol, 1,3-butylene glycol, 1,4-butanediol, neopentyl glycol, 1,5-pentanediol, 3-methyl-1,5-pentanediol, 1,6-hexanediol, 1,8-octanediol, 2-methyl-1,8-octanediol, 2,7-dimethyl-1,8-octanediol, 1,9-nonanediol, 2-methyl-1,9-nonanediol, 1,10-decanediol and 2,2-diethyl-1,3-propanediol; alicyclic diols such as 1,4-cyclohexanediol, cyclohexanedimethanol, cyclooctanedimethanol and dimethylcyclooctanedimethanol; aromatic bivalent alcohols such as 1,4-bis(β-hydroxyethoxy)benzene, and the like. These low molecular polyols may be used either alone of one type, or as a mixture of two types thereof. Among these, aliphatic diols having 5 to 12 carbon atoms and having a methyl group on the side chain such as 3-methyl-1,5-pentanediol, 2-methyl-1,8-octanediol, 2,7-dimethyl-1,8-octanediol, 1,9-nonanediol and 2,8-dimethyl-1,9-nonanediol are preferred in terms of ease of occurrence of the reaction of the ester group in the polyester polyol with a hydroxyl group and the like of the gas barrier resin in the layer A, and the like, and possibility of providing more superior interlayer adhesiveness of the multilayered structure obtained. In addition, when two or more types of the low molecular polyols are used as a mixture, it is more preferred that such an aliphatic diol having 5 to 12 carbon atoms and having a methyl group on the side chain is used in a proportion of no less than 50 mol with respect to the total amount of the low molecular polyol. Furthermore, together with the low molecular polyol, a small amount of low molecular polyol having three or more functionalities may be used in combination. Examples of the low molecular polyol having three or more functionalities include trimethylolpropane, trimethylolethane, glycerin, 1,2,6-hexanetriol, and the like.

Examples of the lactone include ε-caprolactone, β-methyl-δ-valerolactone, and the like.

Examples of the polyether polyol include polyethylene glycol, polypropylene glycol, polytetramethylene glycol, poly(methyltetramethylene) glycol, and the like. These polyether polyols may be used either alone of one type, or as a mixture of two types thereof. Among these, polytetramethylene glycol is preferred.

As the polycarbonate polyol, for example, a product obtained by condensation polymerization of aliphatic diol having 2 to 12 carbon atoms such as 1,4-butanediol, 1,5-pentanediol, 1,6-hexanediol, 1,8-octanediol or 1,10-decanediol, or a mixture of these with diphenyl carbonate or phosgene may be suitably used.

The lower limit of the number average molecular weight of the high molecular polyol is preferably 500, more preferably 600, and still more preferably 700. On the other hand, the upper limit of the number average molecular weight of the high molecular polyol is preferably 8,000, more preferably 5,000, and still more preferably 3,000. When the number average molecular weight of the high molecular polyol is less than the lower limit described above, miscibility with organic polyisocyanate is so high that the resulting TPU has inferior resilience, whereby dynamic characteristics such as stretchability and thermoformability of the multilayered structure obtained may be deteriorated. To the contrary, when the number average molecular weight of the high molecular polyol is beyond the upper limit described above, miscibility with organic polyisocyanate is so low that mixing in the polymerization procedure may be difficult, and as a result, stable production of TPU may fail resulting from generation of blocks of gelatinous matter, and the like. It is to be noted that the number average molecular weight of the high molecular polyol is determined in accordance with JIS-K-1577, which is a number average molecular weight calculated on the basis of the hydroxyl value.

The organic polyisocyanate is not particularly limit, and well-known organic diisocyanate generally employed in producing TPU may be used. Examples of the organic diisocyanate include aromatic diisocyanate such as 4,4'-diphenylmethanediisocyanate, tolylenediisocyanate, phenylenediisocyanate, xylylenediisocyanate, 1,5-naphthylene diisocyanate, 3,3'-dichloro-4,4'-diphenyl methanediisocyanate and toluoylenediisocyanate; aliphatic or alicyclic diisocyanate such as hexamethylenediisocyanate, isophoronediisocyanate, 4,4'-dicyclohexylmethanediisocyanate and xylylenediisocyanate hydride, and the like. Among these, in light of possibility of improving the strength and flex resistance of the multilayered structure obtained, 4,4'-diphenylmethanediisocyanate is preferred. These organic diisocyanate may be used either one type alone, or in combination of two or more types thereof.

As the chain extender, any chain extender generally employed for producing TPU may be used, and a low molecular compound having two or more active hydrogen atoms that can react with an isocyanate group in the molecule and having a molecular weight of no greater than 300 is suitably used. Examples of the chain extender include diols such as ethylene glycol, propylene glycol, 1,4-butanediol, 1,6-hexanediol, 1,4-bis(β-hydroxyethoxy)benzene, 1,4-cyclohexanediol, bis (β-hydroxyethyl)terephthalate and xylylene glycol, and the like. Among these, in light of stretchability and thermoformability of the multilayered structure obtained being more favorable, aliphatic diol having 2 to 10 carbon atoms is preferred, and 1,4-butanediol is particularly preferred. These chain extenders may be used either alone of one type, or as a mixture of two types thereof.

In a method for producing TPU, the aforementioned high molecular polyol, organic polyisocyanate and chain extender are used for producing TPU utilizing a well-known urethanating reaction technique, and any of a prepolymer method and a one-shot method may be used for the production. Of these, melt polymerization carried out under a condition substantially free from a solvent is preferred, and continuous melt polymerization carried out using a multiscrew extruder is particularly preferred.

In TPU, it is preferred that a ratio (isocyanate/(high molecular polyol+chain extender)) of the mass of the organic polyisocyanate to the total mass of the high molecular polyol and the chain extender be no greater than 1.02. When the ratio is beyond 1.02, stability in long-term operation during forming may be deteriorated.

The nitrogen content of TPU may be determined by appropriately selecting the ratio of the high molecular polyol and the organic diisocyanate employed, the content practically falls within the range of 1 to 7%. In addition, for the resin composition of the layer B, an adequate catalyst for accelerating the reaction of the organic polyisocyanate and the high molecular polyol may be used if necessary.

The hardness of TPU is, in terms of Shore A hardness, preferably 50 to 95, more preferably 55 to 90, and still more preferably 60 to 85. Use of TPU having a hardness falling within the above range is preferred, since a laminated structure that is superior in mechanical strength and durability, and has excellent flexibility is obtained.

<Polyamide>

Polyamide is a polymer having an amide group in the main chain, and is obtained by polycondensation of at least three-membered lactam, polymerizable ω-amino acid or dibasic acid with diamine, or the like. Specific examples of the polyamide are polycapramide (nylon 6), poly-ω-aminoheptanoic acid (nylon 7), poly-ω-aminononanoic acid (nylon 9), polyundecaneamide (nylon 11), polylauryllactam (nylon 12), polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), as well as a caprolactam/lauryllactam copolymer (nylon 6/12), a caprolactam/ω-aminononanoic acid copolymer (nylon 6/9), a caprolactam/hexamethylenediammonium adipate copolymer (nylon 6/66), a lauryllactam/hexamethylenediammonium adipate copolymer (nylon 12/66), a hexamethylenediammonium adipate/hexamethylenediammonium sebacate copolymer (nylon 66/610), an ethylenediammonium adipate/hexamethylenediammonium adipate copolymer (nylon 26/66), a caprolactam/hexamethylenediammonium adipate/hexamethylenediammonium sebacate copolymer (nylon 6/66/610), polyhexamethylene isophthalamide (nylon 6I), polyhexamethylene telephthalamide (nylon 6T), a hexamethylene isophthalamide/telephthalamide copolymer (nylon 6I/6T), and the like.

Additionally, in the foregoing polyamide, aliphatic diamine having a substituent introduced thereto such as 2,2,4- or 2,4,4-trimethylhexamethylenediamine, or aromatic diamine such as methylene dibenzylamine or m-xylylenediamine may be used as the diamine. Alternatively, modification of polyamide may be executed using the same. Also, aliphatic dicarboxylic acid having a substituent introduced thereto such as 2,2,4- or 2,4,4-trimethyladipic acid, alicyclic dicarboxylic acid such as 1,4-cyclohexanedicarboxylic acid, or aromatic dicarboxylic acid such as phthalic acid, xylylenedicarboxylic acid, alkyl-substituted terephthalic acid, isophthalic acid or naphthalenedicarboxylic acid may be used as the dicarboxylic acid, Alternatively, modification of polyamide may be executed using the same.

As the polyamide, one type or a plurality of types thereof may be used. Among the polyamide, in light of superior interlayer adhesiveness of the multilayered structure since the amide group in the polyamide is more likely to react with a hydroxyl group of the gas barrier resin in the layer A and the like, a hexamethyleneisophthalamide/telephthalamide copolymer (nylon 6I/6T) is preferred. In the hexamethyleneisophthalamide/telephthalamide copolymer, a molar ratio (I/T) of isophthalic acid (I) unit/terephthalic acid (T) unit falls within the range of preferably 60/40 to 100/0 (molar ratio), and more preferably 65/35 to 90/10 (molar ratio). Furthermore, the polyamide is preferably a caprolactam/lauryllactam copolymer, i.e., the polyamide containing nylon 6/12 as a principal component is also preferred. Although the proportion of the nylon 6 component (caprolactam component) and the nylon 12 component (lauryllactam component) included in the polyamide is not particularly limited, the proportion of the nylon 12 component with respect to the total mass of the polyamide is preferably 5 to 60% by mass, and more preferably 5 to 50% by mass. Also, relative viscosity of the polyamide is not particularly limited; however, in light of additional enhancement of the adhesive force between the layer A and the layer B in the multilayered structure obtained, the relative viscosity is preferably 1.0 to 4.0.

Moreover, of the polyamide, aliphatic polyamide is preferred in light of flexibility.

The lower limit of the amount of terminal carboxyl groups of the polyamide is preferably 1 µeq (equivalent)/g, more preferably 3 µeq/g, and still more preferably 5 µeq/g. On the other hand, the upper limit of the amount of the terminal carboxyl groups is preferably 1000 µeq/g, more preferably 800 µeq/g, and still more preferably 600 µeq/g. By setting the amount of the terminal carboxyl groups to fall within the above range, the hydroxyl group of the gas barrier resin in the layer A and the like can react with not only the amide group of the polyamide in the layer B but also the terminal carboxyl group, thereby enabling the layer A and the layer B to be more rigidly bonded, and thus the interlayer adhesiveness of the multilayered structure can be further improved. When the amount of the terminal carboxyl groups is less than the lower limit described above, the interlayer adhesiveness of the multilayered structure may be deteriorated. To the contrary, when the amount of the terminal carboxyl groups is beyond the upper limit described above, weather resistance of the multilayered structure may be deteriorated. It is to be noted that the amount of terminal carboxyl groups of the polyamide can be quantitatively determined by dissolving a polyamide sample in benzyl alcohol and titrating with a sodium hydroxide solution using phenolphthalein as an indicator.

<Adhesive Resin>

The adhesive resin has a functional group capable of reacting with a group included in the gas barrier resin in the molecule. Examples of the group included in the gas barrier resin include a hydroxyl group included in EVOH, etc., an amide group included in the polyamide resin, etc., an ester group included in the polyester resin, and the like. According to the multilayered structure that includes the laminated layer B constituted with a resin composition containing the adhesive resin, stretchability and thermoformability can be improved. In addition, since a binding reaction occurs at the interface between the layer B and the layer A, thereby capable of enhancing the interlayer adhesiveness in the multilayered structure, superior durability is provided, and gas barrier properties and stretchability can be maintained even if used with deformation.

The functional group capable of reacting with the group included in the gas barrier resin contained in the layer A is not particularly limited as long as it can react with a group included in the gas barrier resin, and illustrative examples include a carboxyl group or an anhydride group thereof, a metal carboxylate group, a boronic acid group, a boron-containing group that can be converted into a boronic acid group in the presence of water, an ester group, an urea group, a carbonate group, an ether group, an imino group, an acetal group, an epoxy group, an isocyanate group, and the like. Of these, in light of extremely superior interlayer adhesiveness between the layer A and the layer B, and particularly excellent durability of the multilayered structure obtained, a carboxyl group, a metal carboxylate group, a boronic acid group, a boron-containing group that can be converted into a boronic acid group in the presence of water, and an ester group are preferred.

The adhesive resin is exemplified by carboxylic acid-modified polyolefin or a metal salt thereof, a thermoplastic resin having a boronic acid group or a boron-containing group that can be converted into a boronic acid group in the presence of water, a vinyl ester based copolymer, a polyester based resin, an acrylic resin, a butyral based resin, an alkyd resin, a polyethylene oxide resin, a cellulose based resin, a melamine based resin, a styrene-acrylate copolymer, a phenol based resin, a urea resin, a melamine-alkyd resin, an epoxy resin, a polyisocyanate resin, and the like. Alternatively, a modified product of such a resin or a copolymer may be also used. In particular, in terms of significant enhancement of the interlayer adhesiveness, and particularly superior durability of the multilayered structure obtained, and also in terms of improvement of the stretchability and thermoformability thereof, carboxylic acid-modified polyolefin or a metal salt thereof, a thermoplastic resin having a boronic acid group or a boron-containing group that can be converted into a boronic acid group in the presence of water, or a vinyl ester based copolymer is preferred, and carboxylic acid-modified polyolefin is particularly preferred. As the adhesive resin, one type or a plurality of types thereof may be used.

The carboxylic acid-modified polyolefin is a polyolefin having a carboxyl group or an anhydride group thereof in the molecule. In the metal salt of carboxylic acid-modified polyolefin, all or a part of carboxyl groups or anhydride groups thereof included in polyolefin, or polyolefin having a carboxyl group or an anhydride group thereof in the molecule are present in the form of a metal carboxylate group. Such carboxylic acid-modified polyolefins or metal salts thereof may be used of one type or a plurality of types.

The carboxylic acid-modified polyolefin may be obtained by, for example, allowing an olefin based polymer to be chemically bound (for example, by addition reaction, or graft reaction) to ethylenic unsaturated carboxylic acid or an anhydride thereof, or allowing olefin and an unsaturated carboxylic acid or an anhydride thereof, etc., to be copolymerized. Moreover, the metal salt of carboxylic acid-modified polyolefin may be obtained by, for example, substituting all or a part of carboxyl groups included in the carboxylic acid-modified polyolefin with a metal ion.

When the carboxylic acid-modified polyolefin is obtained by allowing an olefin based polymer to be chemically bound to ethylenic unsaturated carboxylic acid or an anhydride thereof, the olefin based polymer is exemplified by polyolefin such as polyethylene (low pressure, medium pressure, high pressure), linear low-density polyethylene, polypropylene or polybutene; a copolymer of olefin with a comonomer that is copolymerizable with the olefin (vinyl acetate, unsaturated carboxylate ester, etc.), for example, an ethylene-vinyl acetate copolymer, an ethylene-acrylic acid ethyl ester copolymer, and the like. Of these, in light of significant improvement of the interlayer adhesiveness, stretchability and thermoformability in the multilayered structure obtained, linear low-density polyethylene, an ethylene-vinyl acetate copolymer (content of vinyl acetate: 5 to 55% by mass), or an ethylene-acrylic acid ethyl ester copolymer (content of ethyl ester acrylate: 8 to 35% by mass) is preferred, and linear low-density polyethylene or an ethylene-vinyl acetate copolymer (content of vinyl acetate: 5 to 55% by mass) is particularly preferred.

Also, the ethylenic unsaturated carboxylic acid or an anhydride thereof to be chemically bound to the olefin based polymer is exemplified by ethylenic unsaturated monocarboxylic acid, ethylenic unsaturated dicarboxylic acid or an anhydride thereof, and the like. Alternatively, a compound derived from such carboxylic acid by esterification of all or a part of carboxyl groups may be also used, and the carboxylic acid-modified polyolefin may be obtained by hydrolysis of the ester group after completing the polymerization. Specific examples of these compounds include maleic acid, fumaric acid, itaconic acid, maleic anhydride, itaconic acid anhydride, maleic acid monomethyl ester, maleic acid monoethyl ester, maleic acid diethyl ester, fumaric acid monomethyl ester, and the like. Of these, due to having an acid anhydride group that can readily react with a hydroxyl group of EVOH, etc., that constitutes the layer A, and the multilayered structure obtained having superior interlayer adhesiveness, ethylenic unsaturated dicarboxylic acid anhydride is particularly preferred, and as a specific compound, maleic anhydride is particularly preferred.

The lower limit value of amount of addition or the yield of grafting (degree of modification) of the ethylenic unsaturated carboxylic acid or an anhydride thereof to the olefin based polymer is preferably 0.01% by mass, and more preferably 0.02% by mass with respect to the olefin based polymer. On the other hand, the upper limit value of the amount of addition or the yield of grafting (degree of modification) is preferably 15% by mass, and more preferably 10% by mass. When the amount of addition or the yield of grafting is less than the lower limit described above, the interlayer adhesiveness may be inferior, and thus the durability of the multilayered structure may be deteriorated. To the contrary, when the amount of addition or the yield of grafting is beyond the upper limit described above, coloring of the resin composition may be significant, whereby the appearance of the multilayered structure may be deteriorated.

In a method for allowing the ethylenic unsaturated carboxylic acid or an anhydride thereof to be chemically bound to the olefin based polymer by an addition reaction or a graft reaction, for example, a radical reaction is allowed in the presence of a solvent (xylene, etc.), and a catalyst (peroxide, etc.), and the like.

Also, when the carboxylic acid-modified polyolefin is obtained by copolymerization of olefin with an unsaturated carboxylic acid or the like, i.e., in the case in which the carboxylic acid-modified polyolefin is an olefin-unsaturated carboxylic acid copolymer, the olefin used is, in light of improvement of the stretchability and thermoformability of the multilayered structure obtained, α-olefin such as ethylene, propylene or 1-butene is preferred, and ethylene is particularly preferred. On the other hand, the unsaturated carboxylic acid used is exemplified by acrylic acid, methacrylic acid, ethacrylic acid, maleic acid, monomethyl maleate, monoethyl maleate, maleic anhydride, and the like. Of these, in light of being easily available, acrylic acid or methacrylic acid is particularly preferred. Also, the olefin-unsaturated carboxylic acid copolymer may contain other monomer except for the olefin and unsaturated carboxylic acid as a copolymerization component. Illustrative examples of such other monomer include vinyl esters such as vinyl acetate and vinyl propionate; unsaturated carboxylate esters such as methyl acrylate, ethyl acrylate, isopropyl acrylate, isobutyl acrylate, n-butyl acrylate, 2-ethylhexyl acrylate, methyl methacrylate, isobutyl methacrylate and diethyl maleate; carbon monoxide, and the like.

The lower limit value of the content of the unsaturated carboxylic acid units in the olefin-unsaturated carboxylic acid copolymer is preferably 2 mol %, and still more preferably 3 mol % in terms of the content of the unsaturated carboxylic acid unit with respect to all the structural units in the copolymer. On the other hand, the upper limit value of the content of the unsaturated carboxylic acid unit is preferably 15 mol %, and still more preferably 12 mol %. When the content of the unsaturated carboxylic acid unit is less than the lower limit described above, the interlayer adhesiveness may be inferior, and thus the durability of the multilayered structure may be deteriorated. To the contrary, when the content of the unsaturated carboxylic acid unit is beyond the upper limit described above, coloring of the resin composition may be significant, whereby the appearance of the multilayered structure may be deteriorated.

The olefin-unsaturated carboxylic acid copolymer is preferably a polymer obtained by allowing for random copolymerization of olefin and unsaturated carboxylic acid or an anhydride thereof. In particular, a polymer obtained by allowing for random copolymerization of ethylene and unsaturated carboxylic acid or an anhydride thereof is further preferred.

Illustrative examples of the metal ion for constituting the metal salt of the carboxylic acid-modified polyolefin include alkali metal ions such as lithium, sodium and potassium; alkaline earth metal ions such as magnesium and calcium; d-block metal ions such as zinc, and the like. Degree of neutralization of the metal salt of the carboxylic acid-modified polyolefin, i.e., proportion of metal carboxylate groups in the metal salt of the carboxylic acid-modified polyolefin with respect to the total number of the carboxyl groups and metal carboxylate groups is not particularly limited, but the lower limit value of the degree of neutralization is preferably 5 mol %, more preferably 10 mol %, and still more preferably 30 mol %. On the other hand, the upper limit value of degree of neutralization is preferably 90 mol %, more preferably 80 mol %, and still more preferably 70 mol %. When the degree of neutralization is less than the lower limit described above, the interlayer adhesiveness may be inferior, and thus the durability of the multilayered structure may be deteriorated. To the contrary, degree of neutralization is beyond the upper limit described above, coloring of the resin composition may be significant, whereby the appearance of the multilayered structure may be deteriorated.

The lower limit value of the melt flow rate (MFR) (190° C., under a load of 2160 g) of the carboxylic acid-modified polyolefin or a metal salt thereof is preferably 0.05 g/10 min, more preferably 0.2 g/10 min, and still more preferably 0.5 g/10 min. On the other hand, the upper limit value of the melt flow rate is preferably 50 g/10 min, more preferably 40 g/10 min, and still more preferably 30 g/10 min.

The thermoplastic resin having a boronic acid group or a boron-containing group that can be converted into a boronic acid group in the presence of water (hereinafter, may be also referred to as "boronic acid-derivable group") is a thermoplastic resin having a boronic acid group represented by the following formula (X) in the molecule, or having a boron-containing group that can be converted into a boronic acid group in the molecule.

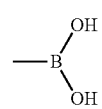

(X)

The boron-containing group that can be converted into a boronic acid group in the presence of water is not particularly limited as long as it is a boron-containing group that can be converted into a boronic acid group in the presence of water through being subjected to hydrolysis, and examples thereof include boronic acid ester groups represented by the following formula (XI), boronic acid anhydride groups represented by the following formula (XII), boronic acid base represented by the following formula (XIII), and the like. In this regard, the boron-containing group that can be converted into a boronic acid group in the presence of water means a group that can be converted into a boronic acid group when subjected to hydrolysis in water, a mixed liquid of water and an organic solvent (toluene, xylene, acetone, etc.), or a mixed liquid of 5% aqueous boric acid solution and the aforementioned organic solvent, under conditions involving a reaction time period of 10 min to 2 hrs, and a reaction temperature of from room temperature to 150° C.

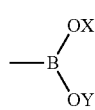
(XI)

In the above formula (XI), X and Y represent a hydrogen atom, an aliphatic hydrocarbon group (a linear or branched alkyl group or an alkenyl group having 1 to 20 carbon atoms, etc.), an alicyclic hydrocarbon group (a cycloalkyl group or a cycloalkenyl group, etc.), or an aromatic hydrocarbon group (a phenyl group or a biphenyl group, etc.); X and Y may be the same or different; X and Y may be linked, unless at least one of X and Y represents a hydrogen atom; and wherein, the aliphatic hydrocarbon group, the alicyclic hydrocarbon group or the aromatic hydrocarbon group may have other group such as e.g., a hydroxyl group, a carboxyl group or a halogen atom or the like.

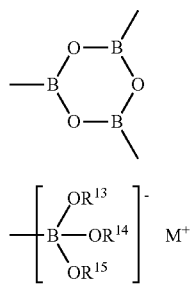

In the above formula (XIII), $R^{13}$, $R^{14}$ and $R^{15}$ each independently represent a hydrogen atom, an aliphatic hydrocarbon group (a linear or branched alkyl group or an alkenyl group having 1 to 20 carbon atoms, etc.), an alicyclic hydrocarbon group (a cycloalkyl group or a cycloalkenyl group, etc.), an aromatic hydrocarbon group (a phenyl group or a biphenyl group, etc.); $R^{13}$, $R^{14}$ and $R^{15}$ may be the same or different; M represents an alkali metal or an alkaline earth metal; and wherein, the aliphatic hydrocarbon group, the alicyclic hydrocarbon group or the aromatic hydrocarbon group other group such as e.g., a hydroxyl group, a carboxyl group, a halogen atom or the like.

Specific examples of the boronic acid ester group represented by the above formula (XI) include a boronic acid dimethyl ester group, a boronic acid diethyl ester group, a boronic acid dibutyl ester group, a boronic acid dicyclohexyl group, a boronic acid ethylene glycol ester group, a boronic acid propylene glycol ester group (a boronic acid 1,2-propanediol ester group, a boronic acid 1,3-propanediol ester group), a boronic acid neopentyl ester group, a boronic acid catechol ester group, a boronic acid glycerin ester group, a boronic acid trimethylolethane ester group, a boronic acid diethanolamine ester group, and the like. Further, specific examples of the boronic acid base represented by the above formula (XIII) include boronic acid sodium base, boronic acid potassium base, boronic acid calcium base, and the like.

The content of the boronic acid-derivable group in the thermoplastic resin is not particularly limited, but in light of enhancement of the interlayer adhesiveness in the multilayered structure, the lower limit value of the content of the boronic acid-derivable group with respect to the entire constitutional units of the polymer that constitutes the thermoplastic resin is preferably 0.0001 meq (equivalent)/g, and more preferably 0.001 meq/g. On the other hand, the upper limit value of the content of the boronic acid-derivable group is preferably 1 meq/g, and more preferably 0.1 meq/g. When the content of the boronic acid-derivable group is less than the lower limit described above, the interlayer adhesiveness may be inferior, and thus the durability of the multilayered structure may be deteriorated. To the contrary, when the content of the boronic acid-derivable group is beyond the upper limit described above, coloring of the resin composition may be significant, whereby the appearance of the multilayered structure may be deteriorated.

Examples of suitable base polymer of the thermoplastic resin having a boronic acid-derivable group include olefin based polymers such as polyethylene (ultralow density, low density, medium density, high density), an ethylene-methyl acrylate copolymer, an ethylene-ethyl acrylate copolymer, an ethylene-vinyl acetate copolymer, polypropylene and an ethylene-propylene copolymer; styrene based polymers such as hydrogenated products of polystyrene, a styrene-acrylonitrile copolymer, a styrene-acrylonitrile-butadiene copolymer and a styrene-diene based block copolymer(hydrogenated products of a styrene-isoprene-block copolymer, a styrene-butadiene copolymer, a styrene-isoprene-styrene block copolymer, etc.); (meth)acrylic acid ester based polymers such as polymethyl acrylate, polyethyl acrylate and polymethyl methacrylate; vinyl halide based polymers such as polyvinyl chloride and polyvinylidene fluoride; semiaromatic polyesters such as polyethylene terephthalate and polybutylene terephthalate; aliphatic polyesters such as polyvalerolactone, polycaprolactone, polyethylene succinate and polybutylene succinate, and the like.

The melt flow rate (MFR) (value as measured at 230° C., under a load of 2160 g) of the thermoplastic resin having a boronic acid-derivable group is preferably 0.01 to 500 g/10 min, and more preferably 0.1 to 50 g/10 min. Such thermoplastic resins having a boronic acid-derivable group may be used of one type or a plurality of types thereof.

Next, a typical method for producing the thermoplastic resin having a boronic acid-derivable group is explained. In a first production method, the olefin based polymer having a boronic acid-derivable group is obtained by allowing a borane complex and a boric acid trialkyl ester to react with an olefin based polymer having a carbon-carbon double bond in a nitrogen atmosphere to give an olefin based polymer having a boronic acid dialkyl ester group, followed by allowing to react with water or an alcohol. In this production method, if an olefin based polymer having a double bond at the terminus is used as a basic material, an olefin based polymer having a boronic acid-derivable group at the terminus is obtained. Alternatively, when olefin based polymer having a double bond in the side chain and the main chain is used as a basic material, an olefin based polymer having a boronic acid-derivable group in the side chain is principally obtained.

Typical production examples of the olefin based polymer having a double bond that is a basic material include: 1) a method in which a common olefin based polymer is used, and double bonds present at the terminus in a slight amount is utilized; 2) a method in which a common olefin based polymer is subjected to thermal decomposition under oxygen free conditions to obtain an olefin based polymer having a double bond at the terminus; and 3) a method in which an olefin based polymer having a double bond is obtained by copolymerization of an olefin based monomer and a diene based monomer. In connection with the method 1), a process for producing a well-known olefin based polymer may be employed, but a production method by way of a Phillips process, or a production method in which a metallocene based polymerization catalyst is used as a polymerization catalyst without using hydrogen as a chain transfer agent (for example, DE 4030399) is preferred. In connection with the method 2), a olefin based polymer can be obtained according to a well-known process (for example, see U.S. Pat. Nos. 2,835,659 and 3,087,922) by subjecting to thermal decomposition under oxygen free conditions such as in a nitrogen atmosphere or under a vacuum condition, at a temperature of 300 to 500° C. In connection with the method 3), a production method (for example, see Japanese Unexamined Patent Application, Publication No. S50-44281, DE3021273) of an olefin-diene based copolymer using a well-known Ziegler type catalyst may be employed.

The borane complex which may be used in the foregoing is preferably a borane-tetrahydrofuran complex, a borane-dimethyl sulfide complex, a borane-pyridine complex, a borane-trimethylamine complex, a borane-triethylamine complex, and the like. Among these, a borane-dimethyl sulfide complex, a borane-trimethylamine complex and a borane-triethylamine complex are more preferred. The amount of the borane complex charged for the reaction preferably falls within the range of ⅓ equivalent to 10 equivalent with respect to the total number of double bonds of the olefin based polymer. In addition, the boric acid trialkyl ester is preferably a boric acid lower alkyl ester such as trimethyl borate, triethyl borate, tripropyl borate or tributyl borate. The amount of the boric acid trialkyl ester charged for the reaction preferably falls within the range of 1 equivalent to 100 equivalent with respect to the total number of double bonds of the olefin based polymer. Although a solvent may not be used in particular, in the case in which a solvent is used, a saturated hydrocarbon based solvent such as hexane, heptane, octane, decane, dodecane, cyclohexane, ethylcyclohexane or decalin is preferred.

The reaction temperature of the reaction carried out with the borane complex or boric acid trialkyl ester and the olefin based polymer is usually from room temperature to 300° C., preferably 100 to 250° C. Also, the reaction time is usually 1 min to 10 hrs, and preferably 5 min to 5 hrs.

In the conditions of the reaction of the olefin based polymer having a boronic acid dialkyl ester group obtained as described above with water or an alcohol, in general, an organic solvent such as toluene, xylene, acetone or ethyl acetate is used as a reaction solvent, and water; a monovalent alcohol such as methanol, ethanol or butanol; or a polyhydric alcohol such as ethylene glycol, 1,2-propanediol, 1,3-propanediol, 1,3-butanediol, neopentyl glycol, glycerin, trimethylolmethane, pentaerythritol or dipentaerythritol is allowed to react in an amount of 1 to 100 equivalent or more significantly excessive amount with respect to the boronic acid dialkyl ester group.

In a second production method of the thermoplastic resin having a boronic acid-derivable group, the olefin based polymer having a boronic acid-derivable group at the terminus is obtained by subjecting at least one selected from an olefin based monomer, a vinyl based monomer or a diene based monomer to radical polymerization in the presence of thiol having a boronic acid-derivable group.

The thiol having a boronic acid-derivable group that is a basic material can be obtained by allowing a diborane or borane complex to react with a thiol having a double bond in a nitrogen atmosphere, followed by adding an alcohol or water. In this procedure, the thiol having a double bond is exemplified by 2-propene-1-thiol, 2-methyl-2-propene-1-thiol, 3-butene-1-thiol, 4-pentene-1-thiol, and the like. Of these, 2-propene-1-thiol or 2-methyl-2-propene-1-thiol is preferred. The borane complex used herein may be similar one to those described above, and of these, a borane-tetrahydrofuran complex or a borane-dimethyl sulfide complex is particularly preferably used. The amount of the diborane or borane complex added is preferably about 1 equivalent with respect to thiol having a double bond. In the reaction conditions, the temperature is preferably from room temperature to 200° C. The solvent is exemplified by ether type solvents such as tetrahydrofuran (THF) and diglyme; saturated hydrocarbon type solvents such as hexane, heptane, ethylcyclohexane and decalin, and the like, and of these, tetrahydrofuran is preferred. An alcohol added after completing the reaction is preferably a lower alcohol having 1 to 6 carbon atoms such as methanol or ethanol, and particularly, methanol is preferred.

At least one selected from an olefin based monomer, a vinyl based monomer and a diene based monomer is subjected to radical polymerization in the presence of the thiol having a boronic acid-derivable group thus obtained to obtain a polymer having a boronic acid-derivable group at the terminus. For the polymerization, an azo based or peroxide based initiator is commonly used. The polymerization temperature preferably falls within the range of from room temperature to 150° C. The amount of the thiol having a boronic acid-derivable group added is preferably about 0.001 mmol to 1 mmol per gram of the monomer. Although a preferable process of adding thiol is not particularly limited, but when a monomer that is likely to conduct chain transfer such as vinyl acetate or styrene is used, the thiol is preferably fed in the polymerization system during the polymerization, whereas when a monomer that hardly conducts chain transfer such as methyl methacrylate is used, the thiol is preferably charged beforehand in the polymerization system.

In a third production method of the thermoplastic resin having a boronic acid-derivable group, the thermoplastic resin having a boronic acid-derivable group in the side chain is obtained by allowing a monomer having a boronic acid-derivable group to be copolymerized with the at least one monomer selected from an olefin based monomer, a vinyl based monomer and a diene based monomer. Examples of the monomer having a boronic acid-derivable group in this procedure include 3-acryloylaminobenzeneboronic acid, 3-acryloylaminobenzeneboronic acid ethylene glycol ester, 3-methacryloylaminobenzeneboronic acid, 3-methacryloylaminobenzeneboronic acid ethylene glycol ester, 4-vinylphenylboronic acid, 4-vinylphenylboronic acid ethylene glycol ester, and the like.

Alternatively, the thermoplastic resin having a boronic acid-derivable group in the side chain may be obtained by, for example, producing a random copolymer or a graft copolymer of unsaturated carboxylic acid such as acrylic acid, methacrylic acid, itaconic acid, citraconic acid, fumaric acid, or maleic anhydride with the at least one monomer selected from an olefin based monomer, a vinyl based monomer and a diene based monomer, and subjecting carboxyl groups contained in the polymer to an amidation reaction with amino group-containing boronic acid or an amino group-containing boronic acid ester such as m-aminophenylbenzeneboronic acid or a m-aminophenylboronic acid ethylene glycol ester, with or without using a condensation agent such as carbodiimide.

The vinyl ester based copolymer is a copolymer including at least 30 mol % or more vinyl ester units with respect to the entire structural units that constitute the copolymer. When the proportion of the vinyl ester unit in the copolymer is less than 30 mol %, the interlayer adhesiveness of the multilayered structure may be deteriorated. The vinyl ester is exemplified by fatty acid vinyl esters such as vinyl acetate, vinyl formate, vinyl propionate and vinyl pivalate. Of these, in light of being easily available, vinyl acetate is particularly preferred. In addition, illustrative examples of the copolymerization component that can be copolymerized with the vinyl ester in the vinyl ester based copolymer include olefins such as ethylene and propylene; styrenes such as styrene and p-methylstyrene; halogen-containing olefins such as vinyl chloride; (meth) acryl esters such as methyl acrylate, ethyl acrylate, methyl methacrylate, ethyl methacrylate and butyl methacrylate; dienes such as butadiene and isoprene; unsaturated nitriles such as acrylonitrile, and the like. These copolymerization components may be used of one type or a plurality of types thereof. Glass transition point (Tg) of the vinyl ester copolymer can be adjusted by changing the type and amount of the copolymerization component. Specific illustrative examples of the vinyl ester based copolymer include an ethylene-vinyl acetate copolymer, a propylene-vinyl acetate copolymer, a vinyl chloride-vinyl acetate copolymer, a methyl acrylate-vinyl acetate copolymer, an acrylonitrile-vinyl acetate copolymer, and the like. Among these, in light of especial improvement of the interlayer adhesiveness, stretchability and thermoformability of the multilayered structure obtained, an ethylene-vinyl acetate copolymer is particularly preferred.

The aforementioned adhesive resin blended with other resin may be also used as the resin composition of the layer B. By blending with other resin, the content of functional groups included in the resin composition of the layer B can be regulated, and physical properties such as thermal stability, melt viscosity and adhesiveness with the layer A, and the like can be controlled.

It is necessary that such other resin has a feature of capable of forming a laminate, and polyolefin is exemplified as a preferable resin. In particular, when the adhesive resin is obtained by modification, the other resin preferably has a monomer unit which is the same as the monomer unit of an unmodified adhesive resin. In other words, when, for example, the aforementioned carboxylic acid-modified polyolefin is used as the adhesive resin, unmodified polyolefin thereof is preferably used as the other resin (for example, use of a blend of maleic anhydride-modified linear low-density polyethylene and unmodified linear low-density polyethylene, etc.). The ratio of the adhesive resin and the other resin may be selected ad libitum to meet performances required, and the mass ratio of the adhesive resin/other resin is preferably 2/98 to 40/60.

Furthermore, in order to improve the moisture resistance of the multilayered structure, to include an alicyclic olefin polymer in the resin composition of the layer B as other resin is also preferred. When an alicyclic olefin polymer is included in the resin composition of the layer B, the mass ratio of the adhesive resin/alicyclic olefin polymer is preferably 2/98 to 40/60, and more preferably 5/95 to 30/70.

The alicyclic olefin polymer is a polymer having a repeating unit that includes an alicyclic structure. The alicyclic structure is preferably a saturated cyclic hydrocarbon (cycloalkane) structure, an unsaturated cyclic hydrocarbon (cycloalkene) structure and the like, in light of the mechanical strength, heat resistance, etc., and a cycloalkane structure or a cycloalkene structure is preferred, and a cycloalkane structure is most preferred of these. Although the alicyclic structure may be present in either the main chain or the side chain, in light of the mechanical strength, heat resistance, etc., the alicyclic structure is preferably included in the main chain. The number of carbon atoms composing the alicyclic structure is not particularly limited, but when the number falls within the range of usually 4 to 30, preferably 5 to 20, and more preferably 5 to 15, characteristic features such as mechanical strength, heat resistance, and formability of the resin-layer, etc. can be highly balanced.

The alicyclic olefin polymer may involve an alicyclic olefin homopolymer and copolymer, and a derivative of the same (hydrogenated product, etc.). Also, the polymerization process may involve either addition polymerization or ring-opening polymerization.

Examples of the alicyclic olefin polymer include ring-opened polymers of a monomer having a norbornene ring (hereinafter, may be also referred to as norbornene monomer) and hydrogenated products thereof, addition polymers of a norbornene monomer, addition copolymers of a norbornene monomer and a vinyl compound, monocyclic cycloalkene addition polymers, alicyclic conjugated diene polymers, vinyl based alicyclic hydrocarbon polymers and hydrogenated products thereof, and the like. Furthermore, polymers having an alicyclic structure formed by hydrogenation after polymerization, thereby leading to include a structure equivalent to an alicyclic olefin polymer, such as aromatic ring-hydrogenated products of an aromatic olefin polymer, are also involved. The polymerization process of alicyclic olefin, and the process of hydrogenation carried out as needed are not particularly limited, and may be carried out according to a well-known method.

In addition, the alicyclic olefin polymer also includes polymers having a polar group. The polar group is exemplified by a hydroxyl group, a carboxyl group, an alkoxyl group, an epoxy group, a glycidyl group, an oxycarbonyl group, a carbonyl group, an amino group, an ester group, a carboxylic anhydride group and the like, and particularly, a carboxyl group and a carboxylic anhydride group are suitable. Although the method for obtaining an alicyclic olefin polymer having a polar group is not particularly limited, and may include, for example, (i) a method in which an alicyclic olefin monomer having a polar group is subjected to homopolymerization or copolymerization with other monomer; (ii) a method in which graft polymerization of an alicyclic olefin polymer not having a polar group is permitted with a carbon-carbon unsaturated bond-containing compound having a polar group, for example, in the presence of a radical initiator to introduce a polar group; and the like.

The alicyclic olefin monomer having a polar group which may be used in the method (i) is exemplified by carboxyl group-containing alicyclic olefin monomers such as 8-hydroxycarbonyltetracyclo[4.4.0.1$^{2,5}$.1$^{7,10}$]dodeca-3-ene, 5-hydroxycarbonylbicyclo[2.2.1]hept-2-ene, 5-methyl-5-hydroxycarbonylbicyclo[2.2.1]hept-2-ene, 5-carboxymethyl-5-hydroxycarbonylbicyclo[2.2.1]hept-2-ene, 8-methyl-8-hydroxycarbonyltetracyclo[4.4.0.1$^{2,5}$.1$^{7,10}$]dodeca-3-ene, 8-carboxymethyl-8-hydroxycarbonyltetracyclo[4.4.0.1$^{2,5}$.1$^{7,10}$]dodeca-3-ene, 5-exo-6-endo-dihydroxycarbonylbicyclo[2.2.1]hept-2-ene and 8-exo-9-endo-dihydroxycarbonyltetracyclo [4.4.0.1$^{2,5}$.1$^{7,10}$]dodeca-3-ene; acid anhydride group-containing alicyclic olefin monomers such as bicyclo[2.2.1]hept-2-ene-5,6-dicarboxylic anhydride, tetracyclo[4.4.0.1$^{2,5}$.1$^{7,10}$]dodeca-3-ene-8,9- dicarboxylic anhydride and hexacyclo[6.6.1.1$^{3,6}$.1$^{10,13}$.0$^{2,7}$.0$^{9,14}$]heptadeca-4-ene-11,12-dicarboxylic anhydride; and the like.

Specific examples of the monomer for obtaining the alicyclic olefin polymer not having a polar group which may be used in the method (ii) include bicyclo[2.2.1]hept-2-ene (trivial name: norbornene), 5-ethyl-bicyclo[2.2.1]hept-2-ene, 5-butyl-bicyclo[2.2.1]hept-2-ene, 5-ethylidene-bicyclo[2.2.1]hept-2-ene, 5-methylidene-bicyclo[2.2.1]hept-2-ene, 5-vinyl-bicyclo[2.2.1]hept-2-ene, tricyclo[4.3.0.1$^{2,5}$]deca-3,7-diene (trivial name: dicyclopentadiene), tetracyclo[8.4.0.1$^{11,14}$0$^{2,8}$]tetradeca-3,5,7,12,11-tetraene, tetracyclo[4.4.0.1$^{2,5}$.1$^{7,10}$]deca-3-ene (trivial name: tetracyclododecene), 8-methyl-tetracyclo[4.4.0.1$^{2,5}$.1$^{7,10}$]dodeca-3-ene, 8-ethyl-tetracyclo[4.4.0.1$^{2,5}$.1$^{7,10}$]dodeca-3-ene, 8-methylidene-tetracyclo[4.4.0.1$^{2,5}$.1$^{7,10}$]dodeca-3-ene, 8-ethylidene-tetracyclo[4.4.0.1$^{2,5}$.1$^{7,10}$]dodeca-3-ene, 8-vinyl-tetracyclo[4.4.0.1$^{2,5}$.1$^{7,10}$]dodeca-3-ene, 8-propenyl-tetracyclo[4.4.0.1$^{2,5}$.1$^{7,10}$]dodeca-3-ene, pentacyclo[6.5.1.1$^{3,6}$.0$^{2,7}$.0$^{9,13}$]pentadeca-3,10-diene, pentacyclo[7.4.0.1$^{3,6}$.1$^{10,13}$.0$^{2,7}$]pentadeca-4,11-diene, cyclopentene, cyclopentadiene, 1,4-methno-1,4,4a,5,10,10a-hexahydroanthracene, 8-phenyl-tetracyclo[4.4.0.1$^{2,5}$.1$^{7,10}$]dodeca-3-ene, and the like.

Moreover, the carbon-carbon unsaturated bond-containing compound having a polar group which may be used in the method (ii) is exemplified by unsaturated carboxylic acid compounds such as acrylic acid, methacrylic acid, α-ethylacrylic acid, 2-hydroxyethyl(meth)acrylic acid, maleic acid, fumaric acid, itaconic acid, endocis-bicyclo[2.2.1]hept-5-ene-2,3-dicarboxylic acid and methyl-endocis-bicyclo[2.2.1]hept-5-ene-2,3-dicarboxylic acid; unsaturated carboxylic anhydrides such as maleic anhydride, chloromaleic anhydride, butenylsuccinic anhydride, tetrahydrophthalic anhydride and citraconic anhydride; and the like.

The method for blending the adhesive resin with other resin is not particularly limited as long as the mixture can be homogenously blended, and either dry blend carried out in a solid state, or melt blend carried out with a melt extruder by pelletizing a mixture obtained by dry blend may be employed. Illustrative examples of the means for melt blend include methods carried out using a ribbon blender, a mixer cokneader, a pelletizing machine, mixing rolls, an extruder or an intensive mixer. Of these, in light of simplicity of the steps and costs, a single or twin screw extruder is preferably used. The blending temperature is appropriately selected depending on properties of the facility, the type of the resin, blend proportions and the like, and may fall within the range of 150 to 300° C. in many cases. Also, when a multilayered structure is formed, melt kneading may be carried out using an extruder attached to a forming machine.

The resin composition of the layer B may contain a variety of additives such as a resin other than the thermoplastic resin, or a heat stabilizer, an ultraviolet ray absorbing agent, an antioxidant, a colorant and a filler, in the range not to impair the object of the present invention. When the resin composition of the layer B contains an additive, the amount thereof is preferably no greater than 50% by mass, more preferably no greater than 30% by mass, and is preferably no greater than 10% by mass with respect to the total amount of the resin composition.

For the reasons similar to those described above in connection with the resin composition of the layer A, it is preferred that a melt viscosity ($\eta_{1B}$) of the resin composition in the layer B as determined at a temperature of 210° C. and a shear rate of 10/sec be no less than 1×10$^2$ Pa·s and no greater than 1×10$^4$ Pa·s, and a melt viscosity ($\eta_{2B}$) as determined at a temperature of 210° C. and a shear rate of 1,000/sec of the same be no less than 1×10$^1$ Pa·s and no greater than 1×10$^3$ Pa·s, and a ratio ($\eta_{2B}/\eta_{1B}$) of the melt viscosity satisfies the following formula (1B):

$$-0.8 \leq (1/2)\log_{10}(\eta_{2B}/\eta_{1B}) \leq -0.1 \quad (1B).$$

Also, for the reasons similar to those in connection with the layer A, the value (1/2) log$_{10}$ ($\eta_{2B}/\eta_{1B}$) is more preferably no less than −0.6, and still more preferably no greater than −0.2.

For the reasons similar to those described above in connection with the resin composition of the layer A, at a temperature higher than a Vicat softening temperature of the resin composition of the layer A or layer B by 30° C., the resin composition of the layer A and/or layer B has a melt viscosity ($\eta_{1B}'$) as determined at a shear rate of 10/sec being no less than 1×10$^2$ Pa·s and no greater than 1×10$^4$ Pa·s and a melt viscosity ($\eta_{2B}'$) as determined at a shear rate of 1,000/sec being no less than 1×10$^1$ Pa·s and no greater than 1×10$^3$ Pa·s, and that a ratio ($\eta_{2B}'/\eta_{1B}'$) of the melt viscosity satisfies the following formula (1B'):

$$-0.8 \leq (1/2)\log_{10}(\eta_{2B}'/\eta_{1B}') \leq -0.1 \quad (1B').$$

Also, for the reasons similar to those in connection with the layer A, the value (1/2) log$_{10}$ ($\eta_{2B}'/\eta_{1B}'$) is more preferably no less than −0.6, and still more preferably no greater than −0.2. It is to be noted that the suitable ranges in connection with these melt viscosity ($\eta_{1B}'$) and ($\eta_{2B}'$), and the ratio ($\eta_{2B}'/\eta_{1B}'$) of the melt viscosity can be particularly suitably applied to the case in which a Vicat softening temperature of the resin composition of the layer A or layer B is no less than 180° C.

Furthermore, when a melting point of the resin is too high, for the reasons similar to those described above in connection with the resin composition of the layer A, it is preferred that the resin composition of the layer B has a melt viscosity ($\eta_{1B}''$) as determined at a temperature of 210° C. and a shear rate of 10/sec be no less than 1×10$^2$ Pa·s and no greater than 1×10$^4$ Pa·s and a melt viscosity ($\eta_{2B}''$) as determined at a temperature of 210° C. and a shear rate of 1,000/sec be no less than 1×10$^1$ Pa·s and no greater than 1×10$^3$ Pa·s, and a ratio ($\eta_{2B}''/\eta_{1B}''$) of the melt viscosity satisfies the following formula (1B''):

$$-0.8 \leq (1/2)\log_{10}(\eta_{2B}''/\eta_{1B}'') \leq -0.1 \quad (1B'').$$

Also, for the reasons similar to those in connection with the layer A, the value (1/2) log$_{10}$ ($\eta_{2B}''/\eta_{1B}''$) is preferably no less than −0.6, and more preferably no greater than −0.2.

<Metal Salt>

At least one of the resin compositions included in the layer A and the layer B that are adjacent with each other contains a metal salt. By thus including a metal salt in at least one of the layer A and the layer B that are adjacent with each other, very superior interlayer adhesiveness between the layer A and the layer B can be achieved. Owing to such very superior interlayer adhesiveness, the multilayered structure has superior durability. Although the reason for improvement of the interlayer adhesiveness of the metal salt is not necessarily clear, it is believed that the improvement would result from acceleration of a bond forming reaction that occurs between the gas barrier resin in the resin composition of the layer A, and the thermoplastic resin in the resin composition of the layer B owing to the presence of the metal salt, and the like. As such a bond forming reaction, a hydroxyl group exchange reaction that occurs between a carbamate group of TPU or an amino group, etc., of polyamide with a hydroxyl group, etc., of the gas barrier resin, an addition reaction of a hydroxyl group, etc., of the gas barrier resin to a remaining isocyanate group in TPU, an amide producing reaction of a terminal carboxyl group of polyamide with a hydroxyl group of EVOH, as well as other binding reaction that occurs between the gas barrier resin and the adhesive resin, and the like may be assumed. It should be noted that the metal salt may be included in both the resin composition of the layer A and the resin composition of the layer B, or either one of the resin composition of the layer A or the resin composition of the layer B.

Although the metal salt is not particularly limited, an alkali metal salt, an alkaline earth metal salt or a metal salt of a d-block metal listed in group 4 of periodic table is preferred since the interlayer adhesiveness can be further enhanced. Among these, an alkali metal salt or an alkaline earth metal salt is more preferred, and an alkali metal salt is particularly preferred.

The alkali metal salt is not particularly limited, and examples thereof include aliphatic carboxylic acid salts, aromatic carboxylic acid salts, phosphoric acid salts, metal complexes of lithium, sodium, potassium, etc., and the like. Specific examples of the alkali metal salt include sodium acetate, potassium acetate, sodium phosphate, lithium phosphate, sodium stearate, potassium stearate, a sodium salt of ethylenediamine tetra acetic acid, and the like. Among these, sodium acetate, potassium acetate and sodium phosphate are particularly preferred, in light of being easily available.

The alkaline earth metal salt is not particularly limited, and examples thereof include acetic acid salts or phosphoric acid salts of magnesium, calcium, barium, beryllium, or the like. Among these, acetic acid salts or phosphoric acid salts of magnesium or calcium are particularly preferred, in light of being easily available. To include such an alkaline earth metal salt is also advantageous in capability of reducing the amount of adhesion to a die of a forming machine of the resin yielded by heat deterioration during melt forming.

Although the metal salt of a d-block metal listed in group 4 of periodic table is not particularly limited, example thereof include carboxylic acid salts, phosphoric acid salts or acetylacetonato salts of titanium, vanadium, chromium, manganese, iron, cobalt, nickel, copper, zinc, etc., and the like.

The lower limit of the content of the metal salt (content in terms of metal element equivalent on the basis of the entire multilayered structure) is 1 ppm, more preferably 5 ppm, still more preferably 10 ppm, and particularly preferably 20 ppm. On the other hand, the upper limit of the content of the metal salt is 10,000 ppm, more preferably 5,000 ppm, still more preferably 1,000 ppm, and particularly preferably 500 ppm. When the content of the metal salt is less than the lower limit described above, the interlayer adhesiveness may be inferior, and thus the durability of the multilayered structure may be deteriorated. To the contrary, when the content of the metal salt is beyond the upper limit described above, coloring of the resin composition may be significant, whereby the appearance of the multilayered structure may be deteriorated.

The lower limit of the content of the metal salt with respect to each resin composition containing the metal salt is preferably 5 ppm, more preferably 10 ppm, still more preferably 20 ppm, and particularly preferably 50 ppm. On the other hand, the upper limit of the content of the metal salt is preferably 5,000 ppm, more preferably 1,000 ppm, still more preferably 500 ppm, and particularly preferably 300 ppm. When the content of the metal salt is less than the lower limit described above, adhesiveness to other adjacent layer may be inferior, and thus the durability of the multilayered structure may be deteriorated. To the contrary, when the content of the metal salt is beyond the upper limit described above, coloring of the resin composition may be significant, whereby the appearance of the multilayered structure may be deteriorated.

The metal salt may be included in the resin composition of the layer A or the layer B by any method, which is not particularly limit, and a method similar to one for including a phosphate compound or the like in the resin composition of the layer A as described above may be employed.

<Oxygen Scavenger>

The resin compositions that constitute the layer A and the layer B may contain in addition to the aforementioned metal salt and the like any of various components. As such a component, for example, an oxygen scavenger may be included. The oxygen scavenger may be particularly suitably used when the resin composition that constitutes the layer B includes the adhesive resin. The oxygen scavenger may be contained in either one of the resin composition that constitutes the layer A or the layer B, it is preferably contained in the resin composition of the layer A.

The oxygen scavenger is a substance having an oxygen scavenging ability (oxygen absorbing function). The oxygen scavenging ability as referred to means a function of absorbing and consuming oxygen from a given environment, or decreasing the amount of oxygen. The oxygen scavenger which may be contained in the resin composition is not particularly limited as long as it has such properties. By containing the oxygen scavenger in the resin composition, the gas barrier properties of the multilayered structure can be further improved as a result of addition of oxygen scavenging ability. As the oxygen scavenger, various types of substances may be used, examples thereof include organic oxygen scavengers such as a thermoplastic resin having an oxygen scavenging ability or ascorbic acid; inorganic oxygen scavengers such as iron or a sulfurous acid salt, and the like. Of these, a thermoplastic resin having an oxygen scavenging ability is preferred since superior oxygen scavenging property is provided, and it can be easily contained in the resin composition of the multilayered structure.

<Thermoplastic Resin Having Oxygen Scavenging Ability>

The thermoplastic resin having an oxygen scavenging ability is not particularly limited as long as it is a thermoplastic resin capable of scavenging oxygen, and examples include ethylene based unsaturated hydrocarbon polymers having a carbon-carbon double bond, or polymer blends (other than those having a molecular weight of no greater than 1,000 and having a conjugated double bond), hereinafter, may be also referred to as merely "unsaturated hydrocarbon polymer", and the like.

<Unsaturated Hydrocarbon Polymer>

The unsaturated hydrocarbon polymer may have a substituent, or may be unsubstituted. The unsubstituted unsaturated hydrocarbon polymer is defined as an arbitrary compound having at least one aliphatic carbon-carbon double bond and consisting of 100% by mass carbon and hydrogen in total. Also, the substituted unsaturated hydrocarbon polymer is defined as an ethylene based unsaturated hydrocarbon having at least one aliphatic carbon-carbon double bond and including about 50 to 99% by mass carbon and hydrogen in total. Preferable unsubstituted or substituted unsaturated hydrocarbon polymer has at least two ethylene based unsaturated groups per molecule. More preferably, the unsubstituted or substituted unsaturated hydrocarbon polymer is a polymer compound having at least two ethylene based unsaturated groups, and a mass average molecular weight of equal to or greater than 1,000. The polymer blend of the ethylene based unsaturated hydrocarbon may be composed of a mixture of 2 types or more types of substituted or unsubstituted ethylene based unsaturated hydrocarbons.

Examples of preferable unsubstituted unsaturated hydrocarbon polymer include the followings diene polymers such as e.g., polyisoprene, (for example, trans-polyisoprene), polybutadiene (in particular, 1,2-polybutadiene, which is defined as polybutadiene having equal to or greater than 50% of 1,2-fine structure), and copolymers of the same such as e.g., styrene-butadiene, but not limited thereto. Such hydrocarbon also includes: polymer compounds, e.g., polypentenamers, polyoctenamers, and other polymers produced by double decomposition of olefin; diene oligomer such as e.g., squalene; and polymers or copolymers derived from dicyclopentadiene, norbornadiene, 5-ethylidene-2-norbornene, or other monomer that includes at least two carbon-carbon double bonds (conjugated or unconjugated). These hydrocarbons further involve carotenoids, for example, β-carotene.

Preferable substituted unsaturated hydrocarbon polymer may include those having an oxygen-containing moiety, such as e.g., ester, carboxylic acid, aldehyde, ether, ketone, alcohol, peroxide, and/or hydroperoxide, but not limited thereto. Specific examples of such hydrocarbon include condensed polymers such as e.g., polyesters derived from a monomer that includes a carbon-carbon double bond; unsaturated fatty acids such as e.g., oleic acid, ricinoleic acid, dehydrationricinoleic acid and linoleic acid, and derivatives thereof such as e.g., esters, but not limited thereto. The hydrocarbons may involve (meth)allyl (meth)acrylate.

In the unsaturated hydrocarbon polymer, the content of the carbon-carbon double bond is preferably 0.01 to 1.0 equivalent with respect to 100 g of the polymer. When the content of the double bonds in the polymer is limited to fall within such a range, both the oxygen scavenging property and physical property of the multilayered structure can be maintained to be superior.

The polymer including thus decreased double bonds can be a blend of homopolymer, copolymer, and/or polymer. A polymer blend is particularly desired since a change of physical properties in a discontinuous phase has comparatively small influences exerted on the entire physical properties of the blend which would predominantly have a continuous phase, and thus it is desired that a majority of existing double bonds are included in the discontinuous phase.

Suitable examples of the homopolymer include poly(octenamer) having 0.91 equivalent of double bonds in 100 g of the polymer, and poly(4-vinylcyclohexene) having 0.93 equivalent of double bonds in 100 g of the polymer. Examples of suitable copolymer include $C_1$-$C_4$ alkyl acrylate and methacrylate. Other examples include copolymers derived from 1,3-butadiene, isoprene, 5-ethylidene-2-norbornene, 4-vinylcyclohexene, 1,4-hexadiene, 1,6-octadiene or the like with one, or two or more types of vinyl monomers such as e.g., ethylene, propylene, styrene, vinyl acetate, and/or α-olefin. Specific examples include terpolymers of ethylene, propylene and 5-ethylidene-2-norbornene. Such EPDM elastomers typically contain 3 to 14% by mass 5-ethylidene-2-norbornene. These polymers comply with the aforementioned requirements for the double bonds, i.e., falling within the range of 0.01 to 1.0 equivalent in 100 g of the polymer. Also, partially hydrogenated ethylene based unsaturated polymers (for example, polybutadiene), which include at least about 50% hydrogenated double bonds, are suitable. Exemplary polymer blend may vary widely. Blends of EPDM and 20 to 40% polybutadiene, blends of EPDM and 20 to 40% poly(octenamer), and blends of polybutadiene and saturated polyolefin at 50/50 are particularly preferred.

<Thermoplastic Resin Having Carbon-Carbon Double Bonds Substantially in Only the Main Chain>

Among the aforementioned unsaturated hydrocarbon polymers, in light of very superior oxygen scavenging properties and possibility to be included in the resin composition of the multilayered structure, thermoplastic resins having carbon-carbon double bonds substantially in only the main chain (hereinafter, may be also referred to as merely "thermoplastic resin having double bonds"), except for those having a molecular weight of no greater than 1,000 and having conjugated double bonds, are particularly preferred. In this regard, thermoplastic resin "having carbon-carbon double bonds substantially in only the main chain" as referred to herein means that the carbon-carbon double bonds existing in the main chain of the thermoplastic resin account for no less than 90% of all the carbon-carbon double bonds included in the main chain or side chain of the molecule. The carbon-carbon double bonds existing in the main chain account for preferably no less than 93%, and more preferably no less than 95%.

Since the thermoplastic resin having double bonds has carbon-carbon double bonds in the molecule thereof, it can efficiently react with oxygen, whereby superior oxygen scavenging ability can be achieved. By including such a thermoplastic resin in the resin composition, the gas barrier properties of the multilayered structure can be significantly improved. The carbon-carbon double bond involves conjugated double bonds, but does not involve multiple bonds included in an aromatic ring.

The lower limit of the content of carbon-carbon double bonds included in the thermoplastic resin having double bonds is preferably 0.001 equivalent/g, more preferably 0.005 equivalent/g, and still more preferably 0.01 equivalent/g. On the other hand, the upper limit of the content of the carbon-carbon double bonds is preferably 0.04 equivalent/g, more preferably 0.03 equivalent/g, and still more preferably 0.02 equivalent/g. When the content of the carbon-carbon double bond is less than the lower limit described above, the multilayered structure obtained may have insufficient oxygen scavenge function. To the contrary, when the content of the carbon-carbon double bonds is beyond the upper limit described above, coloring of the resin composition may be significant, whereby the appearance of the multilayered structure obtained may be deteriorated.

As described in the foregoing, the thermoplastic resin having double bonds is, due to having carbon-carbon double bonds substantially in only the main chain, accompanied by significantly less generation of decomposed matter having low molecular weights yielded upon cleavage of side chain double bonds by way of a reaction with oxygen. Although a part of the decomposed matter having low molecular weights is an unpleasant odor substance, development of unpleasant odor can be minimized as such decomposed matter is less likely to be generated. Therefore, by including such a thermoplastic resin in the resin composition, a multilayered structure can be provided having superior gas barrier properties and durability, while avoiding from development of unpleasant odor, by means of the oxygen scavenge. In this respect, when a thermoplastic resin having many of the carbon-carbon double bonds in the side chain is used, oxygen scavenging properties may be satisfactory; however, decomposed matter is generated upon cleavage of the double bonds in the side chain as described above. Thus, unpleasant odor is developed, whereby surrounding environment may be significantly compromised.

In the thermoplastic resin having double bonds, when the carbon-carbon double bond in the main chain reacts with oxygen, oxidization occurs at a site of allyl carbon (carbon adjacent to the double bond); therefore, allyl carbon is preferably other than quaternary carbon. Furthermore, since it would be possible to generate decomposed matter having low molecular weights even if the main chain is cleaved, the allyl carbon is preferably unsubstituted carbon, i.e., methylene carbon in order to prevent this event. From the foregoing respects, the thermoplastic resin having double bonds preferably has at least one of units represented by the following formulae (X) and (XI).

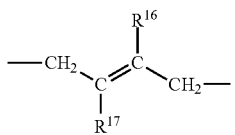

(XIV)

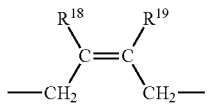

(XV)

In the above formulae (XIV) and (XV), $R^{16}$, $R^{17}$, $R^{18}$ and $R^{19}$ each independently represent a hydrogen atom, an alkyl group which may have a substituent, an aryl group which may have a substituent, an alkylaryl group which may have a substituent, $-COOR^{20}$, $-OCOR^{21}$, a cyano group or a halogen atom; $R^{18}$ and $R^{19}$ may form a ring by way of a methylene group or an oxymethylene group, unless $R^{18}$ and $R^{19}$ both represent a hydrogen atom; $R^{20}$ and $R^{21}$ represent an alkyl group which may have a substituent, an aryl group which may have a substituent or an alkylaryl group which may have a substituent.

When $R^{16}$, $R^{17}$, $R^{18}$ and $R^{19}$ represent an alkyl group, the alkyl group has preferably 1 to 5 carbon atoms; when they represent an aryl group, the aryl group has preferably 6 to 10 carbon atoms; and when they represent an alkylaryl group, the alkylaryl group has preferably 7 to 11 carbon atoms. Specific examples of the alkyl group include a methyl group, an ethyl group, a propyl group and a butyl group; specific examples of the aryl group include a phenyl group; examples of the alkylaryl group include a tolyl group; and examples of the halogen atom include a chlorine atom.

The substituent which may be included in the thermoplastic resin having double bonds is exemplified by various types of hydrophilic groups. The hydrophilic group as referred to herein is exemplified by a hydroxyl group, an alkoxy group having 1 to 10 carbon atoms, an amino group, an aldehyde group, a carboxyl group, a metal carboxylate group, an epoxy group, an ester group, a carboxylic anhydride group, a boronic acid group, a boron-containing group that can be converted into a boronic acid group in the presence of water (for example, boronic acid ester group, a boronic acid anhydride group, a boronic acid base, etc.), and the like. Among these hydrophilic groups, an aldehyde group, a carboxyl group, a metal carboxylate group, an epoxy group, an ester group, a carboxylic anhydride group, a boronic acid group, a boron-containing group that can be converted into a boronic acid group in the presence of water are preferred in terms of ability to react with a hydroxyl group, etc., of EVOH. When the thermoplastic resin having double bonds includes such a hydrophilic group, the thermoplastic resin has elevated dispersibility in the resin composition, thereby leading to improvement of the oxygen scavenging function of the multilayered structure obtained. In addition, along with this phenomenon, the interlayer adhesiveness is improved as a result of formation of a chemical bond through a reaction of this hydrophilic group with a hydroxyl group, a functional group or the like of EVOH in the adjacent layer, and characteristics such as gas barrier properties and durability of the resultant multilayered structure are further improved.

In addition, of the thermoplastic resins having double bonds described in the foregoing, compounds having the unit represented by the above formulae (XIV) and (XV), wherein $R^{16}$, $R^{17}$, $R^{18}$ and $R^{19}$ all represent a hydrogen atom are particularly preferred in light of prevention of the odor. Although the reason for the prevention is not necessarily clarified, it is presumed that when $R^{16}$, $R^{17}$, $R^{18}$ and $R^{19}$ represent not a hydrogen atom but a group listed, the group may be oxidized and cleaved to convert into an odor substance, when the thermoplastic resin reacts with oxygen.

In the thermoplastic resin having double bonds, the unit represented by the above formula (XIV) and (XV) is preferably a unit derived from a diene compound. When the unit is derived from a diene compound, the thermoplastic resin having such a structural unit can be readily produced. The diene compound is exemplified by isoprene, butadiene, 2-ethylbutadiene, 2-butylbutadiene, chloroprene, and the like. Only one of these may be used alone, or a plurality of types thereof may be used in combination. Examples of the thermoplastic resin having double bonds that includes such a unit derived from a diene compound include polybutadiene, polyisoprene, polychloroprene, polyoctenylene, and the like. Of these, polybutadiene and polyoctenylene are particularly preferred in light of particularly superior oxygen scavenging function. Alternatively, a copolymer including as a copolymerization component a structural unit other than the aforementioned structural units can be used also as the thermoplastic resin having double bonds. The copolymerization component is exemplified by styrene, acrylonitrile, propylene, and the like. When the thermoplastic resin having double bonds is such a copolymer, the content of the units represented by the above formulae (X) and (XI) is preferably no less than 50 mol %, and more preferably no less than 70 mol % in terms of the total number of the units with respect to the entire structural units of the thermoplastic resin.

The lower limit of the number average molecular weight of the thermoplastic resin having double bonds is preferably 1,000, more preferably 5,000, still more preferably 10,000, and particularly preferably 40,000. On the other hand, the upper limit of the number average molecular weight is preferably 500,000, more preferably 300,000, still more preferably 250,000, and particularly preferably 200,000. When the thermoplastic resin having double bonds has a molecular weight of less then 1,000, or greater than 500,000, the multilayered structure obtained may be involved in inferior forming processibility and handling quality, and mechanical properties of the multilayered structure such as strength and extensibility may be deteriorated. Moreover, the dispersibility in the resin composition is lowered, and as a result, gas barrier properties and oxygen scavenging performance of the multilayered structure may be deteriorated. The thermoplastic resin having double bonds may be used of one type or a plurality of types thereof.

The method for producing the thermoplastic resin having carbon-carbon double bonds substantially in only the main chain as described above may vary depending on the type of the thermoplastic resin, and for example, polybutadiene (cis-1,4-polybutadiene) can be synthesized using a cobalt based or nickel based catalyst as a catalyst. Specific examples of the catalyst include a combination of a $CoCl_2 \cdot 2C_5H_5N$ complex and diethylaluminum chloride, and the like. The solvent which may be used includes an inert organic solvent, and in particular, hydrocarbon having 6 to 12 carbon atoms such as e.g., an alicyclic hydrocarbon such as hexane, heptane, octane or decane, or an aromatic hydrocarbon such as toluene, benzene or xylene is suitable. The polymerization is usually carried out at a temperature falling within the range of −78° C. to 70° C. for a time period falling within the range of 1 to 50 hrs.

It is to be noted that the carbon-carbon double bonds that exist after completing the polymerization may be reduced by hydrogen in part in the range not to impair the mechanical properties of the multilayered structure, and effects such as gas barrier properties and oxygen scavenging performance, and the like. In this procedure, it is preferred that in particular, the carbon-carbon double bonds remaining in the side chain, in particular, are selectively reduced by hydrogen.

<Transition Metal Salt>

The resin composition preferably contains in addition to the aforementioned unsaturated hydrocarbon polymer (including the thermoplastic resin having double bonds), further a transition metal salt (other than the metal salts described above). When such a transition metal salt is included together with the unsaturated hydrocarbon polymer, the oxygen scavenging function of the multilayered structure obtained can be further improved, and as a result, further superior gas barrier properties can be provided. This event is believed to result from acceleration by the transition metal salt, of the reaction of the unsaturated hydrocarbon polymer with oxygen present inside of the multilayered structure or oxygen going to permeabilize in the multilayered structure.

A transition metal ion that constitutes the transition metal salt is exemplified by each ion of iron, nickel, copper, manganese, cobalt, rhodium, titanium, chromium, vanadium ruthenium, or the like, but not limited thereto. Of these, each ion of iron, nickel, copper, manganese or cobalt is preferred, each ion of manganese or cobalt is more preferred, and cobalt ion is particularly preferred.

A counter anion of the transition metal ion that constitutes the transition metal salt is exemplified by carboxylic acid ion or halogen anion, and the like. Specific examples of the counter anion include: anions generated by ionization of a hydrogen ion from acetic acid, stearic acid, acetyl acetone, dimethyldithiocarbamic acid, palmitic acid, 2-ethylhexanoic acid, neodecanoic acid, linoleic acid, tol acid, oleic acid, resin acid, capric acid, naphthenoic acid or the like; a chloride ion and an acetyl acetonate ion, and the like, but not limited thereto. Specific examples of particularly preferred transition metal salt are cobalt 2-ethylhexanoate, cobalt neodecanoate and cobalt stearate. Also, the transition metal salt may have a polymeric counter anion, and thus may be an ionomer, as generally referred to.

The lower limit value of the content of the transition metal salt is in terms of metal element equivalent, preferably 1 ppm, more preferably 5 ppm, and still more preferably 10 ppm with respect to the resin composition. On the other hand, the upper limit value of the content of the transition metal salt is preferably 50,000 ppm, more preferably 10,000 ppm, and still more preferably 5,000 ppm. The content of the transition metal salt is less than the lower limit described above, the oxygen scavenge effect of the multilayered structure obtained may be insufficient. On the other hand, when the content of the transition metal salt is beyond the upper limit described above, the thermal stability of the resin composition is deteriorated, whereby generation of decomposed gas, and gel and/or seed may be significantly developed.

<Desiccant>

Other component contained in the resin composition that constitutes the layer A and layer B is exemplified by a desiccant. The desiccant may be particularly suitably used also when the resin composition that constituted the layer B contains the adhesive resin. The desiccant may be contained in either one of the resin composition that constitutes the layer A or the layer B, it is preferably contained in the resin composition of the layer A.

The desiccant is a substance that absorbs moisture and is capable of eliminating the moisture from a given environment. The desiccant which may be contained in the resin composition of the multilayered structure is not particularly limited as long as it has such properties. By containing the desiccant in the resin composition of the resin-layer, gas barrier properties of the resin-layer containing the gas barrier resin can be maintained at a high level since a dry state is maintained.

Examples of suitable desiccant include, hydrate formative salts, i.e., salts that absorb moisture in the form of water of crystallization, in particular, phosphoric acid salts and particularly anhydrides thereof in light of the aforementioned effects, as well as other hydrate formative salts such as e.g., salts such as sodium borate and sodium sulphate, and particularly anhydrides of the same. Alternatively, other moisture absorptive compound such as e.g., sodium chloride, sodium nitrate, sugar, silica gel, bentonite, molecular sieve, a high-water-absorbing resin or the like may be also used. These may be used either alone or a plurality of types thereof.

The desiccant is preferably dispersed in the form of fine particles in a matrix of the resin-layer including the gas barrier resin. In particular, it is advantageous that a volume-surface mean diameter of the particles having a longitudinal diameter of no less than 10 μm of the desiccant particles is no greater than 30 μm, suitably 25 μm, and most suitably no greater than 20 μm, whereby a multilayered structure having a high level of gas barrier properties which have not been achievable so far can be obtained owing to a finely dispersed state formed. The composition having such a finely dispersed state can be attained, provided that especial processing methods to meet needs are carefully combined.

The ratio of the gas barrier resin constituting the resin-layer to the desiccant used is not particularly limited, and the mass ratio preferably falls within the range of 97:3 to 50:50, and particularly 95:5 to 70:30.

In connection with the desiccant particles in the resin composition that constitutes the resin-layer, the volume-surface mean diameter of the particles having a longitudinal diameter of no less than 10 μm has great influences on the gas barrier properties of the multilayered structure that includes the resin composition in its layer(s). Although the reason for this phenomenon is not necessarily clarified, it is presumed that particles having a large particle size have particularly disadvantageous effects on moisture absorption effects or the gas barrier properties of the gas barrier resin.

Of the desiccants described above, phosphoric acid salts that can form a hydrate are particularly preferred. Since many phosphoric acid salts can form a hydrate containing a plurality of water molecules in the form of crystals of water, the mass of water absorbed per unit mass is great, thereby capable of significantly contributing to improvement of the gas barrier properties of the multilayered structure. In addition, since the number of molecules of water of crystallization capable of including the phosphoric acid salt is likely to increase stepwise in accordance with elevation of the humidity, the moisture can be gradually absorbed according to the variation of the humidity in the environment.

Illustrative examples of the phosphoric acid salt include sodium phosphate ($Na_3PO_4$), trilithium phosphate ($Li_3PO_4$), disodium hydrogenphosphate ($Na_2HPO_4$), sodium dihydrogenphosphate ($NaH_2PO_4$), polysodium phosphate, lithium phosphate, dilithium hydrogenphosphate, lithium dihydrogenphosphate, lithium polyphosphate, potassium phosphate, dipotassium hydrogenphosphate, potassium dihydrogenphosphate, disodium hydrogenphosphate, potassium polyphosphate, calcium phosphate ($Ca_3(PO_4)_2$), calcium hydrogenphosphate ($CaHPO_4$), calcium dihydrogenphosphate ($Ca(H_2PO_4)_2$), polycalcium phosphate, ammonium phosphate, diammonium hydrogenphosphate, ammonium dihydrogenphosphate, polyammonium phosphate, and the like. The polyphosphate as herein referred to includes diphosphate (pyrophosphoric acid salts), triphosphate (tripolyphosphoric acid salts), and the like. Of these phosphoric acid salts, anhydrides not containing water of crystallization are suitable. Also, sodium phosphate, disodium hydrogenphosphate, and sodium dihydrogenphosphate are suitable.

The phosphoric acid salts are usually in the form of powder. Commercially available powders of phosphoric acid salts generally have a mean particle diameter of 15 to 25 μm, and the size of maximum particles included is 40 to 100 μm. If a powder including such large particles is used, the gas barrier properties of the resin-layer of the multilayered structure may be insufficient. When particles having a size greater than the thickness of the resin-layer of the multilayered structure are included, gas barrier properties may be significantly impaired. Therefore, the particle size of the phosphoric acid salt powder is preferably no greater than the thickness of the resin-layer of the multilayered structure.

In other words, the phosphoric acid salt powder preferably has a mean particle diameter of no greater than 10 μm. The mean particle diameter is more preferably no greater than 1 μm. The mean particle diameter may be determined by, for example, a light scattering method or the like using a particle size analyzer.

When the phosphoric acid salt is used as a desiccant, it is preferably blended together with a dispersant. When such a dispersant is blended, the phosphoric acid salt as a desiccant can be favorably dispersed in the resin composition containing a gas barrier resin. Examples of the dispersant include, fatty acid salts, glycerin fatty acid esters, fatty acid amides, and the like. It is to be noted that glycerin esters of aromatic carboxylic acids are generally in the form of a liquid at room temperature, and thus are not suited for dry blend with a phosphoric acid salt.

The fatty acid salt is exemplified by calcium stearate, zinc stearate, magnesium stearate, and the like. The glycerin fatty acid ester is exemplified by glycerin monostearic acid ester, monodecanoyl octanoyl glyceride, and the like. The fatty acid amide is exemplified by ethylene bisstearic acid amide, and the like.

Of these dispersants, a fatty acid salt is suitably used in light of improvement of slipping properties of phosphoric acid salt powder, and prevention of clogging of a screen of an extruder during melt kneading. Of thee, a calcium salt, a zinc salt, and the like are suitable. Furthermore, in light of achievement of particularly favorable dispersibility, a glycerin fatty acid ester is suitably used. In particular, a mono or difatty acid ester of glycerin is preferred, glycerin monofatty acid ester is more preferred, and glycerin monostearic acid ester is particularly preferred.

Moreover, the dispersant preferably consists of a compound having 8 to 40 carbon atoms. Due to having the number of carbon atoms falling within this range, favorable dispersibility can be achieved. The lower limit value of suitable number of carbon atoms is 12, and the upper limit value of suitable number of carbon atoms is 30.

The amount of the dispersant blended is 1 to 20 parts by mass with respect to 100 parts by mass of the phosphoric acid salt. When the content of the dispersant is less than 1 part by mass with respect to 100 parts by mass of the phosphoric acid salt, prevention of generation of aggregates of the phosphoric acid salt fails. The content of the dispersant is suitably no less than 2 parts by mass, and more suitably no less than 3 parts by mass. On the other hand, when the content of the dispersant is greater than 20 parts by weight with respect to 100 parts by weight of the phosphoric acid salt, the slippage of the pellet of the resin composition becomes so great to result in difficulty in feeding to the extruder, whereby the interlayer adhesive force is impaired in producing the multilayered structure. The content of the dispersant is suitably no greater than 15 parts by mass, and more suitably no greater than 10 parts by mass.

<Relationship Between Layer A and Layer B>

In the multilayered structure, the interlayer adhesive force between the layer A and the layer B that are adjacent with each other is no less than 450 g/15 mm, preferably no less than 500 g/15 mm, more preferably no less than 600 g/15 mm, still more preferably no less than 700 g/15 mm, and particularly preferably no less than 800 g/15 mm. When the interlayer adhesive force between the layer A and the layer B falls within the range described above, very favorable interlayer adhesiveness can be provided, whereby superior characteristics of the multilayered structure such as gas barrier properties can be maintained even against deformation such as stretching or flexion, and thus very superior durability can be attained. In this regard, the interlayer adhesive force between the layer A and the layer B as referred to herein means a value (unit: g/15 mm) of T-peel strength between the layer A and the layer B as determined with a measurement sample having a width of 15 mm using an autograph in an atmosphere of 23° C. and 50% RH under a condition involving a tension rate of 250 mm/min.

With regard to the interlayer relationship of the multilayered structure, it is desired that a binding reaction is allowed to actively occur at the interface between the layer A and the layer B. By causing a bond forming reaction between the gas barrier resin in the resin composition of the layer A and the thermoplastic resin in the resin composition of the layer B due to the metal salt included as described above, more superior interlayer adhesiveness can be achieved. Exemplary bond forming reaction includes: a hydroxyl group exchange reaction that occurs between a carbamate group of TPU, an amino group of polyamide or the like with a hydroxyl group or the like of the gas barrier resin; an addition reaction of a hydroxyl group or the like of the gas barrier resin to a remaining isocyanate group in TPU; an amide producing reaction of a terminal carboxyl group of polyamide with a hydroxyl group of EVOH; as well as other binding reaction that occurs between the gas barrier resin and the adhesive resin, and the like. As a result, the gas barrier properties, durability and the like of the multilayered structure can be further improved.

With regard to the relationship of the viscosity of each resin composition that constitutes the layer A and the layer B, when the gas barrier resin included in the resin composition of the layer A is EVOH, or particularly, when the Vicat softening temperature of the resin composition of the layer A is less than 180° C., the lower limit of the ratio ($\eta_{2B}/\eta_{2A}$) of the melt viscosity ($\eta_{2B}$) of the resin composition of the layer B to the melt viscosity ($\eta_{2A}$) of the resin composition of the layer A as determined at a temperature of 210° C. and a shear rate of 1,000/sec is preferably 0.3, more preferably 0.4, and still more preferably 0.5. On the other hand, the upper limit of the ratio ($\eta_{2B}/\eta_{2A}$) is preferably 2, more preferably 1.5, and still more preferably 1.3. When the ratio ($\eta_{2B}/\eta_{2A}$) of the viscosity falls within the range described above, the appearance of the multilayered structure becomes favorable in forming by a multilayer coextrusion process, and the adhesion between the layer A and the layer B becomes favorable, whereby the durability of the multilayered structure can be improved.

When the gas barrier resin included in the resin composition of the layer A is a resin other than the EVOH resin, and particularly when the Vicat softening temperature of the resin composition of the layer A is no less than 180° C., the lower limit of the ratio ($\eta_{2B}'/\eta_{2A}'$) of the melt viscosity($\eta_{2B}'$) of the resin composition of the layer B to the melt viscosity ($\eta_{2A}'$) of the resin composition of the layer A as determined at a temperature higher than the Vicat softening temperature of the resin composition of the layer A by 30° C. and at a shear rate of 1,000/sec is preferably 0.3, more preferably 0.4, and still more preferably 0.5. On the other hand, the upper limit of the ratio ($\eta_{2B}'/\eta_{2A}'$) of the layer B to the layer A is preferably 3, more preferably 2, still more preferably 1.5, and particularly preferably 1.3. When the viscosity ratio ($\eta_{2B}'/\eta_{2A}'$) falls within the range described above, the appearance of the multilayered structure becomes favorable in forming by a multilayer coextrusion process, and the adhesion between the layer A and the layer B becomes favorable, whereby the durability of the multilayered structure can be improved.

In addition, when the resin has a high melting point, the lower limit of the ratio ($\eta_{2B}''/\eta_{2A}''$) of the melt viscosity ($\eta_{2B}''$) of the resin composition of the layer B to the melt viscosity ($\eta_{2A}''$) of the resin composition of the layer A as determined at a temperature of 220° C. and a shear rate of 1,000/sec is preferably 0.5, more preferably 0.6, and still more preferably 0.7. On the other hand, the upper limit of the ratio ($\eta_{2B}''/\eta_{2A}''$) of the melt viscosity of the layer A and layer B is preferably 2, more preferably 1.5, and still more preferably 1.3. When the viscosity ratio ($\eta_{2B}''/\eta_{2A}''$) falls within the range described above, the appearance of the multilayered structure becomes favorable in forming by a multilayer coextrusion process, and the adhesion between the layer A and the layer B becomes favorable, whereby the durability of the multilayered structure can be improved.

<Method for Producing Multilayered Structure>

The method for producing a multilayered structure is not particularly limited as long as the method can favorably laminate and adhere the layer A and the layer B, and any of well-known methods such as e.g., coextrusion, pasting, coating, bonding, and attaching may be employed. The method for producing a multilayered structure is specifically exemplified by (1) a method for producing a multilayered structure having a layer A and a layer B by a multilayer coextrusion process using a resin composition for the layer A containing a gas barrier resin such as EVOH, and a resin composition for the layer B containing a thermoplastic resin, (2) a method for producing a multilayered structure having a layer A and a layer B, the method including: producing first a laminate including a layer that will be the layer A and a layer that will be the layer B by a coextrusion process using a resin composition for the layer A containing a gas barrier resin such as EVOH and a resin composition for the layer B containing a thermoplastic resin; overlaying a plurality of laminates via an adhesive; and stretching, and the like. Among these, in light of superior productivity, and excellent interlayer adhesiveness, (1) the method of formation by a multilayer coextrusion process using a resin composition containing a gas barrier resin such as EVOH and a resin composition containing a thermoplastic resin is preferred.

In the multilayer coextrusion process, the multilayered structure is formed by: heat melting the resin composition of the layer A and the resin composition of the layer B; supplying the melted resin compositions into an extrusion die from each distinctive extruder and pump through each channel; extruding from the extrusion die to give a multilayer; and thereafter allowing for lamination and adhesion. As the extrusion die, for example, a multimanifold die, a field block, a static mixer, or the like may be used.

<Applications>

The multilayered structure is also superior in interlayer adhesiveness as described above, and has superior gas barrier properties, stretchability, thermoformability and durability. Thus, the multilayered structure can be used for food packaging materials, medical vessel packaging materials, other vessel packaging materials, industrial sheet materials, etc., sheet materials for architectural materials and agricultural sheet materials, and other sheet materials, as well as other various types of pipes, and the like.

Examples of the food packaging material that is an application for use in food packaging include, bags for food or confectionery packaging (flexible packages), wrapping films for foods, skin packing films, stretchable films, shrunk films, retort vessels, and the like. Since the food packaging materials having the multilayered structure have superior gas barrier properties, stretchability, thermoformability and durability, long-term storability and retort resistance can be improved, and thus such retort vessels can be used as an alternative of metal cans.

Examples of the other vessel packaging material include various types of vessel packaging materials for cosmetics, industrial chemicals, pesticides, fertilizers, cleansers, etc., shopping bags, garbage bags, compost bags, bag-in-boxes, flexible tanks, and the like.

The bag-in-box means a vessel in which a foldable thin-walled inner vessel is combined with an outer box such as a cardboard box having stackability, portability, protective properties of inner vessel, printability, and the like. The base material of the outer box may be a cardboard box, or otherwise plastic or metal. The shape of the outer box may be may be not only a box shape, but also a cylindrical shape, etc. For the inner vessel of the bag-in-box, the multilayered structure of the present invention may be suitably used. The bag-in-box may be used in transportation, storage, display, etc., of foods such as wine, juice, "mirin" (cooking sake), soy sauce, sauce, noodle sauce, milk, mineral water, Japanese sake, "shochu" (distilled spirit), coffee and tea, and various types of cooking oils as well as non-foods such as liquid fertilizers, developer solutions, battery solutions and other industrial chemicals, and the like.

The flexible tank means a vessel formed from a base material having flexibility, and may be either one provided with a frame for supporting the vessel, or one without having a frame and being capable of maintaining the shape by means of the pressure resulting from the gas, liquid, etc., stored in the vessel. The flexible tank can be stored in a compact manner in a folded form during unused time period, whereas when it is to be used, assembly or expansion allows for use as a tank. When the multilayered structure of the present invention is used as a base material of the flexible tank, durability and gas barrier properties of the flexible tank can be improved.

Examples of the industrial sheet materials, etc., include films for device sealing materials, gas collecting films, bioreactors, and the like.

The film for a device sealing material may be suitably used for each application for which superior adhesiveness, gas barrier properties, durability and the like are required such as back sheets for solar cells.

The gas collecting film is exemplified by hydrogen barrier films laminated on the inner face, etc., of collecting bags for analyzing exhaust gas, hydrogen collecting bags in hydrogen stations of fuel cell vehicles, high-pressure hydrogen vessels of fuel cell vehicles, and the like.

The bioreactor as referred to means a device for carrying out a biochemical reaction using a biocatalyst. The multilayered structure of the present invention can be suitably used for a reaction chamber, a pipe and the like of the bioreactor. By using the multilayered structure in a bioreactor, gas barrier properties, durability and the like of the bioreactor can be improved, and superior thermoformability can be also attained.

Examples of the sheet material for architectural materials include vacuum thermal insulation boards, wall papers, and the like. The vacuum thermal insulation board provided with the multilayered structure of the present invention has superior gas barrier properties, and thus superior vacuum retaining capacity can be exhibited. In addition, since wall papers provided with the multilayered structure of the present invention have improved stretchability and thermoformability, the productivity and workability can be improved, and due to excellent durability, use for a long period of time is enabled.

Examples of the agricultural sheet materials include multi films for agricultural fumigation, films for greenhouse, and the like. When the multilayered structure of the present invention is used as, for example, a multi film for agricultural fumigation, fumigation can be efficiently carried out due to superior gas barrier properties, and the film is less likely to be broken owing to superior durability, whereby workability is improved.

As the other sheet material, for examples use for geomembranes, radon barrier films, and the like is exemplified. The geomembrane is a sheet used as seepage control work for waste disposal plants, and the like. The radon barrier film prevents diffusion of gaseous radon generated by uranium decay in uranium waste disposal plants. Since the multilayered structure of the present invention is superior in gas barrier properties, durability and the like as described above, it can be suitably used for these applications.

The multilayered structure of the present invention is suitably applied to food packaging materials that particularly require superior gas barrier properties, stretchability, durability, transparency and the like among each of the applications. It is to be noted that the classification of each application has been made on the basis of general use, and each product is not limited to the applications in each field. For example, the vacuum thermal insulation board can be used not only as a sheet material for architectural materials, but also as an industrial sheet material, and the like.

The multilayered structure of the present invention is not limited to the foregoing embodiments. For example, other layer may be included in addition to the layer A and the layer B. The type of the resin composition that may constitute the other layer is not particularly limited, but preferably has strong adhesiveness with the layer A and/or the layer B. As the other layer, one having a hydroxyl group or the like included in the gas barrier resin in the layer A, or having a molecular chain including a functional group that generates a bond via a reaction with a functional group (for example, a carbamate group or an isocyanate group in the molecular chain of TPU) in the layer B is particularly preferred.

In addition, the multilayered structure of the present invention may have a supporting layer laminated on either one or both faces of the aforementioned laminate having no less than 8 resin-layers. The supporting layer is not particularly limit, which may not be a resin layer, and for example, a general synthetic resin layer, a synthetic resin film or the like may be used. Also, laminating means of the supporting layer is not particularly limited, and adhesion by an adhesive, extrusion lamination, or the like may be employed.

EXAMPLES

Hereinafter, the present invention is explained in more specifically by way of Examples, but the present invention is not limited to the following Examples.

Production Example 1

Production of Pellet (A-1)

Into a polymerization tank equipped with a cooling device and a stirrer were charged 20,000 parts by mass of vinyl acetate, 2,000 parts by mass of methanol, 10 parts by mass of 2,2'-azobis-(4-methoxy-2,4-dimethylvaleronitrile) as a polymerization initiator, and replacement with nitrogen was carried out while stirring. Thereafter, ethylene was introduced thereto, followed by adjusting the internal temperature to 60° C. and the ethylene pressure to 45 Kg/cm$^2$, and the temperature and the pressure were kept for 4 hrs while stirring to permit polymerization. Next, sorbic acid (SA) in an amount of 10 parts by mass (0.05% by mass with respect to vinyl acetate charged) was dissolved in methanol to prepare a 1.5% by mass solution, which was added to the polymerization tank. The degree of polymerization was 45% with respect to vinyl acetate charged. The copolymerization reaction liquid was supplied to the purge column, and after unreacted vinyl acetate was eliminated from the top of the tower by introduction of methanol steam from the bottom of the tower, a 40% methanol solution of the copolymer was obtained. The copolymer had a content of ethylene units of 32.5 mol %, and a content of vinyl acetate units of 67.5 mol %.

A methanol solution of the copolymer was introduced into a saponification reaction vessel, and then a sodium hydroxide/methanol solution (85 g/L) was added so as to attain 0.5 equivalent with respect to the vinyl acetate component in the copolymer. Thereto was further added methanol to adjust the copolymer concentration of 15% by mass. The temperature in the reaction vessel was elevated to 60° C., and the reaction was allowed while blowing nitrogen gas into the reaction vessel for 5 hrs. Thereafter, the reaction was stopped by neutralizing with acetic acid, and the content was removed from the reaction vessel and was allowed for deposition in a particulate form by leaving to stand at ordinary temperature. An operation including deliquoring deposited particles with a centrifugal separator and further adding a large amount of water followed by deliquoring was repeated to obtain EVOH (A-1) having a saponification degree of 99.5% (density: 1.19 g/cm$^3$).

EVOH (A-1) thus obtained was subjected to a treatment with an aqueous solution containing acetic acid, sodium acetate, sodium hydrogenphosphate and orthoboric acid (OBA) (an aqueous solution containing 0.3 g of acetic acid, 0.2 g of sodium acetate, 0.05 g of sodium hydrogenphosphate and 0.35 g of orthoboric acid dissolved in 1 L), at a bath ratio of 20, followed by drying and pelletization with an extruder to give a pellet (A-1). The MFR of the pellet (A-1) was 1.8 g/10 min (190° C., under a load of 2160 g). In addition, the pellet (A-1) had a content of acetate of 150 ppm, a content of sodium ion of 140 ppm, a content of the phosphate compound in terms of phosphoric acid group equivalent of 45 ppm, and a content of the boron compound in terms of a boron equivalent value of 260 ppm.

Production Example 2

Production of Pellet (A-2)

Into a polymerization tank equipped with a cooling device and a stirrer were charged 20,000 parts by mass of vinyl acetate, 4,000 parts by mass of methanol, 10 parts by mass of acetyl peroxide as a polymerization initiator (500 ppm with respect to the amount of vinyl acetate charged), 0.4 parts by mass of citric acid (20 ppm with respect to the amount of vinyl acetate charged), and 560 parts by mass of 3,4-diacetoxy-1-butene, and replacement with nitrogen was carried out while stirring. Thereafter, ethylene was introduced thereto, followed by adjusting the internal temperature to 67° C. and the ethylene pressure to 35 Kg/cm². Subsequently, polymerization was allowed while gradually adding 3,4-diacetoxy-1-butene in a total amount of 180 parts by mass for 6 hrs until the degree of polymerization reached 50% with respect to vinyl acetate charged. Thereafter, sorbic acid (SA) in an amount of 10 parts by mass (500 ppm with respect to the amount of vinyl acetate charged) was dissolved in methanol to prepare a 1.5% by mass solution, which was added to the polymerization tank. The copolymerization reaction liquid was supplied to the purge column, and after unreacted vinyl acetate was eliminated from the top of the tower by introduction of methanol steam from the bottom of the tower, a 40% by mass methanol solution of the copolymer was obtained. The copolymer had a content of ethylene units of 29.0 mol %.

A methanol solution of the copolymer was introduced into a saponification reaction vessel, and then a sodium hydroxide/methanol solution (85 g/L) was added so as to attain 0.5 equivalent with respect to the vinyl acetate component in the copolymer. Thereto was further added methanol to adjust the copolymer concentration of 15% by mass. The temperature in the reaction vessel was elevated to 60° C., and the reaction was allowed while blowing nitrogen gas into the reaction vessel for 5 hrs. Thereafter, the reaction was stopped by neutralizing with acetic acid, and the content was removed from the reaction vessel and was allowed for deposition in a particulate form by leaving to stand at ordinary temperature. An operation including deliquoring deposited particles with a centrifugal separator and further adding a large amount of water followed by deliquoring was repeated to obtain EVOH (A-2) having a saponification degree of 99.5% (density: 1.19 g/cm³).

It should be noted that as the structural unit (I) of the EVOH (A-2) other than the ethylene unit and the vinyl alcohol unit, a structural unit having the following structure was introduced, and the amount introduced was 2.5 mol % from the determination by ¹H-NMR (internal standard substance: tetramethylsilane; solvent: d6-DMSO).

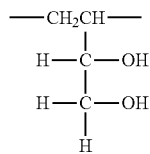

EVOH (A-2) thus obtained was subjected to a treatment with an aqueous solution containing acetic acid, sodium acetate, sodium hydrogenphosphate and orthoboric acid (OBA) (an aqueous solution containing 0.3 g of acetic acid, 0.2 g of sodium acetate, 0.07 g of sodium hydrogenphosphate and 0.32 g of orthoboric acid dissolved in 1 L), at a bath ratio of 20, followed by drying and pelletization with an extruder to give a pellet (A-2). The MFR of the pellet (A-2) was 1.2 g/10 min (190° C., under a load of 2160 g). In addition, the pellet (A-2) had a content of acetate of 150 ppm, a content of sodium of 150 ppm, a content of the phosphate compound in terms of phosphoric acid group equivalent of 50 ppm, and a content of the boron compound in terms of a boron equivalent value of 150 ppm.

Production Example 3

Production of Pellet (A-3)

Into a polymerization tank equipped with a cooling device and a stirrer were charged 20,000 parts by mass of vinyl acetate, 1,020 parts by mass of methanol, 3.5 parts by mass of 2,2'-azobis-(4-methoxy-2,4-dimethylvaleronitrile) as a polymerization initiator, and replacement with nitrogen was carried out while stirring. Thereafter, ethylene was introduced thereto, followed by adjusting the internal temperature to 60° C. and the ethylene pressure to 59 Kg/cm², and the temperature and the pressure were kept for 4 hrs while stirring to permit polymerization. Next, sorbic acid (SA) in an amount of 10 parts by mass (0.05% by mass with respect to vinyl acetate charged) was dissolved in methanol to prepare a 1.5% by mass solution, which was added to the polymerization tank. The degree of polymerization was 30% with respect to vinyl acetate charged. The copolymerization reaction liquid was supplied to the purge column, and after unreacted vinyl acetate was eliminated from the top of the tower by introduction of methanol steam from the bottom of the tower, a 40% by mass methanol solution of the copolymer was obtained. The copolymer had a content of ethylene units of 44.5 mol %, and a content of vinyl acetate units of 55.5 mol %.

A methanol solution of the copolymer was introduced into a saponification reaction vessel, and then a sodium hydroxide/methanol solution (85 g/L) was added so as to attain 0.5 equivalent with respect to the vinyl acetate component in the copolymer. Thereto was further added methanol to adjust the copolymer concentration of 15% by mass. The temperature in the reaction vessel was elevated to 60° C., and the reaction was allowed while blowing nitrogen gas into the reaction vessel for 5 hrs. Thereafter, the reaction was stopped by neutralizing with acetic acid, and the content was removed from the reaction vessel and was allowed for deposition in a particulate form by leaving to stand at ordinary temperature. An operation including deliquoring deposited particles with a centrifugal separator and further adding a large amount of water followed by deliquoring was repeated to obtain EVOH having a saponification degree of 99.5%.

EVOH thus obtained was subjected to a treatment with an aqueous solution containing acetic acid and sodium hydrogenphosphate (an aqueous solution containing 0.05 g of acetic acid, 0.02 g of sodium hydrogenphosphate and 0.03 g of orthoboric acid dissolved in 1 L) at a bath ratio of 20, followed by drying to give EVOH composition particles. The EVOH composition particles had MFR of 4.6 g/10 min (190° C., under a load of 2160 g). In addition, the EVOH composition particles had a content of acetate of 40 ppm, a content of the phosphate compound in terms of phosphoric acid group equivalent of 20 ppm.

Using the EVOH composition particles obtained as described above, epoxypropane was allowed to react with EVOH by means of a biaxial extruder "TEM-35BS" (37 mmφ, L/D=52.5) manufactured by Toshiba Machine Co., Ltd. under the extrusion conditions as in the following while adding a catalyst. Unreacted epoxypropane was eliminated from a vent, and then a 8.2% by mass aqueous ethylenediamine tetraacetate trisodium hydrate solution was added as a catalyst quencher to permit pelletization, followed by drying to give a pellet (A-3) that includes epoxypropane-modified ethylene-vinyl alcohol copolymer EVOH (A-3) having the following structure (density: 1.13 g/cm³) as a structural unit (II) other than the ethylene unit and the vinyl alcohol unit.

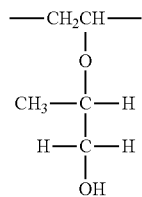

Cylinder, die temperature settings:
resin feed port/cylinder part inlet/adaptor/die=160/200/240/240 (° C.)
Screw rotation speed: 400 rpm
Ethylene-vinyl alcohol copolymer feed rate: 16 kg/hr
Epoxypropane feed rate: 2.4 kg/hr (pressure during feeding: 6 MPa)
Catalyst solution feed rate: 0.32 kg/hr
Preparation of catalyst: Zinc acetylacetonato monohydrate in an amount of 28 parts by mass in was mixed with 957 parts by mass of 1,2-dimethoxyethane to give a mixed solution. To thus resulting mixed solution were added 15 parts by mass of trifluoromethane sulfonic acid while stirring, whereby a catalyst solution was obtained. In other words, 1 mol of trifluoromethane sulfonic acid was added to 1 mol of zinc acetylacetonato monohydrate to prepare a mixed solution.
Aqueous catalyst quencher solution feed rate: 0.16 kg/hr
MFR of the resulting pellet (A-3) was 3.2 g/10 min (190° C., under a load of 2160 g). In addition, the pellet (A-3) had a content of acetate of 420 ppm, a content of zinc ion of 120 ppm, a content of sodium of 130 ppm, a content of the phosphate compound in terms of phosphoric acid group equivalent of 20 ppm, a content of trifluoromethane sulfonic acid ion of 280 ppm, and a content of the boron compound in terms of a boron equivalent value of 12 ppm. In addition, the amount of the structural unit (II) other than the ethylene unit and the vinyl alcohol unit of the EVOH (A-3) introduced (amount of modification of epoxybutane) was, as determined by ¹H-NMR (internal standard substance: tetramethylsilane; solvent: d6-DMSO) was 5.8 mol %.

Production Example 4

Production of Pellet (A-4)

A pellet (A-4) was obtained in a similar manner to Production Example 1 except that the EVOH (A-1) having a content of ethylene units of 32.5 mol % and a saponification degree of 99.5% was subjected to a treatment using an aqueous solution containing acetic acid, sodium acetate, sodium hydrogenphosphate and orthoboric acid (OBA) (aqueous solution containing 0.3 g of acetic acid, 0.4 g of sodium acetate, 0.10 g of sodium hydrogenphosphate and 0.70 g of orthoboric acid dissolved in 1 L) at a bath ratio of 20 in Production Example 1. The MFR of the pellet (A-4) was 1.0 g/10 min (190° C., under a load of 2160 g). In addition, the pellet (A-4) had a content of acetate of 210 ppm, a content of sodium ion of 280 ppm, a content of the phosphate compound in terms of phosphoric acid group equivalent of 90 ppm, and a content of the boron compound in terms of a boron equivalent value of 520 ppm.

Production Example 5

Production of Pellet (A-5)

A pellet (A-5) was obtained in a similar manner to Production Example 1 except that the EVOH (A-1) having a content of ethylene units of 32.5 mol % and a saponification degree of 99.5% was subjected to a treatment using an aqueous solution containing acetic acid, sodium acetate, sodium hydrogenphosphate and orthoboric acid (OBA) (aqueous solution containing 0.3 g of acetic acid, 0.02 g of sodium acetate, 0.005 g of sodium hydrogenphosphate and 0.35 g of orthoboric acid dissolved in 1 L) at a bath ratio of 20 in Production Example 1. The MFR of the pellet (A-5) was 1.6 g/10 min (190° C., under a load of 2160 g). In addition, the pellet (A-5) had a content of acetate of 95 ppm, a content of sodium ion of 14 ppm, a content of the phosphate compound in terms of phosphoric acid group equivalent of 5 ppm, and a content of the boron compound in terms of a boron equivalent value of 260 ppm.

Production Example 6

Production of Pellet (A-6)

A pellet (A-6) was obtained in a similar manner to Production Example 1 except that the EVOH (A-1) having a content of ethylene units of 32.5 mol % and a saponification degree of 99.5% was subjected to a treatment using an aqueous solution containing acetic acid, sodium acetate, sodium hydrogenphosphate and orthoboric acid (OBA) (aqueous solution containing 0.3 g of acetic acid, 2.0 g of sodium acetate, 0.1 g of sodium hydrogenphosphate and 0.35 g of orthoboric acid dissolved in 1 L) at a bath ratio of 20 in Production Example 1. The MFR of the pellet (A-6) was 2.5 g/10 min (190° C., under a load of 2160 g). In addition, the pellet (A-6) had a content of acetate of 680 ppm, a content of sodium ion of 1,170 ppm, a content of the phosphate compound in terms of phosphoric acid group equivalent of 90 ppm, and a content of the boron compound in terms of a boron equivalent value of 250 ppm.

Production Example 7

Production of Pellet (A-7)

A pellet (A-7) was obtained in a similar manner to Production Example 1 except that the EVOH (A-1) having a content of ethylene units of 32.5 mol % and a saponification degree of 99.5% was subjected to a treatment using an aqueous solution containing acetic acid, magnesium acetate, sodium hydrogenphosphate and orthoboric acid (OBA) (aqueous solution containing 0.3 g of acetic acid, 0.2 g of magnesium acetate, 0.05 g of sodium hydrogenphosphate and 0.35 g of orthoboric acid dissolved in 1 L) at a bath ratio of 20 in Production Example 1. The MFR of the pellet (A-7) was 2.8 g/10 min (190° C., under a load of 2160 g). In addition, the pellet (A-7) had a content of acetate of 150 ppm, a content of sodium ion of 25 ppm, a content of magnesium ion of 110 ppm, a content of the phosphate compound in terms of phosphoric acid group equivalent of 45 ppm, and a content of the boron compound in terms of a boron equivalent value of 260 ppm.

Production Example 8

Production of Pellet (A-8)

A pellet (A-8) was obtained in a similar manner to Production Example 1 except that the EVOH (A-1) having a content of ethylene units of 32.5 mol % and a saponification degree of 99.5% was subjected to a treatment using an aqueous solution containing acetic acid, phosphoric acid and orthoboric acid (OBA) (aqueous solution containing 0.3 g of acetic acid, 0.06 g of phosphoric acid and 0.35 g of orthoboric acid dissolved in 1 L) at a bath ratio of 20 in Production Example 1. The MFR of the pellet (A-8) was 1.6 g/10 min (190° C., under a load of 2160 g). In addition, the pellet (A-8) had a content of acetate of 90 ppm, a content of the phosphate compound in terms of phosphoric acid group equivalent of 43 ppm, and a content of the boron compound in terms of a boron equivalent value of 260 ppm.

Production Example 9

Production of Pellet (A-9)

A pellet (A-9) was obtained in a similar manner to Production Example 1 except that the EVOH (A-1) having a content of ethylene units of 32.5 mol % and a saponification degree of 99.5% was subjected to a treatment using an aqueous solution containing acetic acid, sodium acetate, sodium hydrogenphosphate and orthoboric acid (OBA) (aqueous solution containing 0.3 g of acetic acid, 40.0 g of sodium acetate, 0.1 g of sodium hydrogenphosphate and 0.35 g of orthoboric acid dissolved in 1 L) at a bath ratio of 20 in Production Example 1. The MFR of the pellet (A-9) was 6.8 g/10 min (190° C., under a load of 2160 g). In addition, the pellet (A-9) had a content of acetate of 13,500 ppm, a content of sodium ion of 23,000 ppm, a content of the phosphate compound in terms of phosphoric acid group equivalent of 90 ppm, and a content of the boron compound in terms of a boron equivalent value of 250 ppm.

Production Example 10

Production of Pellet (A-10)

A pellet (A-10) was obtained in a similar manner to Production Example 1 except that the EVOH (A-1) having a content of ethylene units of 32.5 mol % and a saponification degree of 99.5% was subjected to a treatment using an aqueous solution containing acetic acid, sodium acetate, sodium hydrogenphosphate and orthoboric acid (OBA) (aqueous solution containing 0.3 g of acetic acid, 0.2 g of sodium acetate, 0.05 g of sodium hydrogenphosphate and 7.0 g of orthoboric acid dissolved in 1 L) at a bath ratio of 20 in Production Example 1. The MFR of the pellet (A-10) was 0.05 g/10 min (190° C., under a load of 2160 g). In addition, the pellet (A-10) had a content of acetate of 150 ppm, a content of sodium ion of 140 ppm, a content of the phosphate compound in terms of phosphoric acid group equivalent of 45 ppm, and a content of the boron compound in terms of a boron equivalent value of 5,000 ppm.

Production Example 11

Production of Pellet (A-11)

Into a reaction chamber equipped with a stirrer and a partial condenser were added 600 parts by mass of purified adipic acid, and heated under a nitrogen stream to melt the content. Thereafter, when heated to 180° C., 560 parts by mass of m-xylylenediamine having a purity of 99.93% by mass was added dropwise under normal pressure while further elevating the temperature. When the internal temperature reached 250° C., the dropwise addition of m-xylylenediamine was ceased, and the mixture was further stirred under normal pressure for additional 1 hour after the internal temperature reached 255° C. Thereafter, the reaction product was recovered, and then pulverized after air-cooled to obtain particulate poly m-xylyleneadipamide. The particulate matter thus obtained was charged into a rolling vacuum solid phase polymerization apparatus, and an operation including reducing the pressure to no greater than 200 Pa while rotating at 10 rpm, and raising up to normal pressure with no less than 99% by volume nitrogen was repeated three times. Thereafter, the internal temperature of the solid phase polymerization apparatus was elevated from the room temperature to 220° C. at a rate of temperature rise of 50° C./hour to carry out solid phase polymerization by heating the particulate matter. Specifically, in the solid phase polymerization, vacuum operation was started when the temperature of the particulate matter reached 135° C., and cooling was started 360 min after the temperature of the particulate matter reached 150° C. under normal pressure in nitrogen. Thereafter, when the temperature of the particulate matter became no greater than 80° C. under nitrogen stream, fine powder attached onto the surface of the particulate matter was eliminated to coordinate the size of the particulate matter to 6 to 10 mesh. After the resulting particulate matter was subjected to melt extrusion using a biaxial extruder at 260° C. to give a strand, pelletization was carried out to obtain a pellet (A-11) of nylon MXD6 (density: 1.22 g/cm$^3$). The resulting pellet (A-11) had a Vicat softening temperature of 225° C.

The pellet (A-11) had a melt viscosity $\eta_{1A}'$ of 1,100 Pa·s, and $\eta_{2A}'$ of 230 Pa·s, as determined at a temperature (255° C.) that is higher than the Vicat softening temperature by 30° C., and thus $(1/2) \log_{10} (\eta_{2A}')$ was −0.340.

Production Example 12

Production of Pellet (A-12)

Glycolic acid (manufactured by Wako Pure Chemical Industries, Ltd.) was charged into an autoclave reaction vessel, and the temperature was elevated to 200° C. by heating over about 2 hrs while stirring to allow for condensation while generated water was distilled off. Subsequently, a low-boiling point fraction was distilled off by reducing the pressure to 20 kPa and keeping the same for 2 hrs to prepare a glycolic acid oligomer. The glycolic acid oligomer in an amount of 120 parts by mass was charged into a reaction chamber, and thereto were added 500 parts by mass of benzylbutyl phthalate (manufactured by Junsei Chemical Co., Ltd.) as a solvent, and 15 parts by mass of polypropylene glycol (manufactured by Junsei Chemical Co., Ltd., #400) as a solubilizing agent. In a nitrogen gas atmosphere, solution-phase depolymerization of the glycolic acid oligomer was permitted by heating the mixture to about 270° C. under a pressure of 5 kPa, and thus produced glycolide was codistilled with benzylbutyl phthalate. To the resulting codistillate was added cyclohexane in a volume of about 2 times, thereby allowing the glycolide to be precipitated from benzylbutyl phthalate, and the glycolide was filtered off. The filtered matter was recrystallized with ethyl acetate, and dried under reduced pressure to obtain purified glycolide. The synthetic glycolide in an amount of 100 parts by mass, 0.006 parts by mass of tin octanoate and 0.05 parts by mass of lauryl alcohol were charged into a reaction chamber, and polymerization was allowed at 220° C. for 3 hrs. Following the polymerization, the produced polymer was removed after cooling and pulverized to obtain a particulate polymer. The particulate matter was washed with acetone, vacuum dried at 30° C., and the size of the obtained particulate matter was adjusted. After the resulting particulate matter was subjected to melt extrusion using a biaxial extruder at 240° C. to give a strand, pelletization was carried out to obtain a pellet (A-12) of polyglycolic acid (PGA) (density: 1.60 g/cm$^3$). The resulting pellet (A-12) had a Vicat softening temperature of 204° C.

The pellet (A-12) had a melt viscosity $\eta_{1,4}'$ of 850 Pa·s, and $\eta_{2,4}'$ of 210 Pa·s, as determined at a temperature (234° C.) that is higher than the Vicat softening temperature by 30° C., and thus (1/2) $\log_{10} (\eta_{2,4}'/\eta_{1,4}')$ was −0.304.

Production Example 13

Production of Pellet (A-13)

Into a reaction vessel equipped with a stirrer, a vacuum port and a feed port of nitrogen were charged 108 parts by mass of p-acetoxybenzoic acid, and 76.8 parts by mass of 0.70 dl/g polyethylene terephthalate having a limiting viscosity as determined using an equivalent mass mixed solvent of phenol/tetrachloroethane at 30° C. After the air in the reaction system was replaced with nitrogen three times, the mixture was stirred under a nitrogen stream at 280° C. for about 1 hour, whereby acetic acid in an amount of about 90% of theoretical amount of distillation was distilled off. Subsequently, the pressure of the system was gradually reduced to allow for a reaction at a final pressure of no greater than 1 mmHg. When the polymerization reaction was completed, the resulting reaction product was extruded from a nozzle in the form of a strand and cut to give a cylindrical pellet (A-13) of a wholly aromatic liquid crystal polyester (density: 1.45 g/cm$^3$). The resulting pellet (A-13) had a Vicat softening temperature of 193° C.

The pellet (A-13) had a melt viscosity $\eta_{1,4}'$ of 790 Pa·s, and $\eta_{2,4}'$ of 310 Pa·s, as determined at a temperature (223° C.) that is higher than the Vicat softening temperature by 30° C., and thus (1/2) $\log_{10} (\eta_{2,4}'/\eta_{1,4}')$ was −0.203.

Production Example 14

Production of Pellet (A-14)

(Synthesis Example of Oxygen Scavenger: Synthesis of Polyoctenylene)

Air in a 5 L three-necked flask equipped with a stirrer and a thermometer was replaced with dry nitrogen, and thereafter 624 parts by mass heptane dissolving 110 parts by mass of cis-cyclooctene and 187 parts by mass of cis-4-octene were charged.

Next, a catalyst solution was prepared by dissolving 0.0424 parts by mass of [1,3-bis-(2,4,6-trimethylphenyl)-2-imidazolidinylidene]dichloro(phenylmethylene) (tricyclohexylphosphine)ruthenium in 3.00 parts by mass of toluene, and the solution was quickly added to the aforementioned heptane solution to allow for a ring-opening metathesis polymerization (ROMP) at 55° C. One hour later, an analysis with gas chromatography (manufactured by Shimadzu Corporation, GC-14B; column: manufactured by Chemicals Inspection & Testing Institute, Japan, G-100) was conducted to ascertain disappearance of cis-cyclooctene. Thereafter, 1.08 parts by mass of ethylvinyl ether were added, and the mixture was stirred for additional 10 minutes.

The resulting reaction liquid were added 600 parts by mass of methanol, and the mixture was stirred at 55° C. for 30 min, followed by allowing to stand still at 40° C. for 1 hour. After liquid separation was conducted, the underlayer (layer of methanol) was eliminated. Thereto were added 600 parts by mass of methanol again, and the mixture was stirred at 55° C. for 30 min, followed by allowing to stand still at 40° C. for 1 hour. After liquid separation was conducted, the underlayer (layer of methanol) was eliminated. Heptane in the heptane layer (upperlayer) was distilled off under vacuum, and further dried with a vacuum dryer at 1 Pa and 100° C. for 6 hrs to give 93.7 parts by mass of a polymer (yield: 88%) having a weight average molecular weight (Mw) of 168,000 and a number average molecular weight (Mn) of 37,000. The proportion of carbon-carbon double bonds in the side chain of the polymer (polyoctenylene) with respect to the entire carbon-carbon double bonds was 0%.

The pellet (A-1) obtained in Production Example 1 in an amount of 90 parts by mass, 10 parts by mass of polyoctenylene obtained in Synthesis Example described above, and 0.4242 parts by mass of cobalt (II) stearate (0.0400 parts by mass in terms of cobalt atom) were dry blended, and extruded using a biaxial extruder "TEM-35BS" (37 mmϕ, L/D=52.5) manufactured by Toshiba Machine Co., Ltd. under the extrusion conditions as in the following. After pelletization, drying gave a pellet (A-14) of a composition containing EVOH (A-1), polyoctenylene and cobalt stearate.

Cylinder, die temperature settings:
cylinder part resin feed port/cylinder part/adaptor/die=160/200/220/220 (° C.)
Screw rotation speed: 200 rpm
Feed rate: 20 kg/hr MFR of the resulting pellet (A-14) was 4.5 g/10 min (210° C., under a load of 2160 g). In addition, the pellet (A-14) had a content of acetate of 105 ppm, a content of sodium ion of 125 ppm, a content of cobalt ion of 400 ppm, a content of the phosphate compound in terms of phosphoric acid group equivalent of 40 ppm, and a content of the boron compound in terms of a boron equivalent value of 230 ppm.

Production Example 15

Production of Pellet (B-1-1a)

A thermoplastic polyurethane resin (TPU) was produced by melt kneading a mixture of: 68.8% by mass of polyesterdiol having 2.0 hydroxyl groups per molecule and having a number average molecular weight of 1,000, obtained by allowing 1,4-butanediol to react with adipic acid; 27.5% by mass of 4,4-diphenyl methanediisocyanate; and 3.7% by mass of 1,4-butanediol by means of a multiscrew extruder (die temperature: 260° C.) for 20 min. This thermoplastic polyurethane resin was designated as TPU (B-1-1) (density: 1.16 g/cm$^3$; Shore A hardness: 85). The TPU (B-1-1) thus obtained was used as a pellet (B-1-1a).

Production Example 16

Production of Pellet (B-1-1b)

With 100 parts by mass of the TPU (B-1-1) obtained as described above, 0.37 parts by mass of sodium stearate were melt mixed by means of a biaxial extruder to produce a pellet (B-1-1b). The content of sodium ion in the pellet (B-1-1b) was 140 ppm.

Production Example 17

Production of Pellet (B-1-2a)

A thermoplastic polyurethane resin (TPU) was produced by melt kneading a mixture of: 61.6% by mass of the polyesterdiol described above; 32.3% by mass of 4,4-diphenyl methanediisocyanate; and 6.1% by mass of 1,4-butanediol by means of a multiscrew extruder (die temperature: 260° C.) for 20 min. This thermoplastic polyurethane resin was designated as TPU (B-1-2) (density: 1.17 g/cm$^3$; Shore A hardness: 90). The TPU (B-1-2) thus obtained was used as a pellet (B-1-2a).

Production Example 18

Production of Pellet (B-1-2b)

With 100 parts by mass of TPU (B-1-2) obtained as described above, 0.27 parts by mass of magnesium stearate were melt mixed by means of a biaxial extruder to produce a pellet (B-1-2b). The content of magnesium ion in the pellet (B-1-2b) was 110 ppm.

Production Example 19

Production of Pellet (B-1-3a)

A thermoplastic polyurethane resin (TPU) was produced by melt kneading a mixture of: 60.5% by mass of polytetramethylene glycol having 2.0 hydroxyl groups per molecule and a number average molecular weight of 1,000; 33.1% by mass of 4,4-diphenyl methanediisocyanate; and 6.4% by mass of 1,4-butanediol by means of a multiscrew extruder (die temperature: 260° C.) for 20 min. This thermoplastic polyurethane resin was designated as TPU (B-1-3) (density: 1.16 g/cm$^3$; Shore A hardness: 75). The TPU (B-1-3) thus obtained was used as a pellet (B-1-3a).

Production Example 20

Production of Pellet (B-1-3b)

With 100 parts by mass of TPU (B-1-3) obtained as described above, 0.27 parts by mass of magnesium stearate were melt mixed by means of a biaxial extruder to produce a pellet (B-1-3b). The content of magnesium ion in the pellet (B-1-3b) was 110 ppm.

Production Example 21

Production of Pellet (B-1-4-a)

A thermoplastic polyurethane resin (TPU) was produced by melt kneading a mixture of: 80.6% by mass of polytetramethylene glycol having 2.0 hydroxyl groups per molecule and a number average molecular weight of 2,000; 17.0% by mass of 4,4-diphenyl methanediisocyanate; and 2.4% by mass of 1,4-butanediol by means of a multiscrew extruder (die temperature: 260° C.) for 20 min. This thermoplastic polyurethane resin was designated as TPU (B-1-4) (density: 1.16 g/cm$^3$; Shore A hardness: 65). The TPU (B-1-4) thus obtained was used as a pellet (B-1-4-a).

Production Example 22

Production of Pellet (B-2-1a)

Into a 10 L high-pressure autoclave equipped with a stirrer were charged 5.3 kg of distilled water, 1,390 g of aqueous hexamethylenediamine solution (80% by mass), 1,030 g of isophthalic acid and 440 g of terephthalic acid, and the mixture was stirred to homogenously dissolved by stirring, and 5.3 g of acetic acid was further added thereto. After replacing the air in the autoclave with nitrogen, heating and stirring were started, and water was distilled off until the concentration of a nylon salt became 90% by mass while keeping the internal pressure of 2.5 kg/cm$^2$G. Next, heating was further continued such that the internal pressure became 13 kg/cm$^2$G, and then the internal temperature was elevated until reaching to 250° C., while further distilling off water. Thereafter, the pressure was gradually dropped, and finally polymerization was carried out under a condition with a reduced pressure of 700 Torr for 1 hour. After the pressure was raised to normal pressure, the product was drawn from a nozzle at the lower part of the autoclave as a strand, followed by cutting. Thus resulting pellet was dried under reduced pressure to give nylon 6I/6T. The polyamide was designated as PA (B-2-1). A ratio (isophthalic acid (I) unit/terephthalic acid (T) unit) of the number of isophthalic acid units to the number of terephthalic acid units in the PA (B-2-1) was 70/30 (molar ratio). In addition, the relative viscosity was 2.3, and the amount of the terminal carboxyl groups was 22 µeq/g. Thus resulting PA (B-2-1) (density 1.19 g/cm$^3$) was used as a pellet (B-2-1a).

Production Example 23

Production of Pellet (B-2-1b)

With 100 parts by mass of PA (B-2-1) obtained as described above, 0.37 parts by mass of sodium stearate were melt mixed by means of a biaxial extruder to produce a pellet (B-2-1b). The content of sodium ion in the pellet (B-2-1b) was 140 ppm.

Production Example 24

Production of Pellet (B-2-2a)

Into a 5 L high-pressure autoclave equipped with a stirrer were charged 1,088 g of ε-caprolactam, 363 g of ω-lauryllactam, and 36 g of distilled water. After replacing the air in the autoclave with nitrogen, heating and stirring were started, and the temperature was elevated to 260° C. Polymerization was allowed with stirring while regulating the pressure to 35 kg/cm$^2$G for 2 hrs. Thereafter, the pressurized state was released over 2 hrs until reaching to normal pressure, and finally polymerization was carried out under a condition with a reduced pressure of 380 Torr for 1 hour. After the pressure was raised to normal pressure, the product was drawn from the nozzle at the lower part of the autoclave as a strand, followed by cutting. Thus resulting pellet was dried under reduced pressure to give a nylon 6/12 copolymer. The polyamide was designated as PA (B-2-2). A mass ratio (6 unit/12 unit) of 6 unit to 12 unit in PA (B-2-2) was 75/25 (mass ratio). In addition, the relative viscosity was 2.3, and the amount of the terminal carboxyl groups was 41 µeq/g. The resulting PA (B-2-2) (density 1.10 g/cm$^3$) was used as a pellet (B-2-2a).

Production Example 25

Production of Pellet (B-2-2b)

With 100 parts by mass of PA (B-2-2) obtained as described above, 0.27 parts by mass of magnesium stearate were melt mixed by means of a biaxial extruder to produce a pellet (B-2-2b). The content of magnesium ion in the pellet (B-2-2b) was 110 ppm.

Production Example 26

Production of Pellet (B-2-3a)

Into a high-pressure autoclave equipped with a stirrer was charged an aqueous solution prepared by dissolving 60 parts by mass of ε-caprolactam, and 0.0063 parts by mass of disodium monohydrogenphosphite pentahydrate in 2 parts by mass of desalted water. After replacing the air in the autoclave with nitrogen, heating and stirring were started, and the temperature was elevated to 280° C. Polymerization was carried out while regulating the pressure to 36 kg/cm²G with stirring for 2 hrs. Thereafter, the pressurized state was released over 2 hrs until reaching to normal pressure, and finally polymerization was carried out under a condition with a reduced pressure of 400 Torr for 1 hour. After the pressure was raised to normal pressure, the product was drawn from the nozzle at the lower part of the autoclave as a strand, followed by cutting. Thus resulting pellet was dried under reduced pressure to give a nylon 6 polymer. The polyamide (density 1.14 g/cm³) was designated as PA (B-2-3). The relative viscosity of PA (B-2-3) was 3.8, and the content of sodium ion was 1 ppm. The resulting PA (B-2-3) was used as a pellet (B-2-3a). The pellet (B-2-3a) had a Vicat softening temperature of 190° C., and a melting point of 210° C.

Production Example 27

Production of Pellet (B-2-3b)

With 100 parts by mass of PA (B-2-3) obtained as described above, 0.27 parts by mass of magnesium stearate were melt mixed by means of a biaxial extruder to produce a pellet (B-2-3b). The content of magnesium ion in the pellet (B-2-3b) was 110 ppm. In addition, the softening point of the pellet (B-2-3b) was 190° C., and the melting point was 210° C.

Production Example 28

Production of Pellet (B-2-4-a)

To a reaction vessel having a stirrer equipped with a nitrogen feed port, a distillation tube and a pot for charging a catalyst were added 2,020 parts by mass of polyoxyethylene glycol having a number average molecular weight of 2,000, 860 parts by mass of polyoxytetramethylene glycol having a number average molecular weight of 1,800, 248 parts by mass of terephthalic acid, 1,300 mass of ε-caprolactam and 8 parts by mass of pentaerythrityl-tetrakis[3-(3,5-di-t-butyl-4-hydroxyphenyl)propionate], and the reaction was allowed with a reduced pressure of 500 Torr at 250° C. for 3 hrs. Subsequently, the reduced pressure was gradually raised to distill off unreacted ε-caprolactam, and thereafter a liquid prepared by dissolving 8 parts by mass of tetrabutoxy zirconium in 50 parts by mass of ε-caprolactam was added to the reaction vessel from the pot of the catalyst under a reduced pressure, followed by allowing for the reaction at 260° C. and 1 Torr for 2.5 hrs. The product was drawn from the nozzle at the lower part of the reaction vessel as a strand, followed by cutting. Thus resulting pellet was dried under reduced pressure to give a polyamide elastomer. The polyamide (density: 1.18 g/cm³) was designated as PA (B-2-4). The resulting PA (B-2-4) was used as a pellet (B-2-4-a). The content of zirconium ion in the pellet (B-2-4-a) was 420 ppm.

Production Example 29

Production of Pellet (B-2-4-b)

With 100 parts by mass of the PA (B-2-4) obtained as described above, 0.27 parts by mass of cobalt stearate were melt mixed by means of a biaxial extruder to produce a pellet (B-2-4-b). The content of cobalt ion in the pellet (B-2-4-b) was 110 ppm.

Production Example 30

Production of Pellet (B-3-1a)

Low-density polyethylene having a MFR of 2.4 g/10 min (190° C., under load of 2,160 g) and a density of 0.92 g/cm³ in an amount of 100 parts by mass, 12 parts by mass of maleic anhydride, and 330 parts by mass of t-butylbenzene were mixed, and a nitrogen atmosphere was provided, followed by dissolving the low-density polyethylene at 160° C. Following the dissolution, a mixture of 1.7 parts by mass of di-t-butylperoxide and 17 parts by mass of t-butylbenzene was added thereto while stirring to permit the reaction for 2 hrs. Next, the reaction liquid was removed, and stirred at room temperature to precipitate the resin in the form of powder. Thus obtained powder was washed with acetone, followed by vacuum drying to give an adhesive resin (B-3-1) that is maleic anhydride-modified low-density polyethylene of white powder.

Subsequently, 100 parts by mass of thus resulting adhesive resin (B-3-1), and 900 parts by mass of the low-density polyethylene which is the same as one used in the aforementioned step were subjected to melt mixing in a biaxial segment type extruder to give a pellet (B-3-1a).

Production Example 31

Production of Pellet (B-3-1b)

With respect to 100 parts by mass of the pellet (B-3-1a) obtained as described above, 0.19 parts by mass of sodium stearate were melt mixed using a biaxial extruder to give a pellet (B-3-1b). The content of sodium ion in the pellet (B-3-1b) was 140 ppm.

Production Example 32

Production of Pellet (B-3-2a)

An ethylene 1-butene copolymer having a MFR of 1.1 g/10 min (190° C., under load of 2,160 g), a density of 0.92 g/cm³, and a content of 1-butene of 4 mol % in an amount of 100 parts by mass, 12 parts by mass of maleic anhydride, and 330 parts by mass of t-butylbenzene were mixed, and a nitrogen atmosphere was provided, followed by dissolving the ethylene 1-butene copolymer at 160° C. Following the dissolution, a mixture of 1.7 parts by mass of di-t-butylperoxide and 17 parts by mass of t-butylbenzene was added thereto while stirring to permit the reaction for 2 hrs. Next, the reaction liquid was removed, and stirred at room temperature to precipitate the resin in the form of powder. Thus obtained powder was washed with acetone, followed by vacuum drying to give an adhesive resin (B-3-2) that is maleic anhydride-modified ethylene 1-butene copolymer of white powder.

Subsequently, 100 parts by mass of thus resulting adhesive resin (B-3-2), and 900 parts by mass of the ethylene 1-butene copolymer which is the same as one used in the aforementioned step were subjected to melt mixing in a biaxial segment type extruder to give a pellet (B-3-2a).

Production Example 33

Production of Pellet (B-3-2b)

With respect to 100 parts by mass of the pellet (B-3-2a) obtained as described above, 0.28 parts by mass of magnesium stearate were melt mixed using a biaxial extruder to give a pellet (B-3-2b). The content of magnesium ion in the pellet (B-3-2b) was 110 ppm.

Production Example 34

Production of Pellet (B-3-3a)

An ethylene-vinyl acetate copolymer having a MFR of 3.0 g/10 min (190° C., under load of 2,160 g), a density of 0.935 g/cm$^3$, and a content of vinyl acetate of 15% by mass in an amount of 100 parts by mass, 12 parts by mass of maleic anhydride, and 330 parts by mass of t-butylbenzene were mixed, and a nitrogen atmosphere was provided, followed by dissolving the ethylene-vinyl acetate copolymer at 160° C. Following the dissolution, a mixture of 1.7 parts by mass of di-t-butylperoxide and 17 parts by mass of t-butylbenzene was added thereto while stirring to permit the reaction for 2 hrs. Next, the reaction liquid was removed, and stirred at room temperature to precipitate the resin in the form of powder. Thus obtained powder was washed with acetone, followed by vacuum drying to give an adhesive resin (B-3-3) that is maleic anhydride-modified ethylene-vinyl acetate copolymer of white powder.

Subsequently, 100 parts by mass of thus resulting adhesive resin (B-3-3), and 900 parts by mass of the ethylene-vinyl acetate copolymer which is the same as one used in the aforementioned step were subjected to melt mixing in a biaxial segment type extruder to give a pellet (B-3-3a).

Production Example 35

Method for Producing Pellet (B-3-3b)

With respect to 100 parts by mass of the pellet (B-3-3a) obtained as described above, 0.19 parts by mass of sodium stearate were melt mixed using a biaxial extruder to give a pellet (B-3-3b). The content of sodium ion in the pellet (B-3-3b) was 140 ppm.

Example 1

The pellet (A-1) and the pellet (B-1-1a) were supplied to a coextruder in molten states at 210° C. with a 17-layered feed block such that a multilayered structure was formed which included eight layers A and nine layers B alternately with the resin composition that constitutes each pellet, and coextruded to allow for interflowing, whereby a multilayer laminate was produced. The thickness of the channel of each layer was varied so as to gradually increase in the feed block from the front face side toward the middle side, whereby melts of the pellet (A-1) and the pellet (B-1-1a) that interflowed were extruded such that the each layer of the extruded multilayered structure has a uniform thickness. In addition, a slit shape was designed so as to give an approximately the same thickness of the layer A and the layer B that are adjacent with each other. The laminate consisting of 17 layers in total thus obtained was maintained to have the surface temperature of 25° C., and solidified by rapid cooling on a casting drum which had been electrostatically applied. The cast film obtained by solidification by rapid cooling was subjected to compression bonding on an exfoliate paper, and then rolled. It should be noted that the channel shape and total amount of discharge were predetermined such that a time period of about 4 min elapsed from the interflow of the melts of the pellet (A-1) and the pellet (B-1-1a) until the solidification by rapid cooling on the casting drum.

As a result of observation of a cross section of the cast film obtained as described above with DIGITAL MICROSCOPE VHX-900 (manufactured by KEYENCE CORPORATION), a multilayered structure having an average thickness of each layer A and layer B being 1 μm, and an average thickness of the entirety being 17 μm was revealed. It is to be noted that each thickness was an average of measurements at randomly selected nine points.

Examples 2 to 60, and Comparative Examples 1 to 34

Multilayered structures according to Examples 2 to 60, and Comparative Examples 1 to 34 were produced in a similar manner to Example 1 except that the pellet type, lamination state, coextrusion forming temperature, and the type and content of the metal salt as shown in Table 1 to Table 5 and Table 7 to Table 11 were employed.

In Table 1, Table 2, Table 9 and Table 10, the melt viscosity represents a melt viscosity at 210° C., whereas in Table 4 and Table 5, the melt viscosity represents a melt viscosity at 220° C. It is to be noted that in Table 6, the melt viscosity at 210° C. of each resin used in Examples 23 to 38 and Comparative Examples 12 to 16 is shown together with. In addition, the melt viscosity shown in Table 3, Table 7, Table 8 and Table 11 shows a melt viscosity at a temperature in forming by coextrusion of each Example and Comparative Example (i.e., a temperature higher than the Vicat softening temperature of the resin composition of the layer A by 30° C.)

(Method for Evaluation of Characteristics of Multilayered Structure)

Each of the characteristics of the multilayered structures obtained in Examples 1 to 60 and Comparative Examples 1 to 34 was evaluated according to the following method. The results of evaluation of these characteristics are shown in Table 1 to Table 5 and Table 7 to Table 11 together with the proportion of components, physical properties, and the like in the layer A and the layer B.

(1) Melt Viscosity of Resin Composition Constituting Each Layer

The melt viscosity of the resin composition constituting the layer A and the resin composition constituting the layer B at predetermined temperatures was measured on a melted sample pellet using Capilograph (manufactured by Toyo Seiki Seisaku-sho, Ltd., model IC).

(2) Appearance of Multilayered Structure

The presence/absence of flow patch, streak, and fish eye of the multilayered structures obtained were confirmed by visual inspection. The appearance of the multilayered structures was determined according to the following criteria:

A: flow patch, streak and fish eye being almost absent;
B: flow patch, streak and fish eye being present but a little;
C: flow patch, streak and fish eye being markedly present;

and

D: flow patch and streak being remarkable, with a large number of fish eyes present.

(3) Oxygen Transmission Rate of Multilayered Structure

Moisture conditioning of the multilayered structure obtained was carried out at 20° C. and 65% RH for 5 days, and two pieces of a sample of the conditioned multilayered structure were provided to measure the oxygen transmission rate using MOCON, model OX-TRAN2/20 manufactured by Modern Controls, Inc., under a condition involving 20° C. and 65% RH in accordance with a method of JIS-K7126 (isopiestic method), and the average was determined (unit: mL·20 μm/m²·day atm).

(4) Oxygen Transmission Rate after Flexion of Multilayered Structure

In a similar manner to that described above, the oxygen transmission rate of the multilayered structure was determined in accordance with ASTM-F392-74 after repeating flexion 500 times using "Gelbo-Flex tester" manufactured by Rigaku Kogyo Co., Ltd.

(5) Flex Resistance of Multilayered Structure

In accordance with ASTM-F392-74, flexion was repeated using "Gelbo-Flex tester" manufactured by Rigaku Kogyo Co., Ltd., and the number of times of the flection repeated until a through-hole (pinhole) was first observed.

(6) Interlayer Adhesive Force Between Layer A and Layer B in the Multilayered Structure The interlayer adhesive force between the layer A and the layer B of the multilayered structure was determined as in the following. Moisture conditioning of the multilayered structure obtained was carried out in an atmosphere involving 23° C. and 50% RH for 7 days, followed by cutting to give a strip section having a width of 15 mm as a measurement sample. On this measurement sample, T-die peel strength was measured in an atmosphere involving 23° C. and 50% RH, using an autograph "model AGS-H" manufactured by Shimadzu Corporation at a tension rate of 250 mm/min. Thus obtained value (unit: g/15 mm) was determined as the interlayer adhesive force between the layer A and the layer B.

(7) Stretchability of Multilayered Structure

The multilayered structure thus obtained was mounted on a pantograph type biaxial stretching apparatus manufactured by Toyo Seiki Seisaku-sho, Ltd., and simultaneous biaxial stretching was carried out at 100° C. with a draw ratio of 4×4 times. The appearance of the stretched film was evaluated in accordance with the following evaluation criteria.

A: lack in uniformity and locally uneven wall thickness not being found;

B: slight lack in uniformity or locally uneven wall thickness being found, but being not practically problematic;

C: certain size of lack in uniformity or locally uneven wall thickness being found; and D: development of breakage of the multilayered structure being found.

(8) Thermoformability of Multilayered Structure

The multilayered structure thus obtained was subjected to thermoforming using a thermoforming machine (a vacuum-pressure deep drawing molding machine model "FX-0431-3" manufactured by Asano Laboratories Co. Ltd.,) into a shape of a round cup (die shape: upper part: 75 mmφ; lower part: 60 mmφ; depth: 30 mm; and draw ratio S=0.4) at a film temperature of 120° C. with compressed air (atmospheric pressure: 5 kgf/cm²) to give a thermoformed vessel. The forming conditions employed in this process were as follows.

temperature of heater: 400° C.;

plug: 45φ×65 mm;

plug temperature: 100° C.; and die temperature: 70° C.

The appearance of the thermoformed vessel obtained as described above was evaluated according to the following evaluation criteria.

A: lack in uniformity, crack, and locally uneven wall thickness not being found;

B: slight lack in uniformity, crack or locally uneven wall thickness being found, but being not practically problematic;

C: certain size of lack in uniformity, crack or locally uneven wall thickness being found; and D: development of breakage of the thermoformed vessel being found, leading to occurrence of deformation.

TABLE 1

|  |  |  | unit | Example 1 | Example 2 | Example 3 | Example 4 | Example 5 |
|---|---|---|---|---|---|---|---|---|
| Multilayered structure | Layer A | Resin of layer A | — | EVOH (A-1) | EVOH (A-2) | EVOH (A-3) | EVOH (A-1) | |
| | | Pellet type of layer A | — | A-1 | A-2 | A-3 | A-4 | A-5 |
| | | Content of ethylene units | mol % | 32.5 | 29 | 44.5 | 32.5 | 32.5 |
| | | Saponification degree | mol % | 99.5 | 99.5 | 99.5 | 99.5 | 99.5 |
| | | Content of phosphate compound | ppm | 45 | 50 | 20 | 90 | 5 |
| | | Content of acetate | ppm | 150 | 150 | 420 | 210 | 95 |
| | | Content of boron compound | ppm | 260 | 150 | 12 | 520 | 260 |
| | | Melt viscosity ($\eta_{1A}$) | Pa·s | 3,100 | 6,800 | 2,000 | 8,900 | 3,700 |
| | | Melt viscosity ($\eta_{2A}$) | Pa·s | 500 | 670 | 390 | 750 | 580 |
| | | (½) log10 ($\eta_{2A}/\eta_{1A}$) | — | −0.396 | −0.503 | −0.355 | −0.537 | −0.402 |
| | | MFR (190° C., 2160 g) | g/10 min | 1.8 | 1.2 | 3.2 | 1 | 1.6 |
| | | Number of lamination of layer A | — | 8 | 8 | 8 | 8 | 8 |
| | | Average thickness of layer A | μm | 1 | 1 | 1 | 1 | 1 |
| | | Metal species | — | Na | Na | Na/Zn | Na | Na |
| | | Metal element equivalent content (Note 1) | ppm | 140 | 150 | 130/120 | 280 | 14 |
| | Layer B | Resin of layer B | — | TPU (B-1-1) | | | | |
| | | Pellet type of layer B | — | B-1-1a | B-1-1a | B-1-1a | B-1-1a | B-1-1a |
| | | Melt viscosity ($\eta_{1B}$) | Pa·s | 1,400 | 1,400 | 1,400 | 1,400 | 1,400 |
| | | Melt viscosity ($\eta_{2B}$) | Pa·s | 230 | 230 | 230 | 230 | 230 |
| | | (½) log10 ($\eta_{2B}/\eta_{1B}$) | — | −0.392 | −0.392 | −0.392 | −0.392 | −0.392 |
| | | Number of lamination of layer B | — | 9 | 9 | 9 | 9 | 9 |
| | | Average thickness of layer B | μm | 1 | 1 | 1 | 1 | 1 |
| | | Metal species | — | — | — | — | — | — |

TABLE 1-continued

| | | unit | | | | | |
|---|---|---|---|---|---|---|---|
| Entirety | Metal element equivalent content (Note 2) | ppm | — | — | — | — | — |
| | Entire thickness of multilayered structure | μm | 17 | 17 | 17 | 17 | 17 |
| | $\eta_{2B}/\eta_{2A}$ | — | 0.46 | 0.34 | 0.59 | 0.31 | 0.4 |
| | Metal element equivalent content (Note 3) | ppm | 66 | 71 | 118 | 132 | 6.6 |
| Evaluation of characteristics | Appearance | — | A | A | A | B | A |
| | Oxygen transmission rate | (Note 4) | 0.9 | 1.3 | 29 | 1 | 0.9 |
| | Oxygen transmission rate after flexion | (Note 4) | 1.1 | 1.4 | 29 | 1.2 | 1.5 |
| | Flex resistance | time | 1,700 | 2,800 | 5,500 | 1,300 | 1,200 |
| | Interlayer adhesive force between the layer A and the layer B | g/15 mm | 860 | 1,030 | 1,330 | 1,280 | 610 |
| | Stretchability | — | A | A | A | B | A |
| | Thermoformability | — | A | A | A | B | A |

| | | | unit | Example 6 | Example 7 | Example 8 | Example 9 | Example 10 |
|---|---|---|---|---|---|---|---|---|
| Multilayered structure | Layer A | Resin of layer A | — | | | EVOH (A-1) | | |
| | | Pellet type of layer A | — | A-6 | A-7 | A-8 | A-1 | A-1 |
| | | Content of ethylene units | mol % | 32.5 | 32.5 | 32.5 | 32.5 | 32.5 |
| | | Saponification degree | mol % | 99.5 | 99.5 | 99.5 | 99.5 | 99.5 |
| | | Content of phosphate compound | ppm | 90 | 45 | 43 | 45 | 45 |
| | | Content of acetate | ppm | 680 | 150 | 90 | 150 | 150 |
| | | Content of boron compound | ppm | 250 | 260 | 260 | 260 | 260 |
| | | Melt viscosity ($\eta_{1A}$) | Pa·s | 2,800 | 2,500 | 3,800 | 3,100 | 3,100 |
| | | Melt viscosity ($\eta_{2A}$) | Pa·s | 470 | 400 | 590 | 500 | 500 |
| | | (½) log10 ($\eta_{2A}/\eta_{1A}$) | — | −0.388 | −0.398 | −0.404 | −0.396 | −0.396 |
| | | MFR (190° C., 2160 g) | g/10 min | 2.5 | 2.8 | 1.6 | 1.8 | 1.8 |
| | | Number of lamination of layer A | — | 8 | 8 | 8 | 3 | 4 |
| | | Average thickness of layer A | μm | 1 | 1 | 1 | 1 | 1 |
| | | Metal species | — | Na | Na/Mg | — | Na | Na |
| | | Metal element equivalent content (Note 1) | ppm | 1,170 | 25/110 | — | 140 | 140 |
| | Layer B | Resin of layer B | — | | | TPU (B-1-1) | | |
| | | Pellet type of layer B | — | B-1-1a | B-1-1a | B-1-1b | B-1-1a | B-1-1a |
| | | Melt viscosity ($\eta_{1B}$) | Pa·s | 1,400 | 1,400 | 2,500 | 1,400 | 1,400 |
| | | Melt viscosity ($\eta_{2B}$) | Pa·s | 230 | 230 | 350 | 230 | 230 |
| | | (½) log10 ($\eta_{2B}/\eta_{1B}$) | — | −0.392 | −0.392 | −0.427 | −0.392 | −0.392 |
| | | Number of lamination of layer B | — | 9 | 9 | 9 | 4 | 5 |
| | | Average thickness of layer B | μm | 1 | 1 | 1 | 1 | 1 |
| | | Metal species | — | — | — | Na | — | — |
| | | Metal element equivalent content (Note 2) | ppm | — | — | 140 | — | — |
| | Entirety | Entire thickness of multilayered structure | μm | 17 | 17 | 17 | 7 | 9 |
| | | $\eta_{2B}/\eta_{2A}$ | — | 0.49 | 0.58 | 0.59 | 0.46 | 0.46 |
| | | Metal element equivalent content (Note 3) | ppm | 551 | 64 | 74 | 61 | 62 |
| Evaluation of characteristics | | Appearance | — | B | A | A | A | A |
| | | Oxygen transmission rate | (Note 4) | 1 | 0.9 | 0.9 | 3.3 | 1.9 |
| | | Oxygen transmission rate after flexion | (Note 4) | 1.1 | 1.1 | 1.5 | 17.4 | 4.5 |
| | | Flex resistance | time | 1,900 | 2,300 | 1,100 | 700 | 900 |
| | | Interlayer adhesive force between the layer A and the layer B | g/15 mm | 1,440 | 1,290 | 770 | 820 | 830 |
| | | Stretchability | — | B | A | A | B | A |
| | | Thermoformability | — | B | A | A | B | A |

| | | | unit | Example 11 | Example 12 | Example 13 | Example 14 | Example 15 |
|---|---|---|---|---|---|---|---|---|
| Multilayered structure | Layer A | Resin of layer A | — | | | EVOH (A-1) | | |
| | | Pellet type of layer A | — | A-1 | A-1 | A-1 | A-1 | A-3 |
| | | Content of ethylene units | mol % | 32.5 | 32.5 | 32.5 | 32.5 | 44.5 |
| | | Saponification degree | mol % | 99.5 | 99.5 | 99.5 | 99.5 | 99.5 |
| | | Content of phosphate compound | ppm | 45 | 45 | 45 | 45 | 20 |
| | | Content of acetate | ppm | 150 | 150 | 150 | 150 | 420 |
| | | Content of boron compound | ppm | 260 | 260 | 260 | 260 | 12 |
| | | Melt viscosity ($\eta_{1A}$) | Pa·s | 3,100 | 3,100 | 3,100 | 3,100 | 2,000 |
| | | Melt viscosity ($\eta_{2A}$) | Pa·s | 500 | 500 | 500 | 500 | 390 |
| | | (½) log10 ($\eta_{2A}/\eta_{1A}$) | — | −0.396 | −0.396 | −0.396 | −0.396 | −0.355 |
| | | MFR (190° C., 2160 g) | g/10 min | 1.8 | 1.8 | 1.8 | 1.8 | 3.2 |
| | | Number of lamination of layer A | — | 16 | 32 | 64 | 64 | 64 |
| | | Average thickness of layer A | μm | 0.5 | 0.1 | 0.05 | 0.2 | 3 |
| | | Metal species | — | Na | Na | Na | Na | Na/Zn |
| | | Metal element equivalent content (Note 1) | ppm | 140 | 140 | 140 | 140 | 130/120 |
| | Layer B | Resin of layer B | — | | | TPU (B-1-1) | | |
| | | Pellet type of layer B | — | B-1-1a | B-1-1a | B-1-1a | B-1-1a | B-1-1a |
| | | Melt viscosity ($\eta_{1B}$) | Pa·s | 1,400 | 1,400 | 1,400 | 1,400 | 1,400 |
| | | Melt viscosity ($\eta_{2B}$) | Pa·s | 230 | 230 | 230 | 230 | 230 |
| | | (½) log10 ($\eta_{2B}/\eta_{1B}$) | — | −0.392 | −0.392 | −0.392 | −0.392 | −0.392 |
| | | Number of lamination of layer B | — | 17 | 33 | 65 | 65 | 65 |
| | | Average thickness of layer B | μm | 0.5 | 0.5 | 0.2 | 0.5 | 10 |
| | | Metal species | — | — | — | — | — | — |
| | | Metal element equivalent content (Note 2) | ppm | — | — | — | — | — |

TABLE 1-continued

|  |  |  | unit | | | | | |
|---|---|---|---|---|---|---|---|---|
| Entirety | Entire thickness of multilayered structure | | μm | 17 | 20 | 16 | 45 | 842 |
| | $\eta_{2B}/\eta_{2A}$ | | — | 0.46 | 0.46 | 0.46 | 0.46 | 0.59 |
| | Metal element equivalent content (Note 3) | | ppm | 68 | 23 | 28 | 40 | 58 |
| Evaluation of characteristics | Appearance | | — | A | A | A | A | A |
| | Oxygen transmission rate | | (Note 4) | 0.8 | 1.8 | 1.7 | 1.6 | 1.3 |
| | Oxygen transmission rate after flexion | | (Note 4) | 0.8 | 1.8 | 1.7 | 1.6 | 4 |
| | Flex resistance | | time | 2,500 | 3,000 | 4,600 | 4,300 | 2,800 |
| | Interlayer adhesive force between the layer A and the layer B | | g/15 mm | 890 | 900 | 910 | 910 | 880 |
| | Stretchability | | — | A | A | A | A | A |
| | Thermoformability | | — | A | A | A | A | A |

|  |  |  | unit | Example 16 | Example 17 | Example 18 | Example 19 |
|---|---|---|---|---|---|---|---|
| Multilayered structure | Layer A | Resin of layer A | — | | EVOH (A-1) | | |
| | | Pellet type of layer A | — | A-1 | A-8 | A-1 | A-1 |
| | | Content of ethylene units | mol % | 32.5 | 32.5 | 32.5 | 32.5 |
| | | Saponification degree | mol % | 99.5 | 99.5 | 99.5 | 99.5 |
| | | Content of phosphate compound | ppm | 45 | 43 | 45 | 45 |
| | | Content of acetate | ppm | 150 | 90 | 150 | 150 |
| | | Content of boron compound | ppm | 260 | 260 | 260 | 260 |
| | | Melt viscosity ($\eta_{1A}$) | Pa·s | 3,100 | 3,800 | 3,100 | 3,100 |
| | | Melt viscosity ($\eta_{2A}$) | Pa·s | 500 | 590 | 500 | 500 |
| | | (½) log10 ($\eta_{2A}/\eta_{1A}$) | — | −0.396 | −0.404 | −0.396 | −0.396 |
| | | MFR (190° C., 2160 g) | g/10 min | 1.8 | 1.6 | 1.8 | 1.8 |
| | | Number of lamination of layer A | — | 16 | 8 | 16 | 16 |
| | | Average thickness of layer A | μm | 0.5 | 1 | 0.5 | 0.5 |
| | | Metal species | — | Na | — | Na | Na |
| | | Metal element equivalent content (Note 1) | ppm | 140 | — | 140 | 140 |
| | Layer B | Resin of layer B | — | TPU (B-1-2) | | TPU (B-1-3) | TPU (B-1-4) |
| | | Pellet type of layer B | — | B-1-2a | B-1-2b | B-1-3b | B-1-4a |
| | | Melt viscosity ($\eta_{1B}$) | Pa·s | 3,000 | 2,800 | 2,600 | 3,100 |
| | | Melt viscosity ($\eta_{2B}$) | Pa·s | 500 | 420 | 400 | 510 |
| | | (½) log10 ($\eta_{2B}/\eta_{1B}$) | — | −0.389 | −0.412 | −0.406 | −0.392 |
| | | Number of lamination of layer B | — | 17 | 9 | 17 | 17 |
| | | Average thickness of layer B | μm | 1 | 1 | 1 | 1 |
| | | Metal species | — | — | Mg | Mg | — |
| | | Metal element equivalent content (Note 2) | ppm | — | 110 | 110 | — |
| | Entirety | Entire thickness of multilayered structure | μm | 25 | 17 | 25 | 25 |
| | | $\eta_{2B}/\eta_{2A}$ | — | 1 | 0.71 | 0.8 | 1.02 |
| | | Metal element equivalent content (Note 3) | ppm | 45 | 58 | 120 | 45 |
| Evaluation of characteristics | | Appearance | — | A | A | A | A |
| | | Oxygen transmission rate | (Note 4) | 0.8 | 0.9 | 0.8 | 0.8 |
| | | Oxygen transmission rate after flexion | (Note 4) | 0.8 | 1.1 | 0.8 | 0.8 |
| | | Flex resistance | time | 3,100 | 1,700 | 3,500 | 4,100 |
| | | Interlayer adhesive force between the layer A and the layer B | g/15 mm | 920 | 1,010 | 900 | 860 |
| | | Stretchability | — | A | A | A | A |
| | | Thermoformability | — | A | A | A | A |

(Notes 1 and 2): The "metal element equivalent content" as referred to herein means proportion by mass of the metal element included in the metal salt contained in the resin composition of each layer of the layer A or the layer B, with respect to the mass of the resin composition of each layer.
(Note 3): The "metal element equivalent content" as referred to herein means proportion by mass of the metal element included in the metal salt contained in the entirety of the multilayered structure with respect to the total mass of the multilayered structure.
(Note 4): mL · 20 μm/m² · day · atm

TABLE 2

|  |  |  | unit | Comparative Example 1 | Comparative Example 2 | Comparative Example 3 | Comparative Example 4 | Comparative Example 5 |
|---|---|---|---|---|---|---|---|---|
| Multilayered structure | Layer A | Resin of layer A | — | | | EVOH (A-1) | | |
| | | Pellet type of layer A | — | A-1 | A-1 | A-8 | A-9 | A-10 |
| | | Content of ethylene units | mol % | 32.5 | 32.5 | 32.5 | 32.5 | 32.5 |
| | | Saponification degree | mol % | 99.5 | 99.5 | 99.5 | 99.5 | 99.5 |
| | | Content of phosphate compound | ppm | 45 | 45 | 43 | 90 | 45 |
| | | Content of acetate | ppm | 150 | 150 | 90 | 13,500 | 150 |
| | | Content of boron compound | ppm | 260 | 260 | 260 | 250 | 5,000 |
| | | Melt viscosity ($\eta_{1A}$) | Pa·s | 3,100 | 3,100 | 3,800 | 970 | 49,500 |
| | | Melt viscosity ($\eta_{2A}$) | Pa·s | 500 | 500 | 590 | 90 | 1,200 |
| | | (½) log10 ($\eta_{2A}/\eta_{1A}$) | — | −0.396 | −0.396 | −0.404 | −0.516 | −0.808 |
| | | MFR (190° C., 2160 g) | g/10 min | 1.8 | 1.8 | 1.6 | 6.8 | 0.05 |
| | | Number of lamination of layer A | — | 1 | 2 | 8 | 8 | 8 |
| | | Average thickness of layer A | μm | 8 | 5 | 1 | 1 | 1 |
| | | Metal species | — | Na | Na | — | Na | Na |
| | | Metal element equivalent content (Note 1) | ppm | 140 | 140 | — | 23,000 | 140 |

TABLE 2-continued

|  |  | unit | Comparative Example 1 | Comparative Example 2 | Comparative Example 3 | Comparative Example 4 | Comparative Example 5 |
|---|---|---|---|---|---|---|---|
| Layer B | Resin of layer B | — | | | TPU (B-1-1) | | |
|  | Pellet type of layer B | — | B-1-1a | B-1-1a | B-1-1a | B-1-1a | B-1-1a |
|  | Melt viscosity ($\eta_{1B}$) | Pa·s | 1,400 | 1,400 | 1,400 | 1,400 | 1,400 |
|  | Melt viscosity ($\eta_{2B}$) | Pa·s | 230 | 230 | 230 | 230 | 230 |
|  | (½) log10 ($\eta_{2B}/\eta_{1B}$) | — | −0.392 | −0.392 | −0.392 | −0.392 | −0.392 |
|  | Number of lamination of layer B | — | 2 | 3 | 9 | 9 | 9 |
|  | Average thickness of layer B | μm | 4.5 | 3 | 1 | 1 | 1 |
|  | Metal species | — | — | — | — | — | — |
|  | Metal element equivalent content (Note 2) | ppm | — | — | — | — | — |
| Entirety | Entire thickness of multilayered structure | μm | 17 | 19 | 17 | 17 | 17 |
|  | $\eta_{2B}/\eta_{2A}$ | — | 0.46 | 0.46 | 0.39 | 2.56 | 0.19 |
|  | Metal element equivalent content (Note 3) | ppm | 66 | 74 | 0 | 10,800 | 66 |
| Evaluation of characteristics | Appearance | — | B | B | A | D | D |
|  | Oxygen transmission rate | (Note 4) | 1.2 | 1 | 0.9 | 110 | 170 |
|  | Oxygen transmission rate after flexion | (Note 4) | 420 | 280 | 210 | 560 | 630 |
|  | Flex resistance | time | 300 | 400 | 450 | 250 | 200 |
|  | Interlayer adhesive force between the layer A and the layer B | g/15 mm | 760 | 790 | 190 | 260 | 400 |
|  | Stretchability | — | D | C | B | D | D |
|  | Thermoformability | — | D | C | B | D | D |

(Notes 1 and 2): The "metal element equivalent content" as referred to herein means proportion by mass of the metal element included in the metal salt contained in the resin composition of each layer of the layer A or the layer B, with respect to the mass of the resin composition of each layer.
(Note 3): The "metal element equivalent content" as referred to herein means proportion by mass of the metal element included in the metal salt contained in the entirety of the multilayered structure with respect to the total mass of the multilayered structure.
(Note 4): mL · 20 μm/m² · day · atm

TABLE 3

| | | unit | Example 20 | Example 21 | Example 22 | Comparative Example 6 | Comparative Example 7 | Comparative Example 8 | Comparative Example 9 | Comparative Example 10 | Comparative Example 11 |
|---|---|---|---|---|---|---|---|---|---|---|---|
| Multilayered structure | Layer A Resin of layer A | — | nylon MXD6 | PGA | wholly aromatic liquid crystal polyester | nylon MXD6 | PGA | wholly aromatic liquid crystal polyester | nylon MXD6 | PGA | wholly aromatic liquid crystal polyester |
| | Pellet type of layer A | — | A-11 | A-12 | A-13 | A-11 | A-12 | A-13 | A-11 | A-12 | A-13 |
| | Melt viscosity ($\eta_{1A}'$) | Pa·s | 1,100 | 850 | 790 | 1,100 | 850 | 790 | 1,100 | 850 | 790 |
| | Melt viscosity ($\eta_{2A}'$) | Pa·s | 230 | 210 | 310 | 230 | 210 | 310 | 230 | 210 | 310 |
| | (½) log10 ($\eta_{2A}'/\eta_{1A}'$) | — | −0.34 | −0.304 | −0.203 | −0.34 | −0.304 | −0.203 | −0.34 | −0.304 | −0.203 |
| | Number of lamination of layer A | — | 8 | 8 | 8 | 2 | 2 | 2 | 8 | 8 | 8 |
| | Average thickness of layer A | µm | 1 | 1 | 1 | 5 | 5 | 5 | 1 | 1 | 1 |
| | Metal species | — | — | Sn | — | — | Sn | — | — | Sn | — |
| | Metal element equivalent content (Note 1) | ppm | — | 5 | — | — | 5 | — | — | 5 | — |
| Layer B Resin of layer B | | — | | TPU (B-1-1) | | | | TPU (B-1-1) | | | |
| | Pellet type of layer B | — | B-1-1b | B-1-1b | B-1-1b | B-1-1b | B-1-1b | B-1-1b | B-1-1a | B-1-1a | B-1-1a |
| | Melt viscosity ($\eta_{1B}'$) | Pa·s | 1,850 | 1,150 | 2,150 | 1,850 | 1,150 | 2,150 | 1,000 | 650 | 1,200 |
| | Melt viscosity ($\eta_{2B}'$) | Pa·s | 300 | 190 | 350 | 300 | 190 | 350 | 200 | 150 | 230 |
| | (½) log10 ($\eta_{2B}'/\eta_{1B}'$) | — | −0.395 | −0.391 | −0.394 | −0.395 | −0.391 | −0.394 | −0.349 | −0.318 | −0.359 |
| | Number of lamination of layer B | — | 9 | 9 | 9 | 3 | 3 | 3 | 9 | 9 | 9 |
| | Average thickness of layer B | µm | 1 | 1 | 1 | 3 | 3 | 3 | 1 | 1 | 1 |
| | Metal species | — | Na | Na | Na | Na | Na | Na | — | — | — |
| | Metal element equivalent content (Note 2) | ppm | 140 | 140 | 140 | 140 | 140 | 140 | — | — | — |
| Entirety | Entire thickness of multilayered structure | µm | 17 | 17 | 17 | 19 | 19 | 19 | 17 | 17 | 17 |
| | $\eta_{2B}'/\eta_{2A}'$ | — | 1.3 | 0.9 | 1.13 | 1.3 | 0.9 | 1.13 | 0.87 | 0.71 | 0.74 |
| | Metal element equivalent content (Note 3) | ppm | 72 | 66 | 66 | 65 | 58 | 59 | 0 | 3 | 0 |
| Temperature of forming by coextrusion | | °C | 255 | 234 | 223 | 255 | 234 | 223 | 255 | 234 | 223 |
| Evaluation of characteristics | Appearance | — | A | A | A | B | B | B | B | B | B |
| | Oxygen transmission rate | (Note 4) | 8.4 | 1.9 | 0.8 | 9.5 | 2.4 | 1.3 | 9.8 | 2.3 | 1.2 |
| | Oxygen transmission rate | (Note 4) | 11.4 | 2.8 | 1.3 | 903.6 | 601.8 | 399.6 | 176 | 78.2 | 71.6 |
| | Flex resistance | time | 2,000 | 1,300 | 1,100 | 250 | 120 | 90 | 450 | 300 | 250 |
| | Interlayer adhesive force between the layer A and the layer B | g/15 mm | 1,210 | 1,030 | 950 | 1,050 | 900 | 930 | 420 | 330 | 180 |
| | Stretchability | — | A | A | A | D | D | D | C | D | D |
| | Thermoformability | — | A | A | A | D | D | D | C | D | D |

(Notes 1 and 2): The "metal element equivalent content" as referred to herein means proportion by mass of the metal element included in the metal salt contained in the resin composition of each layer of the layer A or the layer B, with respect to the mass of the resin composition of each layer.
(Note 3): The "metal element equivalent content" as referred to herein means proportion by mass of the metal element included in the metal salt contained in the entirety of the multilayered structure with respect to the total mass of the multilayered structure.
(Note 4): mL · 20 µm/m² · day · atm

TABLE 4

| | | unit | Example 23 | Example 24 | Example 25 | Example 26 | Example 27 | Example 28 |
|---|---|---|---|---|---|---|---|---|
| Multilayered structure | Layer A Resin of layer A | — | EVOH (A-1) | EVOH (A-2) | EVOH (A-3) | EVOH (A-1) | | |
| | Pellet type of layer A | — | A-1 | A-2 | A-3 | A-4 | A-5 | A-6 |
| | Content of ethylene units | mol % | 32.5 | 29 | 44.5 | 32.5 | 32.5 | 32.5 |
| | Saponification degree | mol % | 99.5 | 99.5 | 99.5 | 99.5 | 99.5 | 99.5 |
| | Content of phosphate compound | ppm | 45 | 50 | 20 | 90 | 5 | 90 |
| | Content of acetate | ppm | 150 | 150 | 420 | 210 | 95 | 680 |
| | Content of boron compound | ppm | 260 | 150 | 12 | 520 | 260 | 250 |
| | Melt viscosity ($\eta_{1A}''$) | Pa·s | 2,790 | 6,120 | 1,800 | 8,010 | 3,330 | 2,520 |
| | Melt viscosity ($\eta_{2A}''$) | Pa·s | 450 | 600 | 350 | 675 | 520 | 420 |
| | (½) log10 ($\eta_{2A}''/\eta_{1A}''$) | — | −0.396 | −0.504 | −0.356 | −0.537 | −0.403 | −0.389 |
| | MFR (190° C., 2160 g) | g/10 min | 1.8 | 1.2 | 3.2 | 1 | 1.6 | 2.5 |
| | Number of lamination of layer A | — | 8 | 8 | 8 | 8 | 8 | 8 |
| | Average thickness of layer A | μm | 1 | 1 | 1 | 1 | 1 | 1 |
| | Metal species | — | Na | Na | Na/Zn | Na | Na | Na |
| | Metal element equivalent content (Note 1) | ppm | 140 | 150 | 130/120 | 280 | 14 | 1170 |
| Layer B | Resin of layer B | — | PA (B-2-1) | | | | | |
| | Pellet type of layer B | — | B-2-1a | B-2-1a | B-2-1a | B-2-1a | B-2-1a | B-2-1a |
| | Melt viscosity ($\eta_{1B}''$) | Pa·s | 1,550 | 1,550 | 1,550 | 1,550 | 1,550 | 1,550 |
| | Melt viscosity ($\eta_{2B}''$) | Pa·s | 450 | 450 | 450 | 450 | 450 | 450 |
| | (½) log10 ($\eta_{2B}''/\eta_{1B}''$) | — | −0.269 | −0.269 | −0.269 | −0.269 | −0.269 | −0.269 |
| | Number of lamination of layer B | — | 9 | 9 | 9 | 9 | 9 | 9 |
| | Average thickness of layer B | μm | 1 | 1 | 1 | 1 | 1 | 1 |
| | Metal species | — | — | — | — | — | — | — |
| | Metal element equivalent content (Note 2) | ppm | — | — | — | — | — | — |
| Entirety | Entire thickness of multilayered structure | μm | 17 | 17 | 17 | 17 | 17 | 17 |
| | $\eta_{2B}''/\eta_{2A}''$ | — | 1 | 0.75 | 1.29 | 0.67 | 0.87 | 1.07 |
| | Metal element equivalent content (Note 3) | ppm | 66 | 71 | 118 | 132 | 6.6 | 551 |
| | Temperature of forming by coextrusion | ° C. | 250 | | | | | |
| Evaluation of characteristics | Appearance | — | A | A | A | B | A | B |
| | Oxygen transmission rate | (Note 4) | 0.9 | 1.3 | 29 | 1 | 0.9 | 1 |
| | Oxygen transmission rate after flexion | (Note 4) | 1.1 | 1.4 | 29 | 1.2 | 1.5 | 1.1 |
| | Flex resistance | time | 1,360 | 2,240 | 4,400 | 1,040 | 960 | 1,520 |
| | Interlayer adhesive force between the layer A and the layer B | g/15 mm | 900 | 1,080 | 1,400 | 1,340 | 640 | 1,510 |
| | Stretchability | — | A | A | A | B | A | B |
| | Thermoformability | — | A | A | A | B | A | B |

| | | unit | Example 29 | Example 30 | Example 31 | Example 32 | Example 33 | Example 34 |
|---|---|---|---|---|---|---|---|---|
| Multilayered structure | Layer A Resin of layer A | — | EVOH (A-1) | | | | | |
| | Pellet type of layer A | — | A-7 | A-8 | A-1 | A-1 | A-1 | A-8 |
| | Content of ethylene units | mol % | 32.5 | 32.5 | 32.5 | 32.5 | 32.5 | 32.5 |
| | Saponification degree | mol % | 99.5 | 99.5 | 99.5 | 99.5 | 99.5 | 99.5 |
| | Content of phosphate compound | ppm | 45 | 43 | 45 | 45 | 45 | 43 |
| | Content of acetate | ppm | 150 | 90 | 150 | 150 | 150 | 90 |
| | Content of boron compound | ppm | 260 | 260 | 260 | 260 | 260 | 260 |
| | Melt viscosity ($\eta_{1A}''$) | Pa·s | 2,250 | 3,420 | 2,790 | 2,790 | 2,790 | 3,420 |
| | Melt viscosity ($\eta_{2A}''$) | Pa·s | 360 | 530 | 450 | 450 | 450 | 530 |
| | (½) log10 ($\eta_{2A}''/\eta_{1A}''$) | — | −0.398 | −0.405 | −0.396 | −0.396 | −0.396 | −0.405 |
| | MFR (190° C., 2160 g) | g/10 min | 2.8 | 1.6 | 1.8 | 1.8 | 1.8 | 1.6 |
| | Number of lamination of layer A | — | 8 | 8 | 4 | 16 | 16 | 8 |
| | Average thickness of layer A | μm | 1 | 1 | 1 | 0.5 | 0.5 | 1 |
| | Metal species | — | Na/Mg | — | Na | Na | Na | — |
| | Metal element equivalent content (Note 1) | ppm | 25/110 | — | 140 | 140 | 140 | — |
| Layer B | Resin of layer B | — | PA (B-2-1) | | | | PA (B-2-2) | |
| | Pellet type of layer B | — | B-2-1a | B-2-1b | B-2-1a | B-2-1a | B-2-2a | B-2-2b |
| | Melt viscosity ($\eta_{1B}''$) | Pa·s | 1,550 | 2,200 | 1,550 | 1,550 | 3,200 | 2,700 |
| | Melt viscosity ($\eta_{2B}''$) | Pa·s | 450 | 500 | 450 | 450 | 600 | 550 |
| | (½) log10 ($\eta_{2B}''/\eta_{1B}''$) | — | −0.269 | −0.322 | −0.269 | −0.269 | −0.363 | −0.346 |
| | Number of lamination of layer B | — | 9 | 9 | 5 | 17 | 17 | 9 |
| | Average thickness of layer B | μm | 1 | 1 | 1 | 0.5 | 1 | 1 |
| | Metal species | — | — | Na | — | — | — | Mg |
| | Metal element equivalent content (Note 2) | ppm | — | 140 | — | — | — | 110 |
| Entirety | Entire thickness of multilayered structure | μm | 17 | 17 | 9 | 17 | 25 | 17 |
| | $\eta_{2B}''/\eta_{2A}''$ | — | 1.25 | 0.94 | 1 | 1 | 1.33 | 1.04 |
| | Metal element equivalent content (Note 3) | ppm | 64 | 74 | 62 | 68 | 45 | 58 |
| | Temperature of forming by coextrusion | ° C. | 250 | | | | | |
| Evaluation of characteristics | Appearance | — | A | A | A | A | A | A |
| | Oxygen transmission rate | (Note 4) | 0.9 | 0.9 | 1.9 | 0.8 | 0.8 | 0.9 |
| | Oxygen transmission rate after flexion | (Note 4) | 1.1 | 1.5 | 4.5 | 0.8 | 0.8 | 1.1 |
| | Flex resistance | time | 1,840 | 880 | 720 | 2,000 | 2,480 | 1,360 |
| | Interlayer adhesive force between the layer A and the layer B | g/15 mm | 1,350 | 810 | 870 | 940 | 960 | 1,060 |

TABLE 4-continued

|  |  | | | | | | |
|---|---|---|---|---|---|---|---|
| Stretchability | — | A | A | A | A | A | A |
| Thermoformability | — | A | A | A | A | A | A |

| | | | unit | Example 35 | Example 36 | Example 37 | Example 38 |
|---|---|---|---|---|---|---|---|
| Multilayered structure | Layer A | Resin of layer A | — | \multicolumn{4}{c}{EVOH (A-1)} | | | |
| | | Pellet type of layer A | — | A-1 | A-1 | A-1 | A-1 |
| | | Content of ethylene units | mol % | 32.5 | 32.5 | 32.5 | 32.5 |
| | | Saponification degree | mol % | 99.5 | 99.5 | 99.5 | 99.5 |
| | | Content of phosphate compound | ppm | 45 | 45 | 45 | 45 |
| | | Content of acetate | ppm | 150 | 150 | 150 | 150 |
| | | Content of boron compound | ppm | 260 | 260 | 260 | 260 |
| | | Melt viscosity ($\eta_{1A}''$) | Pa·s | 2,790 | 2,790 | 2,790 | 2,790 |
| | | Melt viscosity ($\eta_{2A}''$) | Pa·s | 450 | 450 | 450 | 450 |
| | | (½) log10 ($\eta_{2A}''/\eta_{1A}''$) | — | −0.396 | −0.396 | −0.396 | −0.396 |
| | | MFR (190° C., 2160 g) | g/10 min | 1.8 | 1.8 | 1.8 | 1.8 |
| | | Number of lamination of layer A | — | 16 | 16 | 16 | 16 |
| | | Average thickness of layer A | μm | 0.5 | 0.5 | 0.5 | 0.5 |
| | | Metal species | — | Na | Na | Na | Na |
| | | Metal element equivalent content (Note 1) | ppm | 140 | 140 | 140 | 140 |
| | Layer B | Resin of layer B | — | PA (B-2-3) | PA (B-2-3) | PA (B-2-4) | PA (B-2-4) |
| | | Pellet type of layer B | — | B-2-3a | B-2-3b | B-2-4a | B-2-4b |
| | | Melt viscosity ($\eta_{1B}''$) | Pa·s | 5,000 | 4,400 | 3,400 | 3,000 |
| | | Melt viscosity ($\eta_{2B}''$) | Pa·s | 890 | 860 | 630 | 570 |
| | | (½) log10 ($\eta_{2B}''/\eta_{1B}''$) | — | −0.375 | −0.354 | −0.366 | −0.361 |
| | | Number of lamination of layer B | — | 17 | 17 | 17 | 17 |
| | | Average thickness of layer B | μm | 1 | 1 | 1 | 1 |
| | | Metal species | — | Na | Na/Mg | Zr | Zr/Co |
| | | Metal element equivalent content (Note 2) | ppm | 1 | 1/110 | 420 | 420/110 |
| | Entirety | Entire thickness of multilayered structure | μm | 25 | 25 | 25 | 25 |
| | | $\eta_{2B}''/\eta_{2A}''$ | — | 1.98 | 1.91 | 1.4 | 1.27 |
| | | Metal element equivalent content (Note 3) | ppm | 47 | 121 | 330 | 404 |
| | | Temperature of forming by coextrusion | ° C. | 250 | 250 | 250 | 250 |
| Evaluation of characteristics | | Appearance | — | A | A | A | A |
| | | Oxygen transmission rate | (Note 4) | 0.7 | 0.7 | 0.9 | 0.9 |
| | | Oxygen transmission rate after flexion | (Note 4) | 0.8 | 0.8 | 0.9 | 0.9 |
| | | Flex resistance | time | 1,860 | 2,100 | 3,100 | 3,500 |
| | | Interlayer adhesive force between the layer A and the layer B | g/15 mm | 1,280 | 1,440 | 780 | 850 |
| | | Stretchability | — | A | A | A | A |
| | | Thermoformability | — | A | A | A | A |

(Notes 1 and 2): The "metal element equivalent content" as referred to herein means proportion by mass of the metal element included in the metal salt contained in the resin composition of each layer of the layer A or the layer B, with respect to the mass of the resin composition of each layer.
(Note 3): The "metal element equivalent content" as referred to herein means proportion by mass of the metal element included in the metal salt contained in the entirety of the multilayered structure with respect to the total mass of the multilayered structure.
(Note 4): mL · 20 μm/m² · day · atm

TABLE 5

| | | | unit | Comparative Example 12 | Comparative Example 13 | Comparative Example 14 | Comparative Example 15 | Comparative Example 16 |
|---|---|---|---|---|---|---|---|---|
| Multilayered structure | Layer A | Resin of layer A | — | EVOH (A-1) | | | | |
| | | Pellet type of layer A | — | A-1 | A-1 | A-8 | A-9 | A-10 |
| | | Content of ethylene units | mol % | 32.5 | 32.5 | 32.5 | 32.5 | 32.5 |
| | | Saponification degree | mol % | 99.5 | 99.5 | 99.5 | 99.5 | 99.5 |
| | | Content of phosphate compound | ppm | 45 | 45 | 43 | 90 | 45 |
| | | Content of acetate | ppm | 150 | 150 | 90 | 13,500 | 150 |
| | | Content of boron compound | ppm | 260 | 260 | 260 | 250 | 5,000 |
| | | Melt viscosity ($\eta_{1A}''$) | Pa·s | 2,790 | 2,790 | 3,420 | 870 | 44,550 |
| | | Melt viscosity ($\eta_{2A}''$) | Pa·s | 450 | 450 | 530 | 80 | 1,080 |
| | | (½) log10 ($\eta_{2A}''/\eta_{1A}''$) | — | −0.396 | −0.396 | −0.405 | −0.518 | −0.808 |
| | | MFR (190° C., 2160 g) | g/10 min | 1.8 | 1.8 | 1.6 | 6.8 | 0.05 |
| | | Number of lamination of layer A | — | 1 | 2 | 8 | 8 | 8 |
| | | Average thickness of layer A | μm | 8 | 5 | 1 | 1 | 1 |
| | | Metal species | — | Na | Na | — | Na | Na |
| | | Metal element equivalent content (Note 1) | ppm | 140 | 140 | — | 23,000 | 140 |
| | Layer B | Resin of layer B | — | PA (B-2-1) | | | | |
| | | Pellet type of layer B | — | B-2-1a | B-2-1a | B-2-1a | B-2-1a | B-2-1a |
| | | Melt viscosity ($\eta_{1B}''$) | Pa·s | 1,550 | 1,550 | 1,550 | 1,550 | 1,550 |
| | | Melt viscosity ($\eta_{2B}''$) | Pa·s | 450 | 450 | 450 | 450 | 450 |
| | | (½) log10 ($\eta_{2B}''/\eta_{1B}''$) | — | −0.269 | −0.269 | −0.269 | −0.269 | −0.269 |
| | | Number of lamination of layer B | — | 2 | 3 | 9 | 9 | 9 |
| | | Average thickness of layer B | μm | 4.5 | 3 | 1 | 1 | 1 |
| | | Metal species | — | — | — | — | — | — |

TABLE 5-continued

|  |  | unit | Comparative Example 12 | Comparative Example 13 | Comparative Example 14 | Comparative Example 15 | Comparative Example 16 |
|---|---|---|---|---|---|---|---|
| Entirety | Metal element equivalent content (Note 2) | ppm | — | — | — | — | — |
|  | Entire thickness of multilayered structure | μm | 17 | 19 | 17 | 17 | 17 |
|  | $\eta_{2B}''/\eta_{2A}''$ | — | 1 | 1 | 0.85 | 5.63 | 0.42 |
|  | Metal element equivalent content (Note 3) | ppm | 66 | 74 | 0 | 10,800 | 66 |
|  | Temperature of forming by coextrusion | °C. |  |  | 250 |  |  |
| Evaluation of characteristics | Appearance | — | B | B | A | D | D |
|  | Oxygen transmission rate | (Note 4) | 1.2 | 1 | 0.9 | 110 | 170 |
|  | Oxygen transmission rate after flexion | (Note 4) | 420 | 280 | 210 | 560 | 630 |
|  | Flex resistance | time | 240 | 320 | 360 | 200 | 160 |
|  | Interlayer adhesive force between the layer A and the layer B | g/15 mm | 800 | 830 | 200 | 270 | 420 |
|  | Stretchability | — | D | C | B | D | D |
|  | Thermoformability | — | D | C | B | D | D |

(Notes 1 and 2): The "metal element equivalent content" as referred to herein means proportion by mass of the metal element included in the metal salt contained in the resin composition of each layer of the layer A or the layer B, with respect to the mass of the resin composition of each layer.
(Note 3): The "metal element equivalent content" as referred to herein means proportion by mass of the metal element included in the metal salt contained in the entirety of the multilayered structure with respect to the total mass of the multilayered structure.
(Note 4): mL · 20 μm/m² · day · atm

TABLE 6

|  |  | unit | Example 23 | Example 24 | Example 25 | Example 26 | Example 27 | Example 28 | Example 29 | Example 30 |
|---|---|---|---|---|---|---|---|---|---|---|
| Layer A | Resin of layer A | — | EVOH (A-1) | EVOH (A-2) | EVOH (A-3) | EVOH (A-1) | | | | |
|  | Pellet type of layer A | — | A-1 | A-2 | A-3 | A-4 | A-5 | A-6 | A-7 | A-8 |
|  | Melt viscosity ($\eta_{1A}$) | Pa·s | 3100 | 6,800 | 2,000 | 8,900 | 3,700 | 2,800 | 2,500 | 3,800 |
|  | Melt viscosity ($\eta_{2A}$) | Pa·s | 500 | 670 | 390 | 750 | 580 | 470 | 400 | 590 |
|  | (½) log10 ($\eta_{2A}/\eta_{1A}$) | — | −0.396 | −0.503 | −0.355 | −0.537 | −0.402 | −0.388 | −0.398 | −0.404 |
| Layer B | Resin of layer B | — | PA (B-2-1) | | | | | | | |
|  | Pellet type of layer B | — | B-2-1a | B-2-1a | B-2-1a | B-2-1a | B-2-1a | B-2-1a | B-2-1a | B-2-1b |
|  | Melt viscosity ($\eta_{1B}$) | Pa·s | 2040 | 2,040 | 2,040 | 2,040 | 2,040 | 2,040 | 2,040 | 2,900 |
|  | Melt viscosity ($\eta_{2B}$) | Pa·s | 520 | 520 | 520 | 520 | 520 | 520 | 520 | 580 |
|  | (½) log10 ($\eta_{2B}/\eta_{1B}$) | — | −0.2968 | −0.297 | −0.297 | −0.297 | −0.297 | −0.297 | −0.297 | −0.349 |
|  | $\eta_{2B}/\eta_{2A}$ | — | 1.04 | 0.78 | 1.33 | 0.69 | 0.9 | 1.11 | 1.3 | 0.98 |

|  |  | unit | Example 31 | Example 32 | Example 33 | Example 34 | Example 35 | Example 36 | Example 37 | Example 38 |
|---|---|---|---|---|---|---|---|---|---|---|
| Layer A | Resin of layer A | — | EVOH (A-1) | | | | | | | |
|  | Pellet type of layer A | — | A-1 | A-1 | A-1 | A-8 | A-1 | A-1 | A-1 | A-1 |
|  | Melt viscosity ($\eta_{1A}$) | Pa·s | 3,100 | 3,100 | 3,100 | 3,800 | 3,100 | 3,100 | 3,100 | 3,100 |
|  | Melt viscosity ($\eta_{2A}$) | Pa·s | 500 | 500 | 500 | 590 | 500 | 500 | 500 | 500 |
|  | (½) log10 ($\eta_{2A}/\eta_{1A}$) | — | −0.396 | −0.396 | −0.396 | −0.404 | −0.396 | −0.396 | −0.396 | −0.396 |
| Layer B | Resin of layer B | — | PA (B-2-1) | | PA (B-2-2) | | PA (B-2-3) | | PA (B-2-4) | |
|  | Pellet type of layer B | — | B-2-1a | B-2-1a | B-2-2a | B-2-2b | B-2-3a | B-2-3b | B-2-4a | B-2-4b |
|  | Melt viscosity ($\eta_{1B}$) | Pa·s | 2,040 | 2,040 | 4,220 | 3,560 | 210° C. being no greater than melting point | | 4,480 | 3,950 |
|  | Melt viscosity ($\eta_{2B}$) | Pa·s | 520 | 520 | 690 | 640 | | | 730 | 660 |
|  | (½) log10 ($\eta_{2B}/\eta_{1B}$) | — | −0.297 | −0.297 | −0.393 | −0.373 | | | −0.394 | −0.389 |
|  | $\eta_{2B}/\eta_{2A}$ | — | 1.04 | 1.04 | 1.38 | 1.08 | 0 | 0 | 1.46 | 1.32 |

|  |  | unit | Comparative Example 12 | Comparative Example 13 | Comparative Example 14 | Comparative Example 15 | Comparative Example 16 |
|---|---|---|---|---|---|---|---|
| Layer A | Resin of layer A | — | EVOH (A-1) | | | | |
|  | Pellet type of layer A | — | A-1 | A-1 | A-8 | A-9 | A-10 |
|  | Melt viscosity ($\eta_{1A}$) | Pa·s | 3,100 | 3,100 | 3,800 | 970 | 49,500 |
|  | Melt viscosity ($\eta_{2A}$) | Pa·s | 500 | 500 | 590 | 90 | 1200 |
|  | (½) log10 ($\eta_{2A}/\eta_{1A}$) | — | −0.396 | −0.396 | −0.404 | −0.516 | −0.808 |
| Layer B | Resin of layer B | — | PA (B-2-1) | | | | |
|  | Pellet type of layer B | — | B-2-1a | B-2-1a | B-2-1a | B-2-1a | B-2-1a |
|  | Melt viscosity ($\eta_{1B}$) | Pa·s | 2,040 | 2,040 | 2,040 | 2,040 | 2,040 |
|  | Melt viscosity ($\eta_{2B}$) | Pa·s | 520 | 520 | 520 | 520 | 520 |
|  | (½) log10 ($\eta_{2B}/\eta_{1B}$) | — | −0.297 | −0.297 | −0.297 | −0.297 | −0.297 |
|  | $\eta_{2B}/\eta_{2A}$ | — | 1.04 | 1.04 | 0.88 | 5.78 | 0.43 |

TABLE 7

| | | unit | Example 39 | Example 40 | Example 41 | Example 42 | Example 43 | Example 44 |
|---|---|---|---|---|---|---|---|---|
| Multilayered structure | Layer A Resin of layer A | — | nylon MXD6 | PGA | wholly aromatic liquid crystal polyester | nylon MXD6 | PGA | wholly aromatic liquid crystal polyester |
| | Pellet type of layer A | — | A-11 | A-12 | A-13 | A-11 | A-12 | A-13 |
| | Melt viscosity ($\eta_{1A}'$) | Pa·s | 1,100 | 850 | 790 | 1,100 | 850 | 790 |
| | Melt viscosity ($\eta_{2A}'$) | Pa·s | 230 | 210 | 310 | 230 | 210 | 310 |
| | (½) log10 ($\eta_{2A}'/\eta_{1A}'$) | — | −0.34 | −0.304 | −0.203 | −0.34 | −0.304 | −0.203 |
| | Number of lamination of layer A | — | 8 | 8 | 8 | 8 | 8 | 8 |
| | Average thickness of layer A | μm | 1 | 1 | 1 | 1 | 1 | 1 |
| | Metal species | — | — | Sn | — | — | Sn | — |
| | Metal element equivalent content (Note 1) | ppm | — | 5 | — | — | 5 | — |
| Layer B Resin of layer B | | — | | PA (B-2-3) | | | PA (B-2-4) | |
| | Pellet type of layer B | — | B-2-3b | B-2-3b | B-2-3b | B-2-4b | B-2-4b | B-2-4b |
| | Melt viscosity ($\eta_{1B}'$) | Pa·s | 1,370 | 2,300 | 3,080 | 940 | 1,570 | 2,100 |
| | Melt viscosity ($\eta_{2B}'$) | Pa·s | 460 | 610 | 810 | 330 | 500 | 580 |
| | (½) log10 ($\eta_{2B}'/\eta_{1B}'$) | — | −0.237 | −0.288 | −0.29 | −0.227 | −0.248 | −0.279 |
| | Number of lamination of layer B | — | 9 | 9 | 9 | 9 | 9 | 9 |
| | Average thickness of layer B | μm | 1 | 1 | 1 | 1 | 1 | 1 |
| | Metal species | — | Na/Mg | Na/Mg | Na/Mg | Zr/Co | Zr/Co | Zr/Co |
| | Metal element equivalent content (Note 2) | ppm | 1/110 | 1/110 | 1/110 | 420/110 | 420/110 | 420/110 |
| Entirety | Entire thickness of multilayered structure | μm | 17 | 17 | 17 | 17 | 17 | 17 |
| | $\eta_{2B}'/\eta_{2A}'$ | — | 2 | 2.9 | 2.61 | 1.43 | 2.38 | 1.87 |
| | Metal element equivalent content (Note 3) | ppm | 57 | 52 | 52 | 276 | 243 | 253 |
| Temperature of forming by coextrusion | | °C. | 255 | 234 | 223 | 255 | 234 | 223 |
| Evaluation of characteristics | Appearance | — | A | B | B | A | B | A |
| | Oxygen transmission rate | (Note 4) | 8 | 1.7 | 0.8 | 8.2 | 1.8 | 0.8 |
| | Oxygen transmission rate after flexion | (Note 4) | 13.3 | 3.3 | 1.6 | 12.6 | 3.1 | 1.5 |
| | Flex resistance | time | 1,800 | 1,200 | 1,000 | 2,000 | 1,300 | 1,100 |
| | Interlayer adhesive force between the layer A and the layer B | g/15 mm | 680 | 680 | 680 | 680 | 680 | 680 |
| | Stretchability | — | A | B | B | A | A | A |
| | Thermoformability | — | A | B | B | A | A | A |

(Notes 1 and 2): The "metal element equivalent content" as referred to herein means proportion by mass of the metal element included in the metal salt contained in the resin composition of each layer of the layer A or the layer B, with respect to the mass of the resin composition of each layer.
(Note 3): The "metal element equivalent content" as referred to herein means proportion by mass of the metal element included in the metal salt contained in the entirety of the multilayered structure with respect to the total mass of the multilayered structure.
(Note 4): mL · 20 μm/m² · day · atm

TABLE 8

| | | unit | Comparative Example 17 | Comparative Example 18 | Comparative Example 19 | Comparative Example 20 | Comparative Example 21 | Comparative Example 22 |
|---|---|---|---|---|---|---|---|---|
| Multi-layered structure | Layer A Resin of layer A | — | nylon MXD6 | PGA | wholly aromatic liquid crystal polyester | nylon MXD6 | PGA | wholly aromatic liquid crystal polyester |
| | Pellet type of layer A | — | A-11 | A-12 | A-13 | A-11 | A-12 | A-13 |
| | Melt viscosity ($\eta_{1A}'$) | Pa·s | 1,100 | 850 | 790 | 1,100 | 850 | 790 |
| | Melt viscosity ($\eta_{2A}'$) | Pa·s | 230 | 210 | 310 | 230 | 210 | 310 |
| | (½) log10 ($\eta_{2A}'/\eta_{1A}'$) | — | −0.34 | −0.304 | −0.203 | −0.34 | −0.304 | −0.203 |
| | Number of lamination of layer A | — | 2 | 2 | 2 | 8 | 8 | 8 |
| | Average thickness of layer A | μm | 5 | 5 | 5 | 1 | 1 | 1 |
| | Metal species | — | — | Sn | — | — | Sn | — |
| | Metal element equivalent content (Note 1) | ppm | — | 5 | — | — | 5 | — |
| Layer B Resin of layer B | | — | | PA (B-2-3) | | | PA (B-2-3) | |
| | Pellet type of layer B | — | B-2-3b | B-2-3b | B-2-3b | B-2-3a | B-2-3a | B-2-3a |
| | Melt viscosity ($\eta_{1B}'$) | Pa·s | 1,370 | 2,300 | 3,080 | 1,570 | 2,620 | 3,500 |
| | Melt viscosity ($\eta_{2B}'$) | Pa·s | 460 | 610 | 810 | 480 | 640 | 740 |
| | (½) log10 ($\eta_{2B}'/\eta_{1B}'$) | — | −0.237 | −0.288 | −0.29 | −0.257 | −0.306 | −0.337 |
| | Number of lamination of layer B | — | 3 | 3 | 3 | 9 | 9 | 9 |
| | Average thickness of layer B | μm | 3 | 3 | 3 | 1 | 1 | 1 |
| | Metal species | — | Na/Mg | Na/Mg | Na/Mg | Na | Na | Na |
| | Metal element equivalent content (Note 2) | ppm | 1/110 | 1/110 | 1/110 | 1 | 1 | 1 |

TABLE 8-continued

|  |  | unit | Comparative Example 17 | Comparative Example 18 | Comparative Example 19 | Comparative Example 20 | Comparative Example 21 | Comparative Example 22 |
|---|---|---|---|---|---|---|---|---|
| Entirety | Entire thickness of multilayered structure | μm | 19 | 19 | 19 | 17 | 17 | 17 |
|  | $\eta_{2B}'/\eta_{2A}'$ | — | 2 | 2.9 | 2.61 | 2.09 | 3.05 | 2.39 |
|  | Metal element equivalent content (Note 3) | ppm | 51 | 46 | 46 | 0.5 | 3 | 0.5 |
| Temperature of forming by coextrusion |  | °C. | 255 | 234 | 223 | 255 | 234 | 223 |
| Evaluation of characteristics | Appearance | — | A | B | B | B | C | B |
|  | Oxygen transmission rate | (Note 4) | 9.1 | 2.3 | 1.3 | 9.5 | 2.2 | 1.1 |
|  | Oxygen transmission rate after flexion | (Note 4) | 1060 | 720 | 470 | 240 | 110 | 95 |
|  | Flex resistance | time | 220 | 110 | 65 | 350 | 320 | 220 |
|  | Interlayer adhesive force between the layer A and the layer B | g/15 mm | 670 | 620 | 580 | 120 | 85 | 62 |
|  | Stretchability | — | D | D | D | C | D | D |
|  | Thermoformability | — | D | D | D | C | D | D |

(Notes 1 and 2): The "metal element equivalent content" as referred to herein means proportion by mass of the metal element included in the metal salt contained in the resin composition of each layer of the layer A or the layer B, with respect to the mass of the resin composition of each layer.
(Note 3): The "metal element equivalent content" as referred to herein means proportion by mass of the metal element included in the metal salt contained in the entirety of the multilayered structure with respect to the total mass of the multilayered structure.
(Note 4): mL · 20 μm/m² · day · atm

TABLE 9

|  |  |  | unit | Example 45 | Example 46 | Example 47 | Example 48 | Example 49 |
|---|---|---|---|---|---|---|---|---|
| Multilayered structure | Layer A | Resin of layer A | — | EVOH (A-1) | EVOH (A-2) | EVOH (A-3) | EVOH (A-1) | EVOH (A-1) |
|  |  | Pellet type of layer A | — | A-1 | A-2 | A-3 | A-4 | A-5 |
|  |  | Content of ethylene units | mol % | 32.5 | 29 | 44.5 | 32.5 | 32.5 |
|  |  | Saponification degree | mol % | 99.5 | 99.5 | 99.5 | 99.5 | 99.5 |
|  |  | Content of phosphate compound | ppm | 45 | 50 | 20 | 90 | 5 |
|  |  | Content of acetate | ppm | 150 | 150 | 420 | 210 | 95 |
|  |  | Content of boron compound | ppm | 260 | 150 | 12 | 520 | 260 |
|  |  | Melt viscosity ($\eta_{1A}$) | Pa·s | 3,100 | 6,800 | 2,000 | 8,900 | 3,700 |
|  |  | Melt viscosity ($\eta_{2A}$) | Pa·s | 500 | 670 | 390 | 750 | 580 |
|  |  | (½) log10 ($\eta_{2A}/\eta_{1A}$) | — | −0.396 | −0.503 | −0.355 | −0.537 | −0.402 |
|  |  | MFR (190° C., 2160 g) | g/10 min | 1.8 | 1.2 | 3.2 | 1 | 1.6 |
|  |  | Number of lamination of layer A | — | 9 | 9 | 9 | 9 | 9 |
|  |  | Average thickness of layer A | μm | 1 | 1 | 1 | 1 | 1 |
|  |  | Total thickness of layer A | μm | 9 | 9 | 9 | 9 | 9 |
|  |  | Metal species | — | Na | Na | Na/Zn | Na | Na |
|  |  | Metal element equivalent content (Note 1) | ppm | 140 | 150 | 130/120 | 280 | 14 |
|  | Layer B | Resin of layer B | — | adhesive resin (B-3-1) | | | | |
|  |  | Pellet type of layer B | — | B-3-1a | B-3-1a | B-3-1a | B-3-1a | B-3-1a |
|  |  | Melt viscosity ($\eta_{1B}$) | Pa·s | 1,800 | 1,800 | 1,800 | 1,800 | 1,800 |
|  |  | Melt viscosity ($\eta_{2B}$) | Pa·s | 270 | 270 | 270 | 270 | 270 |
|  |  | (½) log10 ($\eta_{2B}/\eta_{1B}$) | — | −0.412 | −0.412 | −0.412 | −0.412 | −0.412 |
|  |  | Number of lamination of layer B | — | 8 | 8 | 8 | 8 | 8 |
|  |  | Average thickness of layer B | μm | 1 | 1 | 1 | 1 | 1 |
|  |  | Total thickness of layer B | μm | 8 | 8 | 8 | 8 | 8 |
|  |  | Metal species | — | — | — | — | — | — |
|  |  | Metal element equivalent content (Note 2) | ppm | — | — | — | — | — |
|  | Entirety | Entire thickness of multilayered structure | μm | 17 | 17 | 17 | 17 | 17 |
|  |  | $\eta_{2B}/\eta_{2A}$ | — | 0.54 | 0.4 | 0.69 | 0.36 | 0.47 |
|  |  | Metal element equivalent content (Note 3) | ppm | 74 | 79 | 132 | 148 | 7.4 |
| Evaluation of characteristics | Appearance | — | A | A | A | B | A |
|  | Oxygen transmission rate | (Note 4) | 0.9 | 1.4 | 28 | 1 | 0.9 |
|  | Oxygen transmission rate after flexion | (Note 4) | 1.2 | 1.5 | 29 | 1.2 | 1.6 |
|  | Flex resistance | time | 1,500 | 2,500 | 4,900 | 1,200 | 1,100 |
|  | Interlayer adhesive force between the layer A and the layer B | g/15 mm | 820 | 1,000 | 790 | 1,200 | 590 |
|  | Stretchability | — | A | A | A | B | A |
|  | Thermoformability | — | A | A | A | B | A |

|  |  |  | unit | Example 50 | Example 51 | Example 52 | Example 53 | Example 54 |
|---|---|---|---|---|---|---|---|---|
| Multilayered structure | Layer A | Resin of layer A | — | EVOH (A-1) | | | | |
|  |  | Pellet type of layer A | — | A-6 | A-7 | A-8 | A-1 | A-1 |
|  |  | Content of ethylene units | mol % | 32.5 | 32.5 | 32.5 | 32.5 | 32.5 |
|  |  | Saponification degree | mol % | 99.5 | 99.5 | 99.5 | 99.5 | 99.5 |
|  |  | Content of phosphate compound | ppm | 90 | 45 | 43 | 45 | 45 |
|  |  | Content of acetate | ppm | 680 | 150 | 90 | 150 | 150 |
|  |  | Content of boron compound | ppm | 250 | 260 | 260 | 260 | 260 |

TABLE 9-continued

| | | | | | | | |
|---|---|---|---|---|---|---|---|
| | | Melt viscosity ($\eta_{1A}$) | Pa·s | 2,800 | 2,500 | 3,800 | 3,100 | 3,100 |
| | | Melt viscosity ($\eta_{2A}$) | Pa·s | 470 | 400 | 590 | 500 | 500 |
| | | (½) log10 ($\eta_{2A}/\eta_{1A}$) | — | −0.388 | −0.398 | −0.404 | −0.396 | −0.396 |
| | | MFR (190° C., 2160 g) | g/10 min | 2.5 | 2.8 | 1.6 | 1.8 | 1.8 |
| | | Number of lamination of layer A | — | 9 | 9 | 9 | 5 | 17 |
| | | Average thickness of layer A | μm | 1 | 1 | 1 | 1 | 0.5 |
| | | Total thickness of layer A | μm | 9 | 9 | 9 | 5 | 8.5 |
| | | Metal species | — | Na | Na/Mg | — | Na | Na |
| | | Metal element equivalent content (Note 1) | ppm | 1170 | 25/110 | — | 140 | 140 |
| Layer B | | Resin of layer B | — | adhesive resin (B-3-1) | | | | |
| | | Pellet type of layer B | — | B-3-1a | B-3-1a | B-3-1b | B-3-1a | B-3-1a |
| | | Melt viscosity ($\eta_{1B}$) | Pa·s | 1,800 | 1,800 | 2,100 | 1,800 | 1,800 |
| | | Melt viscosity ($\eta_{2B}$) | Pa·s | 270 | 270 | 300 | 270 | 270 |
| | | (½) log10 ($\eta_{2B}/\eta_{1B}$) | — | −0.412 | −0.412 | −0.423 | −0.412 | −0.412 |
| | | Number of lamination of layer B | — | 8 | 8 | 8 | 4 | 16 |
| | | Average thickness of layer B | μm | 1 | 1 | 1 | 1 | 0.5 |
| | | Total thickness of layer B | μm | 8 | 8 | 8 | 4 | 8 |
| | | Metal species | — | — | — | Na | — | — |
| | | Metal element equivalent content (Note 2) | ppm | — | — | 140 | — | — |
| Entirety | | Entire thickness of multilayered structure | μm | 17 | 17 | 17 | 9 | 16.5 |
| | | $\eta_{2B}/\eta_{2A}$ | — | 0.57 | 0.68 | 0.51 | 0.54 | 0.54 |
| | | Metal element equivalent content (Note 3) | ppm | 619 | 71 | 66 | 78 | 72 |
| Evaluation of characteristics | | Appearance | — | B | A | A | A | A |
| | | Oxygen transmission rate | (Note 4) | 1 | 1 | 0.9 | 1.9 | 0.9 |
| | | Oxygen transmission rate after flexion | (Note 4) | 1.2 | 1.2 | 1.6 | 4.5 | 0.9 |
| | | Flex resistance | time | 1,700 | 1,800 | 1,000 | 800 | 2,200 |
| | | Interlayer adhesive force between the layer A and the layer B | g/15 mm | 1,400 | 1,250 | 730 | 800 | 820 |
| | | Stretchability | — | B | A | A | A | A |
| | | Thermoformability | — | B | A | A | A | A |

| | | | unit | Example 55 | Example 56 | Example 57 |
|---|---|---|---|---|---|---|
| Multilayered structure | Layer A | Resin of layer A | — | EVOH (A-1) | (A-14) | EVOH |
| | | Pellet type of layer A | — | A-1 | A-8 | A-14 |
| | | Content of ethylene units | mol % | 32.5 | 32.5 | 32.5 |
| | | Saponification degree | mol % | 99.5 | 99.5 | 99.5 |
| | | Content of phosphate compound | ppm | 45 | 43 | 40 |
| | | Content of acetate | ppm | 150 | 90 | 105 |
| | | Content of boron compound | ppm | 260 | 260 | 230 |
| | | Melt viscosity ($\eta_{1A}$) | Pa·s | 3,100 | 3,800 | 2,900 |
| | | Melt viscosity ($\eta_{2A}$) | Pa·s | 500 | 590 | 470 |
| | | (½) log10 ($\eta_{2A}/\eta_{1A}$) | — | −0.396 | −0.404 | −0.395 |
| | | MFR (190° C., 2160 g) | g/10 min | 1.8 | 1.6 | 4.5 |
| | | Number of lamination of layer A | — | 17 | 9 | 17 |
| | | Average thickness of layer A | μm | 0.5 | 1 | 0.6 |
| | | Total thickness of layer A | μm | 8.5 | 9 | 10.2 |
| | | Metal species | — | Na | — | Na/Co |
| | | Metal element equivalent content (Note 1) | ppm | 140 | — | 125/400 |
| | Layer B | Resin of layer B | — | adhesive resin (B-3-2) | | adhesive resin (B-3-1) |
| | | Pellet type of layer B | — | B-3-2a | B-3-2b | B-3-1a |
| | | Melt viscosity ($\eta_{1B}$) | Pa·s | 2,900 | 3,900 | 1,800 |
| | | Melt viscosity ($\eta_{2B}$) | Pa·s | 420 | 600 | 270 |
| | | (½) log10 ($\eta_{2B}/\eta_{1B}$) | — | −0.42 | −0.406 | −0.412 |
| | | Number of lamination of layer B | — | 16 | 8 | 16 |
| | | Average thickness of layer B | μm | 1 | 1 | 1 |
| | | Total thickness of layer B | μm | 16 | 8 | 16 |
| | | Metal species | — | — | Mg | — |
| | | Metal element equivalent content (Note 2) | ppm | — | 110 | — |
| | Entirety | Entire thickness of multilayered structure | μm | 24.5 | 17 | 26.2 |
| | | $\eta_{2B}/\eta_{2A}$ | — | 0.84 | 1.02 | 0.57 |
| | | Metal element equivalent content (Note 3) | ppm | 49 | 52 | 237 |
| | Evaluation of characteristics | Appearance | — | A | A | A |
| | | Oxygen transmission rate | (Note 4) | 0.9 | 0.9 | 0 |
| | | Oxygen transmission rate after flexion | (Note 4) | 1 | 1.1 | 0 |
| | | Flex resistance | time | 2,800 | 1,100 | 2,100 |
| | | Interlayer adhesive force between the layer A and the layer B | g/15 mm | 870 | 770 | 810 |
| | | Stretchability | — | A | A | A |
| | | Thermoformability | — | A | A | A |

(Notes 1 and 2): The "metal element equivalent content" as referred to herein means proportion by mass of the metal element included in the metal salt contained in the resin composition of each layer of the layer A or the layer B, with respect to the mass of the resin composition of each layer.
(Note 3): The "metal element equivalent content" as referred to herein means proportion by mass of the metal element included in the metal salt contained in the entirety of the multilayered structure with respect to the total mass of the multilayered structure.
(Note 4): mL·20 μm/m² · day · atm

TABLE 10

| | | unit | Comparative Example 23 | Comparative Example 24 | Comparative Example 25 | Comparative Example 26 | Comparative Example 27 | Comparative Example 28 |
|---|---|---|---|---|---|---|---|---|
| Multi-layered structure | Layer A Resin of layer A | — | EVOH (A-1) | | | | | EVOH (A-14) |
| | Pellet type of layer A | — | A-1 | A-1 | A-8 | A-9 | A-10 | A-14 |
| | Content of ethylene units | mol % | 32.5 | 32.5 | 32.5 | 32.5 | 32.5 | 32.5 |
| | Saponification degree | mol % | 99.5 | 99.5 | 99.5 | 99.5 | 99.5 | 99.5 |
| | Content of phosphate compound | ppm | 45 | 45 | 43 | 90 | 45 | 40 |
| | Content of acetate | ppm | 150 | 150 | 90 | 13,500 | 150 | 105 |
| | Content of boron compound | ppm | 260 | 260 | 260 | 250 | 5,000 | 230 |
| | Melt viscosity ($\eta_{1A}$) | Pa·s | 3,100 | 3,100 | 3,800 | 970 | 49,500 | 2,900 |
| | Melt viscosity ($\eta_{2A}$) | Pa·s | 500 | 500 | 590 | 90 | 1,200 | 470 |
| | (½) log10 ($\eta_{2A}/\eta_{1A}$) | — | −0.396 | −0.396 | −0.404 | −0.516 | −0.808 | −0.395 |
| | MFR (190° C., 2160 g) | g/10 min | 1.8 | 1.8 | 1.6 | 6.8 | 0.05 | 4.5 |
| | Number of lamination of layer A | — | 2 | 3 | 9 | 9 | 9 | 2 |
| | Average thickness of layer A | μm | 4 | 3 | 1 | 1 | 1 | 5.1 |
| | Total thickness of layer A | μm | 8 | 9 | 9 | 9 | 9 | 10.2 |
| | Metal species | — | Na | Na | — | Na | Na | Na/Co |
| | Metal element equivalent content (Note 1) | ppm | 140 | 140 | — | 23,000 | 140 | 125/400 |
| Layer B | Resin of layer B | — | adhesive resin (B-3-1) | | | | | |
| | Pellet type of layer B | — | B-3-1a | B-3-1a | B-3-1a | B-3-1a | B-3-1a | B-3-1a |
| | Melt viscosity ($\eta_{1B}$) | Pa·s | 1,800 | 1,800 | 1,800 | 1,800 | 1,800 | 1,800 |
| | Melt viscosity ($\eta_{2B}$) | Pa·s | 270 | 270 | 270 | 270 | 270 | 270 |
| | (½) log10 ($\eta_{2B}/\eta_{1B}$) | — | −0.412 | −0.412 | −0.412 | −0.412 | −0.412 | −0.412 |
| | Number of lamination of layer B | — | 1 | 2 | 8 | 8 | 8 | 1 |
| | Average thickness of layer B | μm | 9 | 4 | 1 | 1 | 1 | 16 |
| | Total thickness of layer B | μm | 9 | 8 | 8 | 8 | 8 | 16 |
| | Metal species | — | — | — | — | — | — | — |
| | Metal element equivalent content (Note 2) | ppm | — | — | — | — | — | — |
| Entirety | Entire thickness of multilayered structure | μm | 17 | 17 | 17 | 17 | 17 | 26.2 |
| | $\eta_{2B}/\eta_{2A}$ | — | 0.54 | 0.54 | 0.46 | 3 | 0.23 | 0.57 |
| | Metal element equivalent content (Note 3) | ppm | 66 | 74 | 0 | 12,200 | 74 | 237 |
| Evaluation of characteristics | Appearance | — | B | B | A | D | D | A |
| | Oxygen transmission rate | (Note 4) | 1.2 | 1 | 0.9 | 110 | 170 | 0 |
| | Oxygen transmission rate after flexion | (Note 4) | 440 | 310 | 260 | 590 | 690 | 105 |
| | Flex resistance | time | 300 | 400 | 400 | 200 | 200 | 400 |
| | Interlayer adhesive force between the layer A and the layer B | g/15 mm | 710 | 740 | 180 | 260 | 380 | 690 |
| | Stretchability | — | D | C | B | D | D | D |
| | Thermoformability | — | D | C | B | D | D | D |

(Notes 1 and 2): The "metal element equivalent content" as referred to herein means proportion by mass of the metal element included in the metal salt contained in the resin composition of each layer of the layer A or the layer B, with respect to the mass of the resin composition of each layer.
(Note 3): The "metal element equivalent content" as referred to herein means proportion by mass of the metal element included in the metal salt contained in the entirety of the multilayered structure with respect to the total mass of the multilayered structure.
(Note 4): mL · 20 μm/m² · day · atm

TABLE 11

| | | unit | Example 58 | Example 59 | Example 60 |
|---|---|---|---|---|---|
| Multilayered structure | Layer A Resin of layer A | — | nylon MXD6 | PGA | wholly aromatic liquid crystal polyester |
| | Pellet type of layer A | — | A-11 | A-12 | A-13 |
| | Melt viscosity ($\eta_{1A}'$) | Pa·s | 1,100 | 850 | 790 |
| | Melt viscosity ($\eta_{2A}'$) | Pa·s | 230 | 210 | 310 |
| | (½) log10 ($\eta_{2A}'/\eta_{1A}'$) | — | −0.34 | −0.304 | −0.203 |
| | Number of lamination of layer A | — | 8 | 8 | 8 |
| | Average thickness of layer A | μm | 1 | 1 | 1 |
| | Metal species | — | — | Sn | — |
| | Metal element equivalent content (Note 1) | ppm | — | 5 | — |
| Layer B | Resin of layer B | — | adhesive resin (B-3-1) | adhesive resin (B-3-3) | |

TABLE 11-continued

|  |  |  | unit | | | |
|---|---|---|---|---|---|---|
| | | Pellet type of layer B | — | B-3-1b | B-3-3b | B-3-3b |
| | | Melt viscosity ($\eta_{1B}'$) | Pa·s | 1,300 | 2,000 | 2,200 |
| | | Melt viscosity ($\eta_{2B}'$) | Pa·s | 220 | 320 | 340 |
| | | (½) log10 ($\eta_{2B}'/\eta_{1B}'$) | — | −0.386 | −0.398 | −0.405 |
| | | Number of lamination of layer B | — | 9 | 9 | 9 |
| | | Average thickness of layer B | μm | 1 | 1 | 1 |
| | | Metal species | — | Na | Na | Na |
| | | Metal element equivalent content (Note 2) | ppm | 140 | 140 | 140 |
| | Entirety | Entire thickness of multilayered structure | μm | 17 | 17 | 17 |
| | | $\eta_{2B}'/\eta_{2A}'$ | — | 0.96 | 1.52 | 1.1 |
| | | Metal element equivalent content (Note 3) | ppm | 64 | 59 | 59 |
| | | Temperature of forming by coextrusion | °C. | 255 | 234 | 223 |
| Evaluation of | | Appearance | — | A | B | A |
| characteristics | | Oxygen transmission rate | (Note 4) | 8.5 | 1.9 | 0.9 |
| | | Oxygen transmission rate after flexion | (Note 4) | 18.2 | 4.5 | 2.3 |
| | | Flex resistance | time | 1,350 | 900 | 750 |
| | | Interlayer adhesive force between the layer A and the layer B | g/15 mm | 800 | 650 | 600 |
| | | Stretchability | — | A | A | A |
| | | Thermoformability | — | A | A | A |

| | | | unit | Comparative Example 29 | Comparative Example 30 | Comparative Example 31 |
|---|---|---|---|---|---|---|
| Multilayered structure | Layer A | Resin of layer A | — | nylon MXD6 | PGA | wholly aromatic liquid crystal polyester |
| | | Pellet type of layer A | — | A-11 | A-12 | A-13 |
| | | Melt viscosity ($\eta_{1A}'$) | Pa·s | 1,100 | 850 | 790 |
| | | Melt viscosity ($\eta_{2A}'$) | Pa·s | 230 | 210 | 310 |
| | | (½) log10 ($\eta_{2A}'/\eta_{1A}'$) | — | −0.34 | −0.304 | −0.203 |
| | | Number of lamination of layer A | — | 2 | 2 | 2 |
| | | Average thickness of layer A | μm | 5 | 5 | 5 |
| | | Metal species | — | — | Sn | — |
| | | Metal element equivalent content (Note 1) | ppm | — | 5 | — |
| | Layer B | Resin of layer B | — | adhesive resin (B-3-1) | adhesive resin (B-3-3) | |
| | | Pellet type of layer B | — | B-3-1b | B-3-3b | B-3-3b |
| | | Melt viscosity ($\eta_{1B}'$) | Pa·s | 1,300 | 2,000 | 2,200 |
| | | Melt viscosity ($\eta_{2B}'$) | Pa·s | 220 | 320 | 340 |
| | | (½) log10 ($\eta_{2B}'/\eta_{1B}'$) | — | −0.386 | −0.398 | −0.405 |
| | | Number of lamination of layer B | — | 3 | 3 | 3 |
| | | Average thickness of layer B | μm | 3 | 3 | 3 |
| | | Metal species | — | Na | Na | Na |
| | | Metal element equivalent content (Note 2) | ppm | 140 | 140 | 140 |
| | Entirety | Entire thickness of multilayered structure | μm | 19 | 19 | 19 |
| | | $\eta_{2B}'/\eta_{2A}'$ | — | 0.96 | 1.52 | 1.1 |
| | | Metal element equivalent content (Note 3) | ppm | 57 | 52 | 51 |
| | | Temperature of forming by coextrusion | °C. | 255 | 234 | 223 |
| Evaluation of | | Appearance | — | A | B | A |
| characteristics | | Oxygen transmission rate | (Note 4) | 9.5 | 2.6 | 1.5 |
| | | Oxygen transmission rate after flexion | (Note 4) | 1,450.00 | 980 | 640 |
| | | Flex resistance | time | 150 | 80 | 60 |
| | | Interlayer adhesive force between the layer A and the layer B | g/15 mm | 650 | 560 | 570 |
| | | Stretchability | — | D | D | D |
| | | Thermoformability | — | D | D | D |

| | | | unit | Comparative Example 32 | Comparative Example 33 | Comparative Example 34 |
|---|---|---|---|---|---|---|
| Multilayered structure | Layer A | Resin of layer A | — | nylon MXD6 | PGA | wholly aromatic liquid crystal polyester |
| | | Pellet type of layer A | — | A-11 | A-12 | A-13 |
| | | Melt viscosity ($\eta_{1A}'$) | Pa·s | 1,100 | B50 | 790 |
| | | Melt viscosity ($\eta_{2A}'$) | Pa·s | 230 | 210 | 310 |
| | | (½) log10 ($\eta_{2A}'/\eta_{1A}'$) | — | −0.34 | −0.304 | −0.203 |
| | | Number of lamination of layer A | — | 8 | 8 | 8 |
| | | Average thickness of layer A | μm | 1 | 1 | 1 |
| | | Metal species | — | — | Sn | — |
| | | Metal element equivalent content (Note 1) | ppm | — | 5 | — |
| | Layer B | Resin of layer B | — | adhesive resin B-3-1) | adhesive resin (B-3-3) | |
| | | Pellet type of layer B | — | B-3-1a | B-3-3a | B-3-3a |
| | | Melt viscosity ($\eta_{1B}'$) | Pa·s | 1,100 | 1,700 | 1,900 |
| | | Melt viscosity ($\eta_{2B}'$) | Pa·s | 200 | 290 | 300 |
| | | (½) log10 ($\eta_{2B}'/\eta_{1B}'$) | — | −0.37 | −0.384 | −0.401 |

TABLE 11-continued

|  |  |  |  |  |  |
|---|---|---|---|---|---|
|  | Number of lamination of layer B | — | 9 | 9 | 9 |
|  | Average thickness of layer B | μm | 1 | 1 | 1 |
|  | Metal species | — | — | — | — |
|  | Metal element equivalent content (Note 2) | ppm | — | — | — |
| Entirety | Entire thickness of multilayered structure | μm | 17 | 17 | 17 |
|  | $\eta_{2B}'/\eta_{2A}'$ | — | 0.87 | 1.38 | 0.97 |
|  | Metal element equivalent content (Note 3) | ppm | 0 | 3 | 0 |
|  | Temperature of forming by coextrusion | °C. | 255 | 234 | 223 |
| Evaluation of characteristics | Appearance | — | A | B | A |
|  | Oxygen transmission rate | (Note 4) | 9.9 | 2.5 | 1.2 |
|  | Oxygen transmission rate after flexion | (Note 4) | 290 | 125 | 120 |
|  | Flex resistance | time | 250 | 280 | 150 |
|  | Interlayer adhesive force between the layer A and the layer B | g/15 mm | 250 | 200 | 90 |
|  | Stretchability | — | C | D | D |
|  | Thermoformability | — | C | D | D |

(Notes 1 and 2): The "metal element equivalent content" as referred to herein means proportion by mass of the metal element included in the metal salt contained in the resin composition of each layer of the layer A or the layer B, with respect to the mass of the resin composition of each layer.
(Note 3): The "metal element equivalent content" as referred to herein means proportion by mass of the metal element included in the metal salt contained in the entirety of the multilayered structure with respect to the total mass of the multilayered structure.
(Note 4): mL · 20 μm/m² · day · atm From the results shown in Table 1 to Table 5 and Table 7 to Table 11, it is concluded that superior interlayer adhesiveness can be achieved in a multilayered structure having the layer A constituted with a resin composition containing a gas barrier resin, and the layer B constituted with a resin composition containing a thermoplastic resin, and including at least 8 layers laminated, when no less than 1 ppm and no greater than 10,000 ppm of a metal salt is contained in at least one of the resin compositions included in the layer A and the layer B that are adjacent with each other. In addition, it is also concluded that high flex resistance is thereby attained, and furthermore, a low oxygen transmission rate can be maintained even after flexion. Moreover, superior stretchability and thermoformability would be also suggested.

On the other hand, according to Comparative Examples 1, 2, 6 to 8, 12, 13, 17 to 19, 23, 24, and 28 to 31 in which the multilayered structure included less than eight layers laminated exhibited oxygen transmission rate significantly increased after flexion, indicating inferior flex resistance. In addition, stretchability and thermoformability were also inferior. According to Comparative Examples 3, 9, 14, 20, 25, 32 and the like in which both the layer A and the layer B do not contain no less than 1 ppm of a metal salt in the resin composition, achievement of sufficient adhesive force failed, and interlayer delamination was developed in the flex resistance test, and increase in the oxygen transmission rate after flexion was remarkable, also indicating inferior flex resistance. According to Comparative Examples 4, 15 and 26 in which the resin composition of the layer A contained a metal salt in an amount beyond 10,000 ppm, EVOH significantly decomposed, thereby leading to failure in attaining stable melt viscosity in forming, and thus it was difficult to obtain a film having a multilayered structure in a favorable state. Therefore, these exhibited oxygen transmission rate, oxygen transmission rate after flexion and flex resistance being all inferior, and the adhesiveness was also inferior in strength due to disruption of the EVOH layer material. Furthermore, as these films having a multilayered structure had inferior quality before stretching, stretchability and thermoformability were also inferior. According to Comparative Examples 5, 16 and 27 in which 210° C.: the melt viscosity $\eta_{1A}$ was greater than $1\times10^4$ Pa·s; $(1/2) \log_{10} (\eta_{2A}/\eta_{1A})$ was less than −0.8; and $\eta_{2B}/\eta_{2A}$ was less than 0.3, compatibility of EVOH and the thermoplastic resin in terms of viscosity was wrong, whereby it was difficult to obtain a film having a multilayered structure in a favorable state. In addition, for the same reasons, these exhibited low interlayer adhesiveness, and all inferior oxygen transmission rate, oxygen transmission rate after flexion, and flex resistance. In addition, as the quality of these films having a multilayered structure before stretching was inferior, they were also inferior in stretchability and thermoformability.

Example 61

A laminate (polypropylene/adhesive resin/(multilayered structure constituted with alternate 33 layers of TPU (B-1-1b) and EVOH (A-1))/adhesive resin/polypropylene) in which a multilayered structure and a thermoplastic resin layer were laminated was produced using the following four types of 37-layer coextrusion apparatuses, under the conditions described below. The construction of the sheet included 100 μm of a multilayered structure having 33 layers with an alternate constitution of TPU (B-1-1b) and EVOH (A-1), 50 μm of an adhesive resin layer, and 800 μm of a polypropylene layer. It is to be noted that as the TPU/EVOH layer having 33 layers with an alternate constitution, the pellet (B-1-1b) and the pellet (A-1) were supplied to a coextruder in molten states at 220° C. with a 33-layered feed block such that a multilayered structure is formed which includes 17 layers B and 16 layers A alternately with the resin composition that constitutes each pellet, and coextruded to allow for interflowing, whereby a multilayer laminate was produced. The thickness of each layer was varied so as to gradually increase in the feed block from the front face side toward the middle side, whereby melts of the pellet (B-1-1b) and the pellet (A-1) that interflowed were extruded such that the each layer of the extruded multilayered structure has a uniform thickness. In addition, a slit shape was designed so as to give an approximately the same thickness of the layer A and the layer B that are adjacent with each other. The outermost layer of the TPU/EVOH layer that includes 33 layers with an alternate constitution was produced to give a laminate having a constitution with TPU (B-1-1b) consisting of the pellet (B-1-1b).

Conditions for coextrusion forming were as follows.

Layered structure: polypropylene/adhesive resin/(the multilayered structure having 33 layers with an alternate constitution of TPU (B-1-1b) and EVOH (A-1))/adhesive resin/polypropylene Extrusion temperature of TPU pellet (B-1-1b) and EVOH pellet (A-1): cylinder part resin feed port/cylinder upstream portion/cylinder middle portion/cylinder downstream portion=175/210/210/210° C.

Extrusion temperature of adhesive resin: cylinder part resin feed port/cylinder upstream portion/cylinder middle portion/cylinder downstream portion=170/170/210/210° C.

Extrusion temperature of polypropylene: cylinder part resin feed port/cylinder upstream portion/cylinder middle portion/cylinder downstream portion=170/170/220/220° C.

Temperature of adaptor: 220° C.
Temperature of feed block: 220° C.
Temperature of die: 220° C.

Specifications of extruder and T die of each resin
TPU and EVOH (two):
40φ extruder model VSVE-40-24 (manufactured by Osaka Seiki Kosaku K.K.)
Adhesive resin:
40φ extruder model 10VSE-40-22 (manufactured by Osaka Seiki Kosaku K.K.)
Polypropylene:
65φ extruder model 20VS-65-22 (manufactured by Osaka Seiki Kosaku K.K.)
T die:
650 mm width (manufactured by Research Laboratory of Plastics Technology Co., Ltd.)
Temperature of cooling roller: 30° C.
Draw speed: 2 m/min As the polypropylene resin, a mixture of Novatec PP EA7A and Novatec PP EG-7FT (manufactured by Japan Polypropylene Corp.) at a mass ratio of 85:15 was used, and as the adhesive resin, "ADMER QF551", manufactured by Mitsui Chemicals, Inc. was used.

Moisture conditioning of the laminate produced as described above was carried out in an atmosphere involving 23° C. and 50% RH for 30 days, followed by cutting to give a strip section having a width of 15 mm. Measurement of the interlayer adhesive force between the adhesive resin layer and the layer A was 1,780 g/15 mm, indicating favorable adhesiveness. On the strip section as a measurement sample, T-die peel strength was measured in an atmosphere involving 23° C. and 50% RH, using an autograph "model AGS-H" manufactured by Shimadzu Corporation at a tension rate of 250 mm/min. Thus obtained value (unit: g/15 mm) was determined as the interlayer adhesive force between the adhesive resin layer and the layer A.

The laminate produced as described above was mounted on a pantograph type biaxial stretching machine manufactured by TOYO SEIKI Co., Ltd., and simultaneous biaxial stretching was carried out at 140° C. with a draw ratio of 3×3 times to obtain a multilayered stretching film. The multilayered sheet exhibited favorable stretchability, and after the stretching, the resulting multilayered stretching film had no crack, lack in uniformity and uneven wall thickness, accompanied by favorable appearance (in terms of the transparency, gel or seed).

Moisture conditioning of the multilayered stretching film produced as described above was carried out at 20° C. and at 30% RH for one face, and at 95% RH with higher humidity for another face for 5 days. Two pieces of a sample of the conditioned multilayered structure were provided to measure the oxygen transmission rate using MOCON, model OX-TRAN10/50A manufactured by Modern Controls, Inc., under a condition involving 20° C., and 30% RH and 100% RH respectively, in accordance with a method of JIS-K7126 (isopiestic method), and the average was determined. The amount of oxygen permeabilization of the multilayered stretching film of the present Example was 1.21 cc/m$^2$·day·atm, indicating a favorable gas barrier property.

Moreover, the laminate obtained as described above was subjected to thermoforming with a thermoforming machine (a vacuum-pressure deep drawing molding machine model "FX-0431-3" manufactured by Asano Laboratories Co. Ltd.,) into a shape of a cup (die shape: upper part: 75 mmφ; lower part: 60 mmφ; depth: 75 mm; and draw ratio S=1.0) at a sheet temperature of 140° C. with compressed air (atmospheric pressure: 5 kgf/cm$^2$) to give a thermoformed vessel. The forming conditions employed were as follows.

temperature of heater: 400° C.;
plug: 45φ×65 mm;
plug temperature: 120° C.; and
die temperature: 70° C.

When the appearance of the thermoformed vessel thus obtained was visually observed, crack, lack in uniformity and locally uneven wall thickness were not found, and stretching was evenly perfected. In addition, superior transparency, and favorable appearance were ascertained.

Reference Example 1

A laminate was obtained in a similar manner to Example 61 except that the pellet (A-8) was used in place of the pellet (A-1), and the pellet (B-1-1a) was used in place of the pellet (B-1-1b). Using the resulting laminate, the interlayer adhesive force between the adhesive resin layer and the layer A was determined in a similar manner to Example 61, and revealed a value of 220 g/15 mm.

Example 62

A laminate (PA (B-2-3a)/(multilayered structure having 33 layers with an alternate constitution of PA (B-2-2b) and EVOH (A-1))/adhesive resin/low pressure polymerized low-density polyethylene) in which a multilayered structure and a thermoplastic resin layer were laminated was produced using the following five types of 36-layer coextrusion apparatuses, under the conditions described below. The construction of the sheet included 60 μm of PA (B-2-3a) layer, 40 μm of a multilayered structure having 33 layers with an alternate constitution of PA (B-2-2b) and EVOH (A-1), 20 μm of an adhesive resin layer, and 80 μm of a low pressure polymerized low-density polyethylene layer. It is to be noted that as the PA/EVOH layer having 33 layers with an alternate constitution, the pellet (B-2-2b) and the pellet (A-1) were supplied to a coextruder in molten states at 210° C. with a 33-layered feed block such that a multilayered structure is formed which includes 17 layers B and 16 layers A alternately with the resin composition that constitutes each pellet, and coextruded to allow for interflowing, whereby a multilayer laminate was produced. The thickness of each layer was varied so as to gradually increase in the feed block from the front face side toward the middle side, whereby melts of the pellet (B-2-2b) and the pellet (A-1) that interflowed were extruded such that the each layer of the extruded multilayered structure has a uniform thickness. In addition, a slit shape was designed so as to give an approximately the same thickness of the layer A and the layer B that are adjacent with each other. The outermost layer of the PA/EVOH layer that includes 33 layers with an alternate constitution was produced to give a laminate having a constitution with PA (B-2-2b) consisting of the pellet (B-2-2b).

Conditions for coextrusion forming were as follows.
Layered structure: PA (B-2-3a)/(the multilayered structure having 33 layers with an alternate constitution of PA (B-2-2b) and EVOH (A-1))/adhesive resin/low pressure polymerized low-density polyethylene Extrusion temperature of PA (B-2-3a): cylinder part resin feed port/cylinder upstream portion/cylinder middle portion/cylinder downstream portion=195/230/240/240° C.

Extrusion temperature of PA (B-2-2b) and EVOH (A-1): cylinder part resin feed port/cylinder upstream portion/cylinder middle portion/cylinder downstream portion=175/220/230/230° C.

Extrusion temperature of adhesive resin: cylinder part resin feed port/cylinder upstream portion/cylinder middle portion/cylinder downstream portion=170/200/220/230° C.

Extrusion temperature of low pressure polymerized low-density polyethylene: cylinder part resin feed port/cylinder upstream portion/cylinder middle portion/cylinder downstream portion=170/200/220/230° C.

Temperature of adaptor: 240° C.
Temperature of feed block: 240° C.
Temperature of die: 240° C.

Specifications of extruder and T die of each resin

PA (B-2-3a), (PA (B-2-2b) and EVOH (A-1) (three):
40φ extruder model VSVE-40-24 (manufactured by Osaka Seiki Kosaku K.K.)

Adhesive resin:
40φ extruder model 10VSE-40-22 (manufactured by Osaka Seiki Kosaku K.K.)

Low pressure polymerized low-density polyethylene:
65φ extruder model 20VS-65-22 (manufactured by Osaka Seiki Kosaku K.K.)

T die:
650 mm width (manufactured by Research Laboratory of Plastics Technology Co., Ltd)

Temperature of cooling roller: 30° C.
Draw speed: 10 m/min

As the low pressure polymerized low-density polyethylene resin, EVOLUE SP2520 manufactured by Prime Polymer Co., Ltd. was used, and as the adhesive resin, "ADMER NF558", manufactured by Mitsui Chemicals, Inc. was used.

Moisture conditioning of the laminate produced as described above was carried out in an atmosphere involving 23° C. and 50% RH for 30 days, followed by cutting to give a strip section having a width of 15 mm. Measurement of the interlayer adhesive force between the adhesive resin layer and the layer A was 1,670 g/15 mm, indicating favorable adhesiveness. On the strip section as a measurement sample, T-die peel strength was measured in an atmosphere involving 23° C. and 50% RH, using an autograph "model AGS-H" manufactured by Shimadzu Corporation at a tension rate of 250 mm/min. Thus obtained value (unit: g/15 mm) was determined as the interlayer adhesive force between the adhesive resin layer and the layer A.

The laminate produced as described above was mounted on a pantograph type biaxial stretching machine manufactured by TOYO SEIKI Co., Ltd., and simultaneous biaxial stretching was carried out at 140° C. with a draw ratio of 3×3 times to obtain a multilayered stretching film. The multilayered sheet exhibited favorable stretchability, and after the stretching, the resulting multilayered stretching film had no crack, lack in uniformity and uneven wall thickness, accompanied by favorable appearance (in terms of the transparency, gel or seed).

Moisture conditioning of the multilayered stretching film produced as described above was carried out at 20° C. and at 30% RH for one face, and at 95% RH with higher humidity for another face for 5 days. Two pieces of a sample of the conditioned multilayered structure were provided to measure the oxygen transmission rate using MOCON, model OX-TRAN10/50A manufactured by Modern Controls, Inc., under a condition involving 20° C., and 30% RH and 100% RH respectively, in accordance with a method of JIS K7126 (isopiestic method), and the average was determined. The amount of oxygen permeabilization of the multilayered stretching film of the present Example was 2.93 cc/m$^2$·day·atm, indicating a favorable gas barrier property.

Moreover, the laminate obtained as described above was subjected to thermoforming with a thermoforming machine (a vacuum-pressure deep drawing molding machine model "FX-0431-3" manufactured by Asano Laboratories Co. Ltd.,) into a shape of a cup (die shape: upper part: 75 mmφ; lower part: 60 mmφ; depth: 75 mm; and draw ratio S=1.0) at a sheet temperature of 105° C. with compressed air (atmospheric pressure: 5 kgf/cm$^2$) to give a thermoformed vessel. The forming conditions employed were as follows.

temperature of heater: 350° C.;
plug: 45φ×65 mm;
plug temperature: 90° C.; and
die temperature: 50° C.

When the appearance of the thermoformed vessel thus obtained was visually observed, crack, lack in uniformity and locally uneven wall thickness were not found, and stretching was evenly perfected. In addition, superior transparency, and favorable appearance were ascertained.

[Industrial Applicability]

As in the foregoing, the multilayered structure of the present invention is suitably used for food packaging materials, various types of vessels and the like since superior characteristics such as gas barrier properties are maintained even against deformation such as stretching or flexion.

The invention claimed is:

1. A multilayered structure, comprising at least 8 resin-layers, the at least 8 resin-layers comprising:
   i) a plurality of-layers A, each layer A comprising a resin composition comprising a gas barrier resin; and
   ii) a plurality of layers B, each layer B constituted with a resin composition containing a thermoplastic resin,
   wherein each one of the layers A and each of the layers B are alternatively laminated in sequence;
   wherein an average thickness of a single layer of layers A, layers B or both layers A and B is no less than 0.01 μm and no greater than 7 μm, and
   wherein in adjacent layers of layer A and layer B:
   at least one of the resin composition in layer A and the resin composition in layer B comprises a metal salt, a content of the metal salt being no less than 1 ppm and no greater than 10,000 ppm in terms of metal element equivalent; and
   an interlayer adhesive force between layer A and layer B being no less than 450 g/15 mm.

2. The multilayered structure of claim 1, having a thickness of no less than 0.1 μm and no greater than 1,000 μm.

3. The multilayered structure of claim 1, wherein the metal salt is at least one selected from the group consisting of an alkali metal salt, an alkaline earth metal salt, and a d-block metal salt in group 4 of periodic table.

4. The multilayered structure of claim 1, wherein the gas barrier resin is an ethylene-vinyl alcohol copolymer.

5. The multilayered structure of claim 4, wherein a content of ethylene units in the ethylene-vinyl alcohol copolymer is no less than 3 mol % and no greater than 70 mol %.

6. The multilayered structure of claim 4, wherein the ethylene-vinyl alcohol copolymer has a saponification degree of no less than 80 mol %.

7. The multilayered structure of claim 4, wherein the ethylene-vinyl alcohol copolymer comprises at least one selected from the group consisting of a structural unit (I) and a structural unit (II), and a content of the structural units (I)

and (II) with respect to the entire structural units is no less than 0.5 mol % and no greater than 30 mol %:

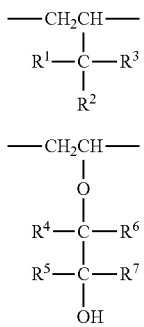

wherein, in formula (I):
 $R^1$, $R^2$, and $R^3$ are each independently a hydrogen atom, an aliphatic hydrocarbon group comprising 1 to 10 carbon atoms, an alicyclic hydrocarbon group comprising 3 to 10 carbon atoms, an aromatic hydrocarbon group comprising 6 to 10 carbon atoms, or a hydroxyl group;
 two among $R^1$, $R^2$, and $R^3$ may bind with one another, unless the two among $R^1$, $R^2$, and $R^3$ are both a hydrogen atom; and
 the aliphatic hydrocarbon group comprising 1 to 10 carbon atoms, the alicyclic hydrocarbon group comprising 3 to 10 carbon atoms, and the aromatic hydrocarbon group comprising 6 to 10 carbon atoms optionally comprise a hydroxyl group, a carboxyl group, or a halogen atom; and
wherein, in formula (II);
 $R^4$, $R^5$, $R^6$, and $R^7$ are each independently a hydrogen atom, an aliphatic hydrocarbon group comprising 1 to 10 carbon atoms, an alicyclic hydrocarbon group comprising 3 to 10 carbon atoms, an aromatic hydrocarbon group comprising 6 to 10 carbon atoms, or a hydroxyl group;
 $R^4$ and $R^5$ or $R^6$ and $R^7$ may bind with one another, unless both $R^4$ and $R^5$ or both $R^6$ and $R^7$ are a hydrogen atom;
 the aliphatic hydrocarbon group comprising 1 to 10 carbon atoms, the alicyclic hydrocarbon group comprising 3 to 10 carbon atoms and the aromatic hydrocarbon group comprising 6 to 10 carbon atoms optionally comprise a hydroxyl group, an alkoxy group, a carboxyl group, or a halogen atom.

8. The multilayered structure of claim 1, wherein the resin composition of layer A comprises a phosphate compound in an amount of no less than 1 ppm and no greater than 10,000 ppm in terms of phosphoric acid group equivalent.

9. The multilayered structure of claim 1, wherein the resin composition of layer A comprises a carboxylic acid in an amount of no less than 1 ppm and no greater than 10,000 ppm.

10. The multilayered structure of claim 1, wherein the resin composition of layer A comprises a boron compound in an amount of no less than 1 ppm and no greater than 2,000 ppm in terms of boron equivalent.

11. The multilayered structure of claim 1, wherein the thermoplastic resin is at least one resin selected from the group consisting of a thermoplastic polyurethane, a polyamide, and an adhesive resin comprising a functional group capable of reacting with a group of the gas barrier resin.

12. The multilayered structure of claim 11, wherein the thermoplastic resin comprises the adhesive resin, which is at least one resin selected from the group consisting of i) a carboxylic acid-modified polyolefin and a metal salt of a carboxylic acid-modified polyolefin, ii) a thermoplastic resin comprising boronic acid group or a boron-comprising group being converted into a boronic acid group in the presence of or water, and iii) a vinyl ester based copolymer.

13. The multilayered structure of claim 1, wherein the resin composition of at least one selected from the group consisting of layer A and layer B has a melt viscosity ($\eta_1$) as determined at a temperature of 210° C. and a shear rate of 10/sec being no less than 1 H $10^2$ Pa·s and no greater than 1 H $10^4$ Pa·s and a melt viscosity ($\eta_2$) as determined at a temperature of 210° C. and a shear rate of 1,000/sec being no less than 1 H $10^1$ Pa·s and no greater than 1 H $10^3$ Pa·s, and
 wherein a ratio ($\eta_2/\eta_1$) of the melt viscosity satisfies formula (1):

$$-0.8 \# (1/2) \log_{10} (\eta_2/\eta_1) \# -0.1 \qquad (1).$$

14. The multilayered structure of claim 1, wherein a ratio ($\eta_{2B}/\eta_{2A}$) of a melt viscosity ($\eta_{2B}$) of the resin composition of layer B to a melt viscosity ($\eta_{2A}$) of the resin composition of layer A as determined at a temperature of 210° C. and a shear rate of 1,000/sec is 0.3 or greater and 2 or less.

15. The multilayered structure of claim 1, wherein at a temperature higher than a Vicat softening temperature of the resin composition of layer A or layer B by 30° C., the resin composition of at least one selected from the group consisting of layer A and layer B has a melt viscosity ($\eta_1'$) as determined at a shear rate of 10/sec being no less than 1 H $10^2$ Pa·s and no greater than 1 H $10^4$ Pa·s and a melt viscosity ($\eta_2'$) as determined at a shear rate of 1,000/sec is no less than 1 H $10^1$ Pa·s and no greater than 1 H $10^3$ Pa·s, and
 wherein a ratio ($\eta_2'/\eta_1'$) of the melt viscosity satisfies formula (1'):

$$-0.8 \# (1/2) \log_{10} (\eta_2'/\eta_1') \# -0.1 \qquad (1').$$

16. The multilayered structure of claim 1, wherein at a temperature higher than a Vicat softening temperature of the resin composition of layer A by 30° C., a ratio ($\eta_{2B}'/\eta_{2A}'$) of a melt viscosity ($\eta_{2B}'$) of the resin composition of layer B to a melt viscosity ($\eta_{2A}'$) of the resin composition of layer A as determined at a shear rate of 1,000/sec is 0.3 or greater and 3 or less.

17. The multilayered structure of claim 1, wherein a binding reaction occurs at an interface between layer A and layer B.

18. The multilayered structure of claim 1, being suitable for food packaging.

* * * * *

UNITED STATES PATENT AND TRADEMARK OFFICE
CERTIFICATE OF CORRECTION

PATENT NO. : 9,186,873 B2  
APPLICATION NO. : 13/513354  
DATED : November 17, 2015  
INVENTOR(S) : Tai et al.

Page 1 of 1

It is certified that error appears in the above-identified patent and that said Letters Patent is hereby corrected as shown below:

In the claims

Column 100, line 12, claim 12, "being converted into a boronic acid group in the presence of or"

should read

--being converted into a boronic acid group in the presence of--.

Signed and Sealed this
Nineteenth Day of April, 2016

Michelle K. Lee
*Director of the United States Patent and Trademark Office*